United States Patent
Chen et al.

(10) Patent No.: US 12,143,620 B2
(45) Date of Patent: Nov. 12, 2024

(54) FILTERING METHODS FOR ANGULAR INTRA PREDICTION

(71) Applicant: ALIBABA GROUP HOLDING LIMITED, Grand Cayman (KY)

(72) Inventors: Jie Chen, Beijing (CN); Yan Ye, San Diego, CA (US); Ru-Ling Liao, Beijing (CN); Xinwei Li, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 2 days.

(21) Appl. No.: 17/406,569

(22) Filed: Aug. 19, 2021

(65) Prior Publication Data

US 2022/0060734 A1    Feb. 24, 2022

Related U.S. Application Data

(60) Provisional application No. 63/068,482, filed on Aug. 21, 2020, provisional application No. 63/092,224, filed on Oct. 15, 2020.

(51) Int. Cl.
   *H04N 19/50* (2014.01)
   *H04N 19/176* (2014.01)
(52) U.S. Cl.
   CPC .......... *H04N 19/50* (2014.11); *H04N 19/176* (2014.11)
(58) Field of Classification Search
   None
   See application file for complete search history.

(56) References Cited

U.S. PATENT DOCUMENTS

| | | | |
|---|---|---|---|
| 2013/0129240 A1* | 5/2013 | Shima | H04N 19/159 382/233 |
| 2019/0166370 A1 | 5/2019 | Xiu et al. | |
| 2019/0253707 A1* | 8/2019 | Ryu | H04N 19/11 |
| 2020/0204799 A1* | 6/2020 | Lee | H04N 19/11 |

(Continued)

FOREIGN PATENT DOCUMENTS

| | | |
|---|---|---|
| CN | 106170093 A | 11/2016 |
| CN | 108293130 A | 7/2018 |
| CN | 109314789 A | 2/2019 |

(Continued)

OTHER PUBLICATIONS

PCT International Search Report and Written Opinion mailed Nov. 19, 2021, issued in corresponding International Application No. PCT/CN2021/113717 (9 pgs.).

(Continued)

*Primary Examiner* — Chikaodili E Anyikire
(74) *Attorney, Agent, or Firm* — Finnegan, Henderson, Farabow, Garrett & Dunner, LLP

(57) ABSTRACT

The present disclosure provides intra prediction methods for video or image coding. An exemplary method includes: performing an intra predicting process for a target block, wherein performing the intra predicting process comprises: determining an intra prediction mode for the target block; in response to the intra prediction mode is an angular mode, determining a filtered value by applying an N-tap interpolation filter to a plurality of reference samples surrounding the target block based on the angular mode, wherein N is an integer greater than 4; and determining a predicted value of a sample of the target block based on the filtered value.

17 Claims, 17 Drawing Sheets

(56) References Cited

U.S. PATENT DOCUMENTS

2020/0221075 A1* 7/2020 Philippe ............... H04N 19/593
2022/0329859 A1* 10/2022 Xiu ..................... H04N 19/124

FOREIGN PATENT DOCUMENTS

| CN | 109417637 A | 3/2019 |
| CN | 110870315 A | 3/2020 |
| CN | 111164979 A | 5/2020 |
| WO | WO2020/009366 A1 | 6/2019 |
| WO | 2020004900 A1 | 1/2020 |
| WO | WO 2020/139169 A1 | 7/2020 |

OTHER PUBLICATIONS

Chinese Search Report issued in corresponding Chinese Application No. 202180048660.5 (2 pages), Jun. 27, 2023.
First Office Action issued in corresponding Chinese Application No. 202180048660.5 on Jun. 27, 2023 (8 pages).
Third Office Action issued in corresponding Chinese Application No. 202180048660.5 on Nov. 15, 2023 (13 pages).
European Patent Office Communication issued for Application No. 21857758.3 the Supplementary European Search Report (Art. 153(7) EPC) and the European search opinion dated Jul. 23, 2024, 11 pages.
Chen et al., "Description of SDR, HDR and 360 video coding technology proposal by Qualcomm and Technicolor—low and high complexity versions," JVET—J0021, 10th meeting: San Diego, US, Apr. 10-20, 2018, 43 pages.
Choi et al., "Video Codec Using Flexible Block Partitioning and Advanced Prediction, Transform and Loop Filtering Technology," IEEE Transactions on Circuits and Systems for Video Technology, vol. 30, No. 5, pp. 1326-1345, 2020.

* cited by examiner

FILTERING METHODS FOR ANGULAR INTRA PREDICTION

CROSS-REFERENCE TO RELATED APPLICATIONS

The disclosure claims the benefits of priority to U.S. Provisional Application No. 63/092,224 filed on Oct. 15, 2020, and to U.S. Provisional Application No. 63/068,482 filed on Aug. 21, 2020, both of which are incorporated herein by reference in their entireties.

TECHNICAL FIELD

The present disclosure generally relates to video processing, and more particularly, to systems and methods for performing intra prediction.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and Audio Video coding Standard (AVS) standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for video processing. In some embodiments, an exemplary video processing method includes: performing an intra predicting process for a target block, wherein performing the intra predicting process comprises: determining an intra prediction mode for the target block; in response to the intra prediction mode is an angular mode, determining a filtered value by applying an N-tap interpolation filter to a plurality of reference samples surrounding the target block based on the angular mode, wherein N is an integer greater than 4; and determining a predicted value of a sample of the target block based on the filtered value.

Embodiments of the present disclosure provide a system for video or image processing. The system comprises: a memory storing a set of instructions; and one or more processors configured to execute the set of instructions to cause the system to perform an intra predicting process for a target block, the intra predicting process comprises: determining an intra prediction mode for the target block; in response to the intra prediction mode is a direct current (DC) mode or a plane mode, determining a base value based on a plurality of reference samples surrounding the target block; and determining a predicted value of a sample of the target block based on the base value and a first set of corresponding reference samples.

Embodiments of the present disclosure further provide a non-transitory computer readable medium that stores a set of instructions that is executable by one or more processors of an apparatus to cause the apparatus to initiate a method for video or image processing. The method comprises: performing an intra predicting process for a target block, the intra predicting process comprises: determining an intra prediction mode for the target block; in response to the intra prediction mode is a bilinear mode, determining a first value based on a weighted combination of a plurality of top reference samples and a second value based on a weighted combination of a plurality of left reference samples, wherein the plurality of the top reference samples includes more than one reference sample and the plurality of the left reference samples includes more than one reference sample; and determining a predicted value of a sample of the target block based on the first value and the second value.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
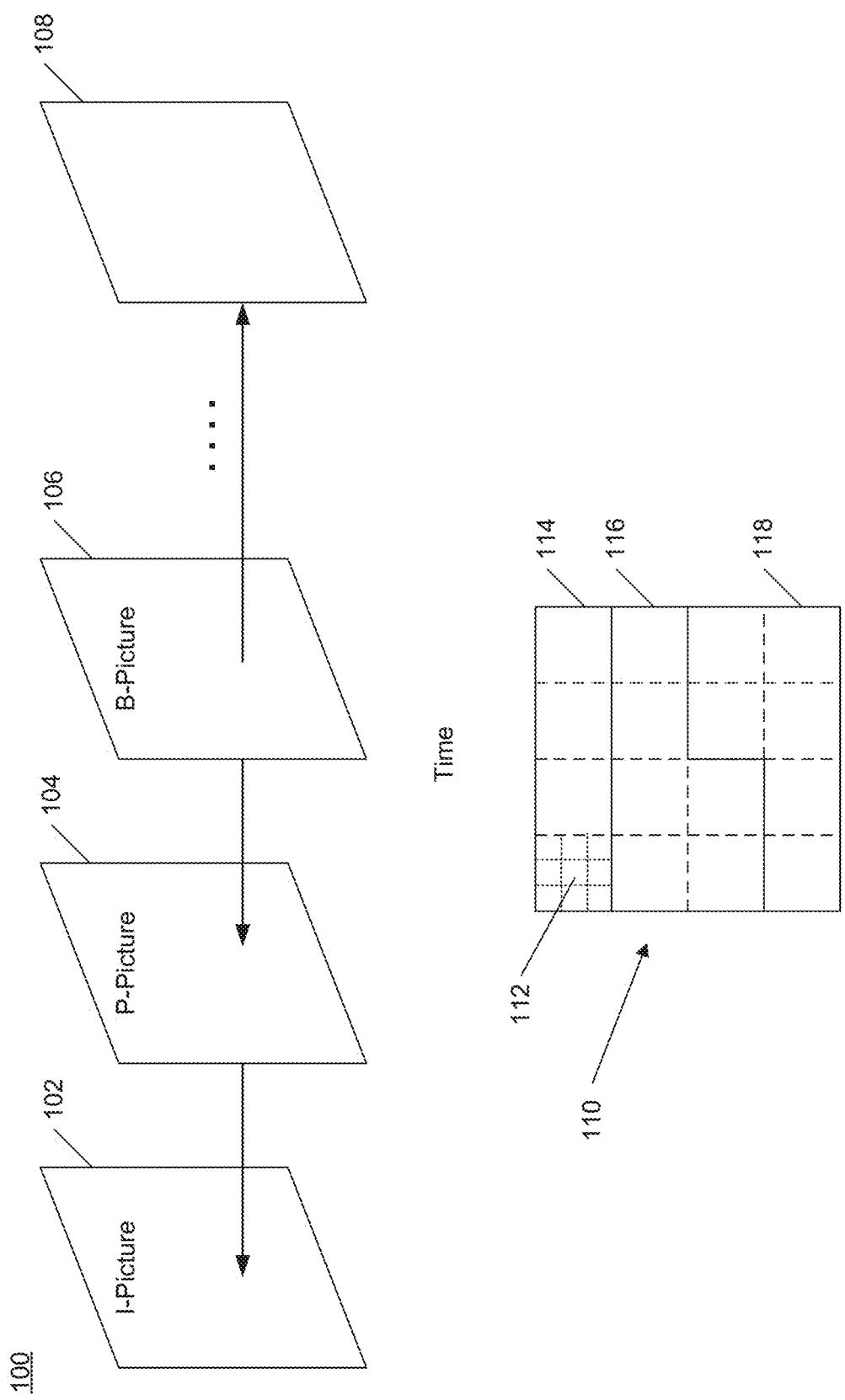
FIG. 1 shows structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Audio Video coding Standard (AVS) Workgroup which was founded in 2002 in China is currently developing the AVS3 video standard, a third generation of AVS video standard. The predecessor of AVS3 standard, AVS1 and AVS2 were issued as China national standard in the year of 2006 and 2016, respectively. In December of 2017, a call for proposals (CfP) was issued by AVS workgroup to formally start the development of the third generation of AVS standard AVS3. In December of 2018, High Performance Model (HPM) was chosen by the workgroup as a new reference software platform for AVS3 standard development. The initial technologies in HPM was inherited from AVS2 standard, and based on that, more and more new advanced video coding technologies were adopted to improve the compression performance. In the year of 2019, the first phase of AVS3 standard was finalized and got more than 20% coding performance gain compared with its predecessor AVS2, and the second phase of AVS3 standard is still being developed on top of the first phase of AVS3 to get further coding efficiency.

AVS3 standard is based on the same hybrid video coding system that has been used in modern video compression standards such as AVS1, AVS2, H.264/AVC, H.265/HEVC, etc.

A video is a set of static pictures (or frames) arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

To reduce the storage space and the transmission bandwidth needed by such applications, the video can be compressed. For example, the video can be compressed before storage and transmission and decompressed before the display. The compression and decompression can be implemented by software executed by a processor (e.g., a processor of a generic computer) or specialized hardware. The module or circuitry for compression is generally referred to as an "encoder," and the module or circuitry for decompression is generally referred to as a "decoder." The encoder and the decoder can be collectively referred to as a "codec." The encoder and the decoder can be implemented as any of a variety of suitable hardware, software, or a combination thereof. For example, the hardware implementation of the encoder and the decoder can include circuitry, such as one or more microprocessors, digital signal processors ("D SPs"), application-specific integrated circuits ("ASICs"), field-programmable gate arrays ("FPGAs"), discrete logic, or any combinations thereof. The software implementation of the encoder and the decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture. If information that was disregarded in the video encoding process cannot be fully reconstructed, the encoding process can be referred to as "lossy." Otherwise, it can be referred to as "lossless." Most encoding processes are lossy, which is a tradeoff to reduce the needed storage space and the transmission bandwidth.

In many cases, the useful information of a picture being encoded (referred to as a "current picture") can include changes with respect to a reference picture (e.g., a picture previously encoded or reconstructed). Such changes can include position changes, luminosity changes, or color changes of the pixels. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 shows structures of an example video sequence, according to some embodiments of the present disclosure. As shown in FIG. 1, video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
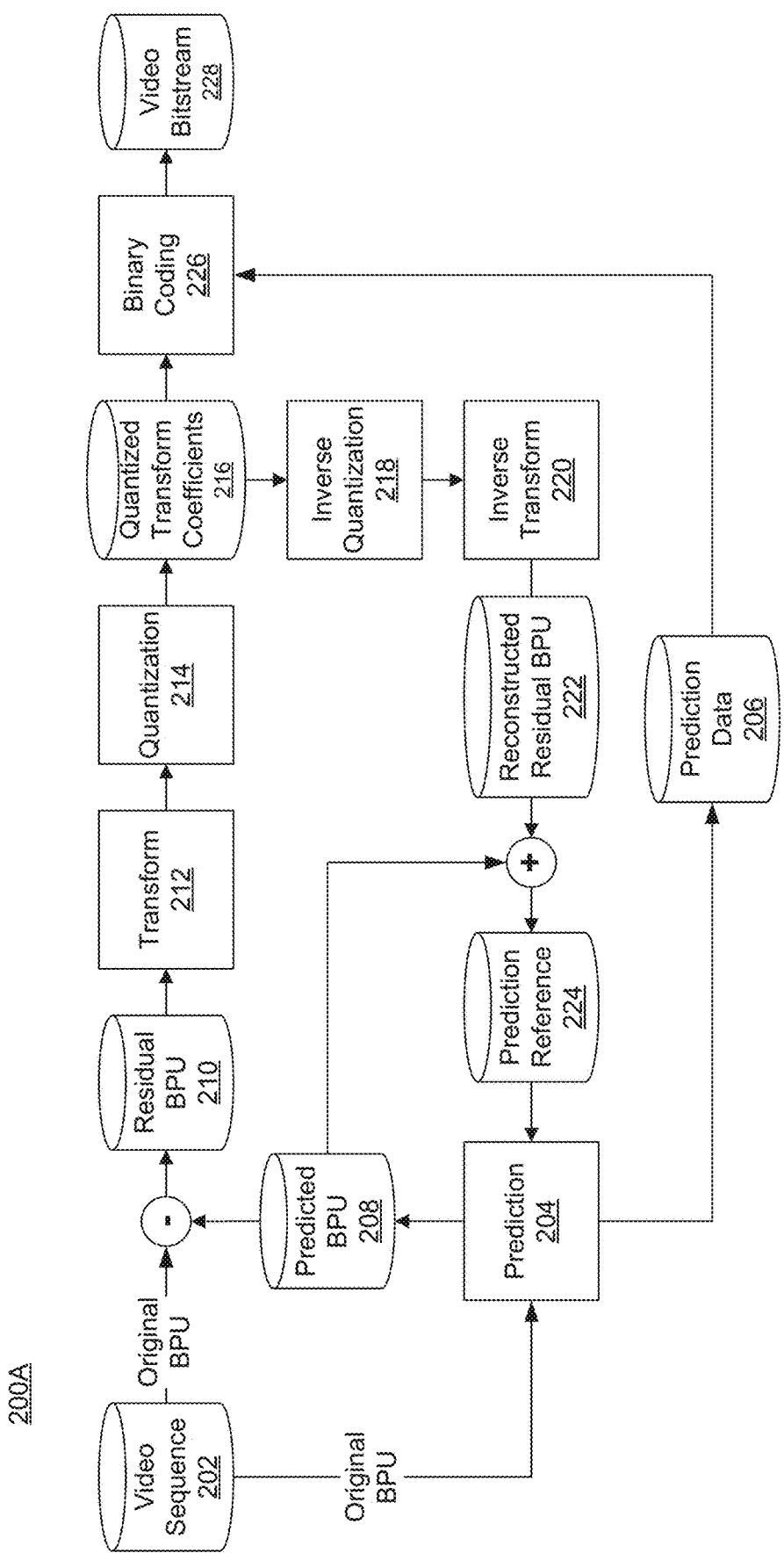
FIG. 2A shows a schematic of an example encoding process, according to some embodiments of the present disclosure.
Figure 2B:
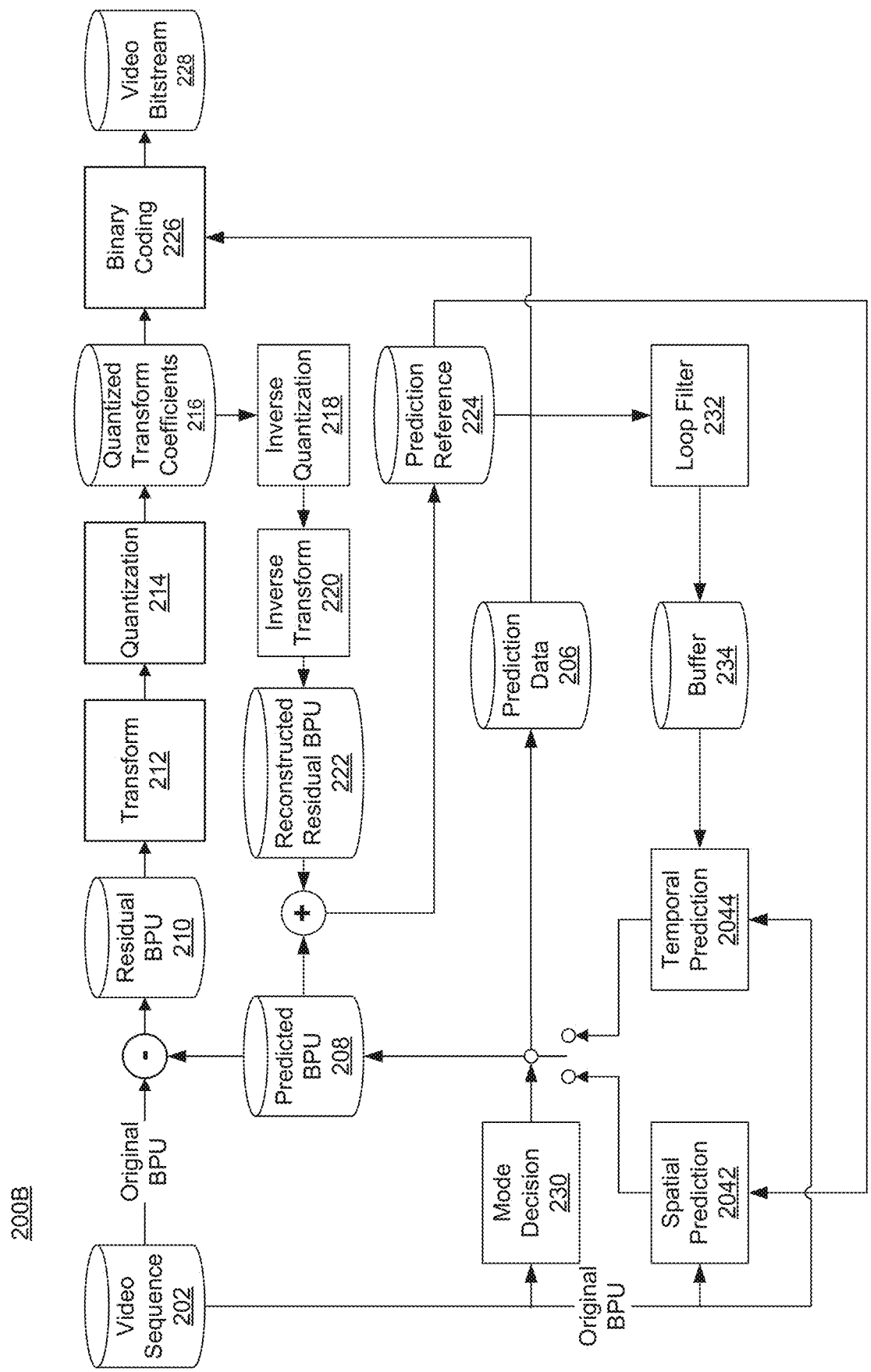
FIG. 2B shows a schematic of another example encoding process, according to some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A shows a schematic of an example encoding process, according to some embodiments of the present disclosure. For example, encoding process 200A shown in FIG. 2A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B shows a schematic of another example encoding process, according to some embodiments of the present disclosure. As shown in FIG. 2B, process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
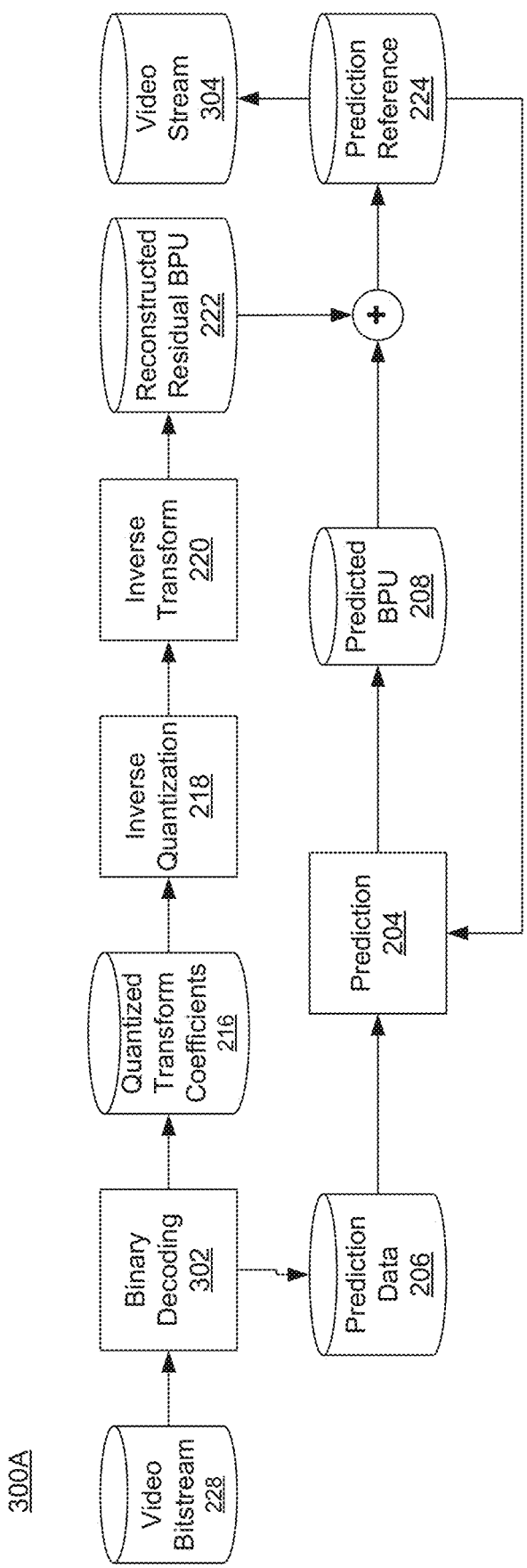
FIG. 3A shows a schematic of an example decoding process, according to some embodiments of the present disclosure.

FIG. 3A shows a schematic of an example decoding process, according to some embodiments of the present disclosure. As shown in FIG. 3A, process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
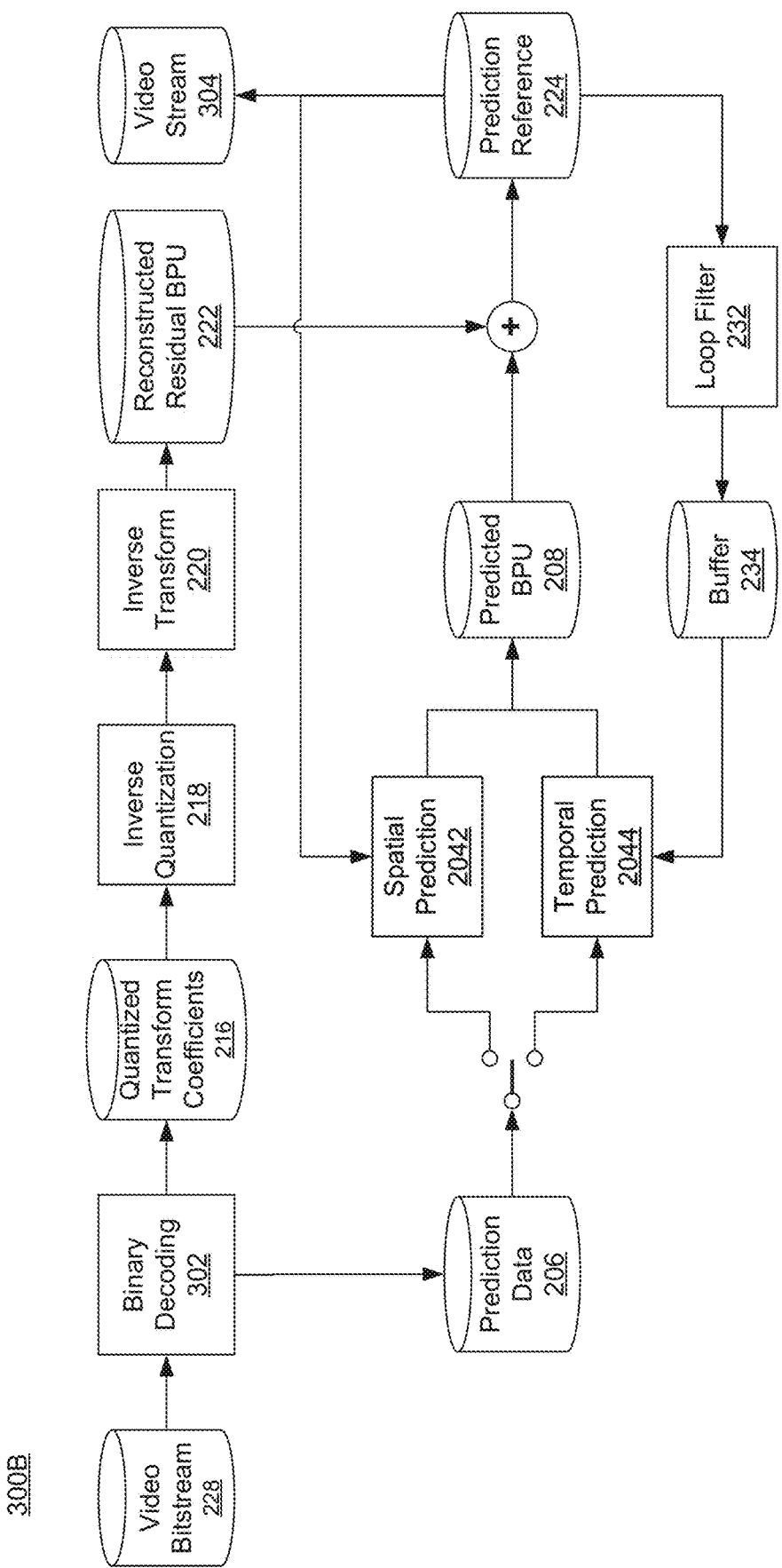
FIG. 3B shows a schematic of another example decoding process, according to some embodiments of the present disclosure.

FIG. 3B shows a schematic of another example decoding process, according to some embodiments of the present disclosure. As shown in FIG. 3B, process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

There can be four types of loop filters. For example, the loop filters can include a deblocking filter, a sample adaptive offsets ("SAO") filter, a luma mapping with chroma scaling ("LMCS") filter, and an adaptive loop filter ("ALF"). The order of applying the four types of loop filters can be the LMCS filter, the deblocking filter, the SAO filter, and the ALF. The LMCS filter can include two main components. The first component can be an in-loop mapping of the luma component based on adaptive piecewise linear models. The second component can be for the chroma components, and luma-dependent chroma residual scaling can be applied.

Figure 4:
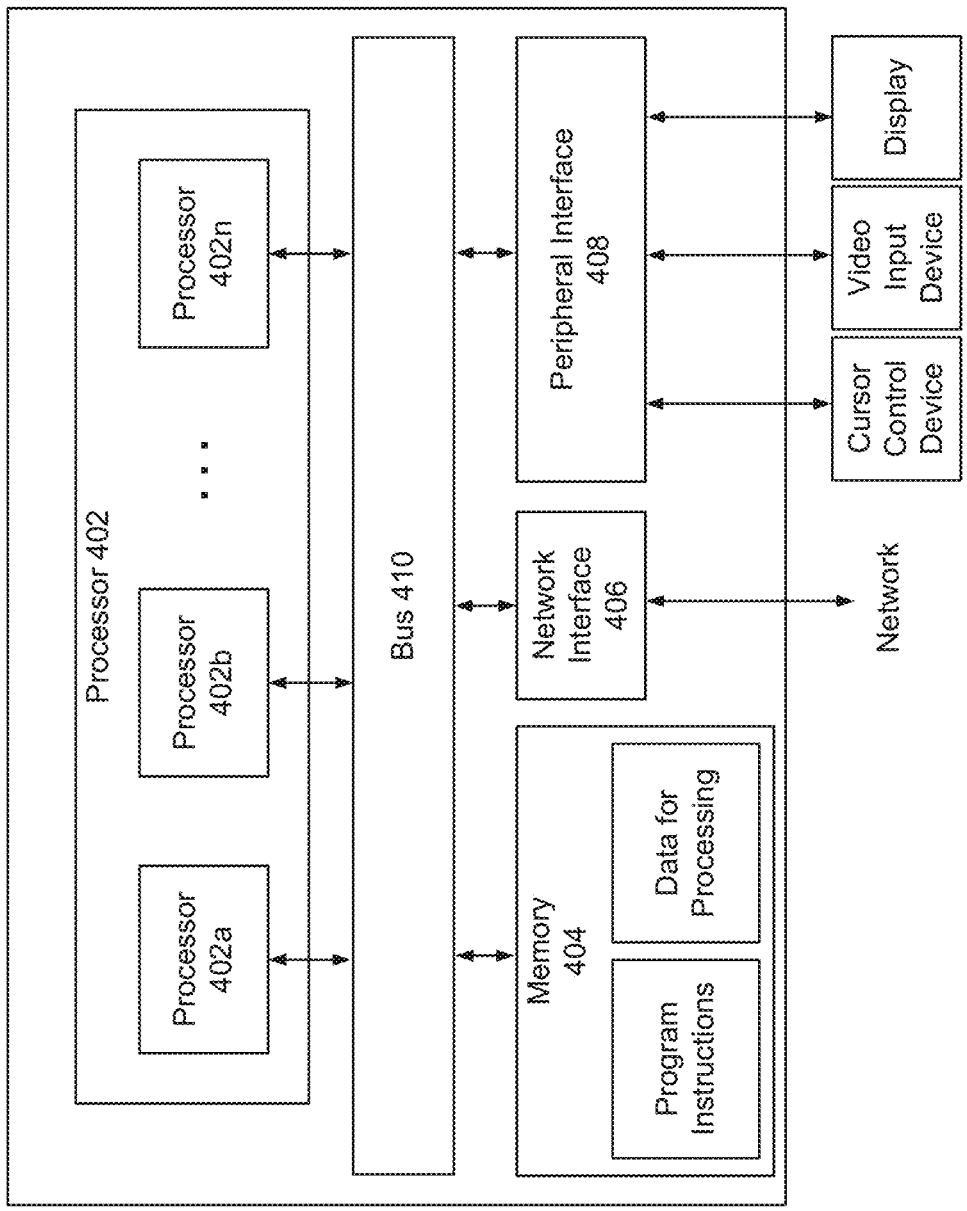
FIG. 4 shows a block diagram of an example apparatus for encoding or decoding a video, according to some embodiments of the present disclosure.

FIG. 4 shows a block diagram of an example apparatus for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field- Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface communicatively coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice can be signaled at the high level, for example, using init_qp_minus26 syntax element in the Picture Parameter Set (PPS) and using slice_qp_delta syntax element in the slice header. Further, the QP values can be adapted at the local level for each CU using delta QP values sent at the granularity of quantization groups.

Figure 5:
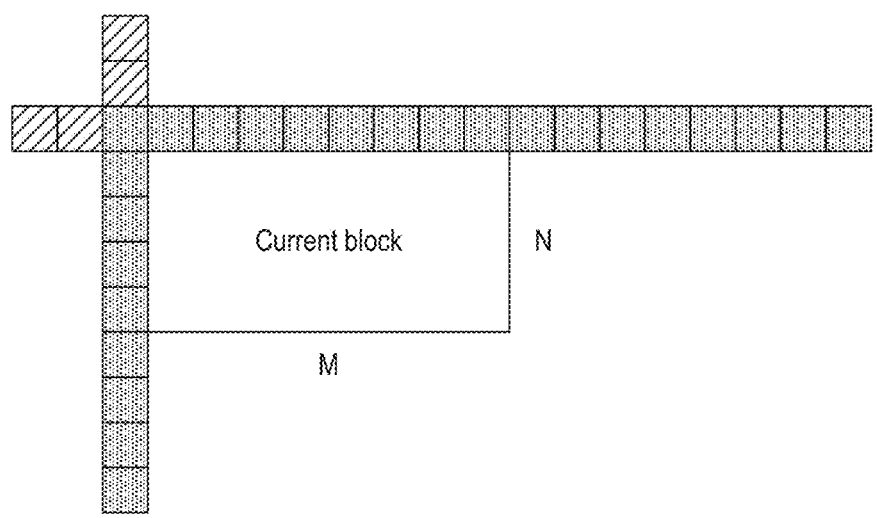
FIG. 5 is a schematic diagram illustrating reference blocks used in intra prediction, according to some embodiments of the present disclosure.

Regarding intra prediction, the spatial neighboring reconstructed samples are used as the reference samples to predict the sample value of the current block. Generally, as the coding order is from left to right and from top to bottom, the left neighboring reconstructed samples and the top neighboring reconstructed samples are usually already coded when the current block is coded. Thus, in intra prediction, the top neighbouring reconstructed samples, the top-right neighboring reconstructed samples, the top-left neighboring reconstructed samples, the left neighboring reconstructed samples and the bottom-left neighboring reconstructed samples are used as the reference samples for the current block. As shown in FIG. 5, the white block is the current block to be predicted with size of M×N, the blocks filled with pattern of dots are the reference samples that are the reconstructed samples of the neighboring block. In AVS3, the number of top reference samples is M, the number of top-right reference samples is M, the number of left reference samples is N, the number of bottom-left reference samples is N, the number of top-left reference samples are 1. Besides the reference samples with the pattern of dots, as shown in FIG. 5, the blocks filled with pattern of diagonal lines are also used as the reference samples that are padded from the samples filled with pattern of dots. There are two padded samples in the top row and two padded samples in the left column. The padded samples are also used as reference samples.

In this disclosure, the width of the current block is M, the height of the current block is N, the top reference samples are denoted as $r[1]$ to $r[M]$, the top-right reference samples are denoted as $r[M+1]$ to $r[2M]$; the left reference samples are denoted as $c[1]$ to $c[N]$, the bottom-left reference samples are denoted as $c[N+1]$ to $c[2N]$, the top-left reference sample is denoted as $r[0]$ or $c[0]$, the padded samples in top row are dented as $r[-1]$ and $r[-2]$, the padded samples in left column are denoted as $c[-1]$ and $c[-2]$.

In intra prediction, there are multiple prediction modes. In AVS3, there are 65 intra prediction modes, including Direct Current (DC) mode, plane mode, bilinear mode, and other 62 angular modes, which are described below in detail.

DC mode is a mode in which the direct current of the left reference samples and top reference samples is used for intra prediction. Specifically, if both left reference samples and top reference samples are available, the averaged value of left reference samples and top reference samples is used as the predicted value of all the samples in the current block. In some embodiments, if left reference samples are available and top reference samples are not available, the averaged value of left reference samples is used as the predicted value of all the samples in the current block. If left reference samples are not available and top reference samples are available, the averaged value of top reference samples is used as the predicted value of all the samples in the current block; and if both left reference samples and top reference sample are not available, the median value in the sample value range with the current bit-depth is used as the predicted value of all the samples in the current block.

Plane mode is a mode in which the predicted values of samples are all in a plane, i.e., the predicted value of each sample follows a two-dimension linear model. In some embodiments, the top reference samples and top-left reference sample are used to derive the slope in horizontal direction (picture width direction), and the left reference samples and top-left reference sample are used to derive the slope in vertical direction (picture height direction) as in Equations 1 and 2, wherein ib is the horizontal slope and ic is the vertical slope:

$$ib=((ih<<5)\times imh+(1<<(ish-1)))>>ish \quad \text{(Eq. 1)}$$

$$ic=((iv<<5)\times imv+(1<<(isv-1)))>>isv \quad \text{(Eq. 2)}$$

in which imh, imv, ish and isv are dependent on the size of the block and, in some embodiments, are defined as follows:
  imh=ibMult[Log(M)−2],
  ish=ibShift[Log(M)−2],
  imv=ibMult[Log(N)−2],
  isv=ibShift[Log(N)−2],
in which:
  ibMult[5]={13, 17, 5, 11, 23},
  ibShift[5]={7, 10, 11, 15, 19}.
Moreover, ih and iv can be derived based on the following Equations 3 and 4:

$$ih = \sum_{i=0}^{(M>>1)-1} (i+1)\times(r[(M>>1)+1+i]-r[(M>>1)-1-i]) \quad \text{(Eq. 3)}$$

$$iv = \sum_{i=0}^{(N>>1)-1} (i+1)\times(c[(N>>1)+1+i]-c[(N>>1)-1-i]) \quad \text{(Eq. 4)}$$

In some embodiments, the averaged value of a top-right sample and a bottom-left sample are used as the predicted value of center sample in the current block based on Equation 5:

$$is=(r[M]+c[N])<<(5-1)=(r[M]+c[N])<<4 \quad \text{(Eq. 5)}$$

in which is is the averaged value after right shifting 5 bits.

In some embodiments, based on the center value of the slope in two directions, the predicted values of all the samples in the current block are derived based on Equation 6:

$$\text{Pred}[x][y]=(ia+(x-((M>>1)-1))\times ib+(y-((N>>1)-1))\times ic+16)>>5 \; (x=0\sim M-1, y=0\sim N-1) \quad \text{(Eq. 6)}$$

in which Pred[x][y] is the predicted value of sample located in (x, y) in the current block.

Figure 6:
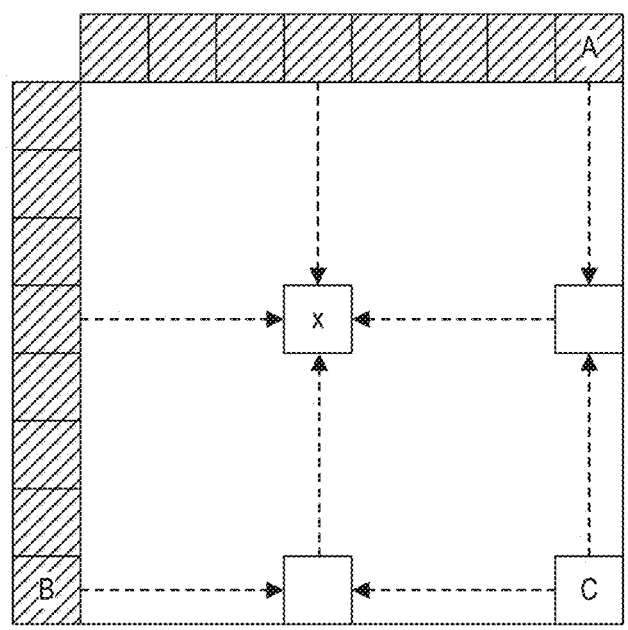
FIG. 6 is a schematic diagram illustrating a bilinear mode in intra prediction, according to some embodiments of the present disclosure.

In the following description for the bilinear mode, the predicted value of bilinear mode is the weighted averaged value of two linear interpolated values. As shown in FIG. 6, the predicted value of bottom-right corner sample C of the current block is the weighted averaged of the top-right reference sample A and the bottom-left reference sample B according to the distance from A to C and the distance from B to C. For the right boundary, the predicted value is generated by weighted averaging the reference sample A and the predicted value of the corner sample C according to the distance between the predicted sample and the reference sample A and the distance between the predicted sample and the corner sample C. For the bottom boundary samples, the predicted value is generated by weighted averaging the reference sample B and the predicted value of the corner sample C according to the distance between the predicted sample and the reference sample B and the distance between the predicted sample and the corner sample C. Remaining samples located within the block are then predicted by weighted averaging the predicted values of the horizontal linear prediction and vertical linear prediction. The predicted value of horizontal linear prediction is generated by weighted averaging the horizontally corresponding left reference sample and the right boundary sample according to the distance from the current predicted sample to the corresponding left reference sample and the distance from the current predicted sample to the corresponding right boundary sample. The predicted value of vertical linear prediction is generated by weighted averaging the vertically corresponding top reference sample and the bottom boundary sample according to the distance from current predicted sample to the corresponding top reference sample and the distance from the current predicted sample to the corresponding bottom boundary sample.

The prediction process could be described based on the following Equation 7:

$$\text{Pred}[x][y]=((((ia-c[y+1])\times(x+1))<<\text{Log}(N))+(((ib-r[x+1])\times(y+1))<<\text{Log}(M))+((r[x+1]+c[y+1])<<(\text{Log}(M)+\text{Log}(N)))+((ic<<1)-ia-ib)\times x\times y+(1<<(\text{Log}(M)+\text{Log}(N))))>>(\text{Log}(M)+\text{Log}(N)+1), \\ (x=0\sim M-1, y=0\sim N-1) \quad \text{(Eq. 7)}$$

(if M is equal to N)

For example, ia denotes sample A and is equal to r[M], ib denotes sample B and is equal to c[N], ic denotes the predicted sample C. If M is equal to N, ic=(ia+ib+1)>>1; otherwise ic=(((ia<<Log(M))+(ib<<Log(N)))×weight+(1<<(ishift+5)))>>(ishift+6), wherein ishift=Log(Min(M, N)), weight=bilinearWeight[Log(Max(M, N)/Min(M, N))−1], bilinearWeight[3]={21, 13, 7}

Figure 7:
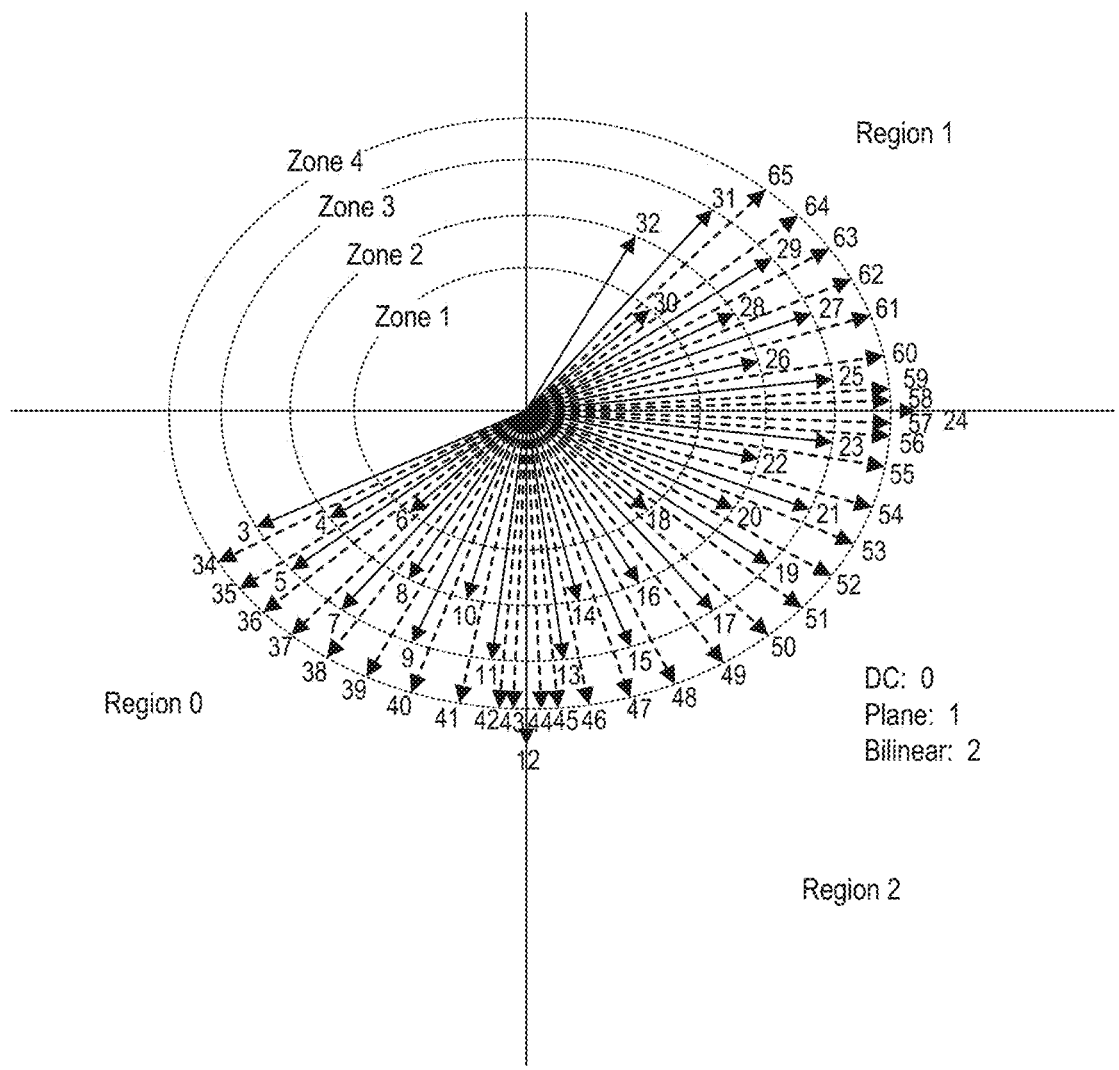
FIG. 7 is a schematic diagram illustrating prediction directions in an angular mode, according to some embodiments of the present disclosure.

In some embodiments, the predicted value is generated by directional extrapolation or interpolation of the reference samples in the angular mode. In AVS3, there are 63 different directions, which are shown in FIG. 7. The arrows in the FIG. 7 represent the predicted directions which are from the reference samples to the predicted sample. Each angular prediction mode has a different predicted direction.

In some embodiments, the reference position referring to the current sample is calculated by predicting along with a certain direction. For example, the predicted direction can be a direction, between the reference position and the current sample, close to a horizontal direction. Another example, the predicted direction can be a direction, between the reference position and the current sample, close to vertical direction. Then, a reference sample value of that position is interpolated by using the surrounding four integer reference samples.

Figure 8:
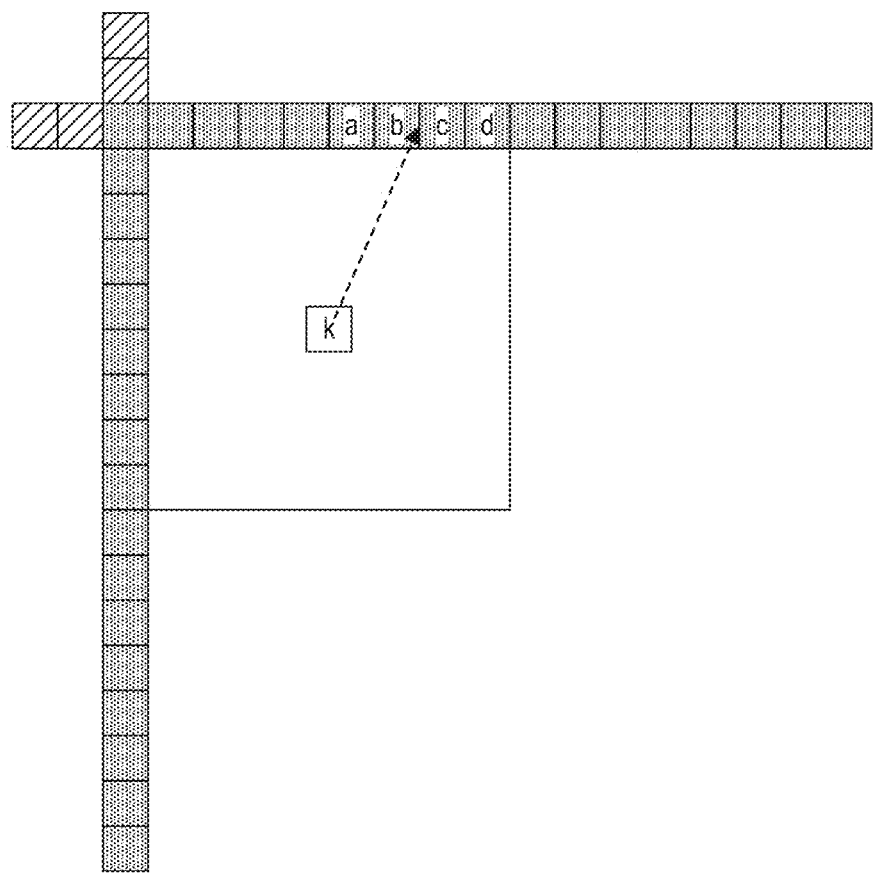
FIG. 8 is a schematic diagram illustrating an angular mode in intra prediction, according to some embodiments of the present disclosure.

As in FIG. 8, the current sample is K, and the sample K refers to a position between integer reference sample b and the integer reference sample c in the top reference sample row in the current predicted direction. Then, the reference samples a, b, c and d are used to derive the predicted value of the sample k based on Equation 8:

$$\text{Pred}_k=(f_0\times a+f_1\times b+f_2\times c+f_3\times d)>>\text{shift} \quad \text{(Eq. 8)}$$

For example, $\text{Pred}_k$ is the predicted value of sample K, $f_0$, $f_1$, $f_2$ and $f_3$ are interpolation filter coefficients which are decided by the sub-pel position to be interpolated and the "shift" is the right shift number which depends on the sum of $f_0$ to $f_3$. As different sub-pel positions correspond to different filters (i.e., different filter coefficients), intra prediction methods need a set of filters.

In AVS3, the set of interpolation filters are determined by the block area and the index of row/column. In some embodiments, a threshold equal to 64 is used to distinguish small blocks and large blocks. The small blocks and the large blocks use different sets of interpolation filters. In some embodiments, different rows/columns may use different sets of interpolation filters. If the predicted direction of the current prediction mode is closer to the vertical direction than the horizontal direction, the first row and the remaining rows use different sets of interpolation filters. In some embodiments, if the current prediction is closer to the horizontal direction than the vertical direction, the first column and the remaining columns use different sets of interpolation filters.

The present disclosure provides methods for improving the angular mode in intra prediction.

In AVS3, 4-tap interpolation filter is used to generate the predicted value of intra-predicted samples. For some smooth blocks, the cut-off frequency of 4-tap filter may be too high. Thus, in some embodiments, long-tap interpolation filter can be used with a tap number larger than 4. For example, an 8-tap interpolation filter can be used.

Figure 9:
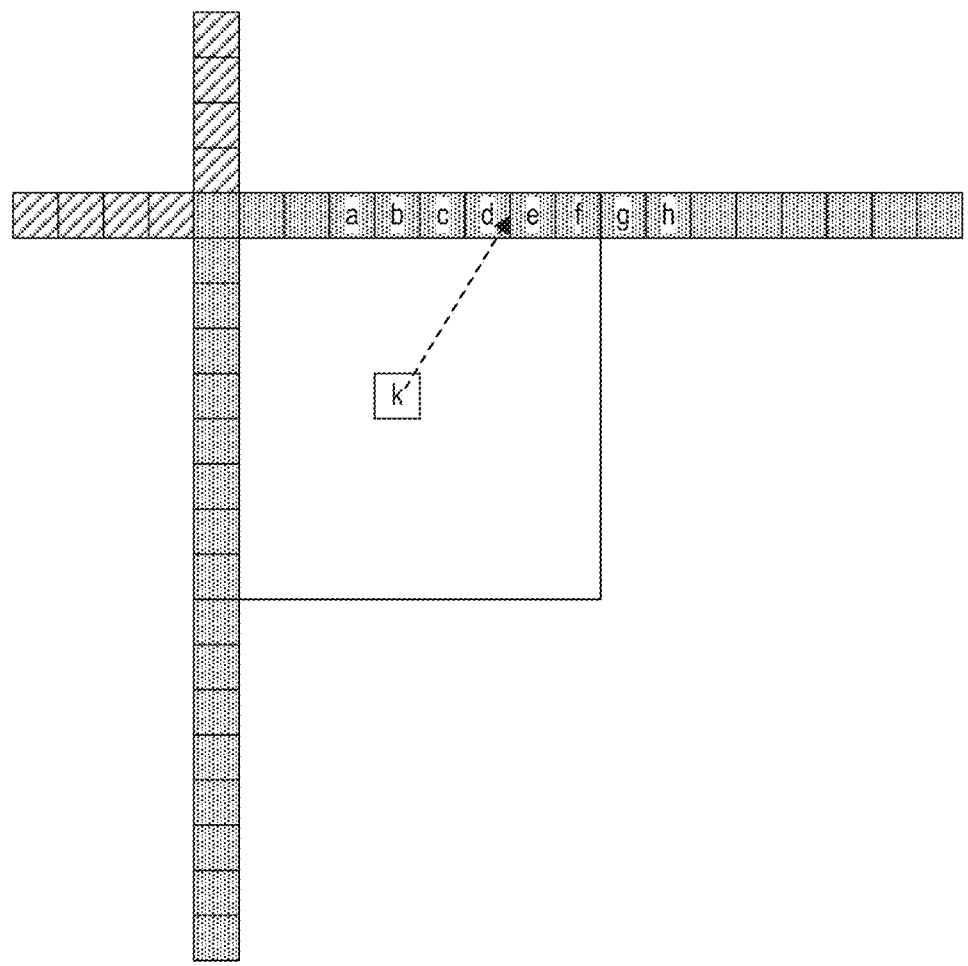
FIG. 9 is a schematic diagram illustrating an angular mode in intra prediction, according to some embodiments of the present disclosure.

As shown in FIG. 9, the 8 integer reference samples, a, b, c, d, e, f, g, h, surrounding the reference position referred to by the sample to be predicted are used to generate the predicted value of the sample, according to Equation (9):

$$Pred_k = (f_0 \times a + f_1 \times b + f_2 \times c + f_3 \times d + f_4 \times e + f_5 \times f + f_6 \times g + f_7 \times h + \text{offset}) >> \text{shift} \quad \text{(Eq. 9)}$$

where $Pred_k$ is the predicted value of sample K, $f_0$, $f_1$, $f_2$, $f_3$, $f_4$, $f_5$, $f_6$ and $f_7$ are interpolation filter coefficients and "shift" is the right shift number. In some embodiments, the sum of $f_0$ to $f_7$ is equal to shift-th power of 2, and offset is equal to (shift−1)-th power of 2. In this embodiment, the precision of the sub-pel position is 1/32 pixel. Since each sub-pel position has different interpolation filters, there are 32 filters in a set of filter.

In some embodiments, there are multiple sets of interpolation filters and each set contains 32 filters, each filter for each sub-pel position. Dependent on the block area and row/column index, one set of filters is selected from these multiple sets. For example, filter index is determined based on the following Equation (10):

$$\text{filter\_idx} = \text{multiple\_filter\_enabled?:}(j<TH0?(M \times N<TH1)+1:(M \times N<TH1)):3 \quad \text{(Eq. 10)},$$

where Eq. 10 may be reformatted as the following equation (Eq. 10a):

$$\text{filter\_idx} = \text{multiple\_filter\_enabled?:}(j<TH0?(M \times N<TH1?a:b):(M \times N<TH1?b:c)):d \quad \text{(Eq. 10a)}$$

wherein a, b, c, and d are four difference indices.

For example, filter_idx is the index of filter set, M is the width of the block, N is the height of the block, j is index of the row/column where the current sample is in, TH0 and TH1 are two thresholds, and multiple_filter_enabled is a flag signaled in the sequence header. For example, TH0 is set to 1 for luma block and 2 for chroma block, and TH1 is set to 64 for luma block and 32 for chroma block. For the current predicted direction, if the top and top-left reference samples are used to generate predicted values in the current predicted direction, j is the row index; if the left and bottom-left reference samples are used to generate predicted values, j is the column index. Alternatively, if the predicted direction of the current prediction mode is closer to the vertical direction than the horizontal direction, j is the row index; and if the current prediction is closer to the horizontal direction than the vertical direction, j is the column index.

To support 8-tap interpolation, as shown in FIG. 9, four samples filled with pattern of diagonal lines are padded in the top reference row, with r[−1] being euqal to c[1], r[−2] being equal to c[2], r[−3] being equal to c[3], and r[−4] being equal to c[4]. Moreover, four other samples filled with pattern of diagonal lines are padded in the left reference column, with c[−1] being equal to r[1], c[−2] being equal to r[2], c[−3] being equal to r[3], and c[−4] being equal to r[4].

For example, a first set of exemplary 8-tap filters are as follows:
{483, 3171, 7631, 10030, 7623, 3221, 567, 42},
{441, 3045, 7497, 10030, 7757, 3347, 609, 42},
{399, 2919, 7363, 10030, 7891, 3473, 651, 42},
{378, 2835, 7254, 10005, 7983, 3578, 693, 42},
{336, 2688, 7078, 9980, 8142, 3746, 756, 42},
{315, 2604, 6969, 9955, 8234, 3851, 798, 42},
{273, 2457, 6793, 9930, 8393, 4019, 861, 42},
{252, 2373, 6684, 9905, 8485, 4124, 903, 42},
{231, 2268, 6533, 9855, 8602, 4271, 966, 42},
{210, 2184, 6424, 9830, 8694, 4376, 1008, 42},
{189, 2079, 6273, 9780, 8811, 4523, 1071, 42},
{168, 1974, 6101, 9688, 8903, 4695, 1176, 63},
{147, 1869, 5950, 9638, 9020, 4842, 1239, 63},
{126, 1785, 5841, 9613, 9112, 4947, 1281, 63},
{126, 1722, 5694, 9496, 9162, 5098, 1386, 84},
{105, 1617, 5543, 9446, 9279, 5245, 1449, 84},
{84, 1512, 5392, 9396, 9396, 5392, 1512, 84},
{84, 1449, 5245, 9279, 9446, 5543, 1617, 105},
{84, 1386, 5098, 9162, 9496, 5694, 1722, 126},
{63, 1281, 4947, 9112, 9613, 5841, 1785, 126},
{63, 1239, 4842, 9020, 9638, 5950, 1869, 147},
{63, 1176, 4695, 8903, 9688, 6101, 1974, 168},
{42, 1071, 4523, 8811, 9780, 6273, 2079, 189},
{42, 1008, 4376, 8694, 9830, 6424, 2184, 210},
{42, 966, 4271, 8602, 9855, 6533, 2268, 231},
{42, 903, 4124, 8485, 9905, 6684, 2373, 252},
{42, 861, 4019, 8393, 9930, 6793, 2457, 273},
{42, 798, 3851, 8234, 9955, 6969, 2604, 315},
{42, 756, 3746, 8142, 9980, 7078, 2688, 336},
{42, 693, 3578, 7983, 10005,7254, 2835, 378},
{42, 651, 3473, 7891, 10030,7363, 2919, 399},
{42, 609, 3347, 7757, 10030, 7497, 3045, 441}
A second set of exemplary 8-tap filters are as follows:
{231, 2919, 7898, 10756, 7902, 2894, 189, −21},
{189, 2772, 7722, 10731, 8061, 3062, 252, −21},
{147, 2646, 7609, 10773, 8220, 3163, 252, −42},
{126, 2541, 7458, 10723, 8337, 3310, 315, −42},
{84, 2394, 7303, 10740, 8521, 3453, 336, −63},
{42, 2226, 7085, 10690, 8705, 3663, 420, −63},
{21, 2142, 6997, 10707, 8822, 3743, 420, −84},
{0, 2016, 6804, 10632, 8964, 3932, 504, −84},
{−21, 1911, 6653, 10582, 9081, 4079, 567, −84},
{−42, 1806, 6523, 10574, 9223, 4201, 588, −105},
{−63, 1680, 6330, 10499, 9365, 4390, 672, −105},
{−84, 1554, 6137, 10424, 9507, 4579, 756, −105},
{−84, 1491, 6032, 10391, 9607, 4680, 777, −126},
{−105, 1365, 5839, 10316, 9749, 4869, 861, −126},
{−105, 1302, 5713,10241, 9824, 4995, 924, −126},
{−126, 1176, 5520, 10166, 9966, 5184, 1008, −126},
{−126, 1092, 5352, 10066, 10066, 5352, 1092, −126},
{−126, 1008, 5184, 9966, 10166, 5520, 1176, −126},
{−126, 924, 4995, 9824, 10241, 5713, 1302, −105},
{−126, 861, 4869, 9749, 10316, 5839, 1365, −105}, {−126, 777, 4680, 9607, 10391, 6032, 1491, −84},
{−105, 756, 4579, 9507, 10424, 6137, 1554, −84},
{−105, 672, 4390, 9365, 10499, 6330, 1680, −63},
{−105, 588, 4201, 9223, 10574, 6523, 1806, −42},
{−84, 567, 4079, 9081, 10582, 6653, 1911, −21},
{−84, 504, 3932, 8964, 10632, 6804, 2016, 0},
{−84, 420, 3743, 8822, 10707, 6997, 2142, 21},
{−63, 420, 3663, 8705, 10690, 7085, 2226, 42},
{−63, 336, 3453, 8521, 10740, 7303, 2394, 84},
{−42, 315, 3310, 8337, 10723, 7458, 2541, 126},
{−42, 252, 3163, 8220, 10773, 7609, 2646, 147},
{−21, 252, 3062, 8061, 10731, 7722, 2772, 189},
A third set of exemplary 8-tap filters are as follows:
{0, 1344, 4032, 5632, 4032, 1344, 0, 0},
{−21, 1260, 3923, 5607, 4124, 1449, 42, 0},
{−42, 1176, 3814, 5582, 4216, 1554, 84, 0},
{−42, 1134, 3751, 5574, 4291, 1613, 84, −21},
{−42, 1092, 3688, 5566, 4366, 1672, 84, −42},
{−63, 1008, 3579, 5541, 4458, 1777, 126, −42},
{−84, 924, 3470, 5516, 4550, 1882, 168, −42},
{−84, 903, 3428, 5491, 4575, 1924, 189, −42},
{−84, 882, 3386, 5466, 4600, 1966, 210, −42},
{−105, 798, 3277, 5441, 4692, 2071, 252, −42},
{−126, 714, 3168, 5416, 4784, 2176, 294, −42},
{−126, 651, 3063, 5383, 4884, 2277, 315, −63},
{−126, 588, 2958, 5350, 4984, 2378, 336, −84},
{−105, 609, 2941, 5300, 4967, 2399, 357, −84},
{−84, 630, 2924, 5250, 4950, 2420, 378, −84},
{−84, 567, 2798, 5175, 5025, 2546, 441, −84},
{−84, 504, 2672, 5100, 5100, 2672, 504, −84},
{−84, 441, 2546, 5025, 5175, 2798, 567, −84},
{−84, 378, 2420, 4950, 5250, 2924, 630, −84},
{−84, 357, 2399, 4967, 5300, 2941, 609, −105},
{−84, 336, 2378, 4984, 5350, 2958, 588, −126},
{−63, 315, 2277, 4884, 5383, 3063, 651, −126},
{−42, 294, 2176, 4784, 5416, 3168, 714, −126},
{−42, 252, 2071, 4692, 5441, 3277, 798, −105},
{−42, 210, 1966, 4600, 5466, 3386, 882, −84},
{−42, 189, 1924, 4575, 5491, 3428, 903, −84},
{−42, 168, 1882, 4550, 5516, 3470, 924, −84},
{−42, 126, 1777, 4458, 5541, 3579, 1008, −63},
{−42, 84, 1672, 4366, 5566, 3688, 1092, −42},
{−21, 84, 1613, 4291, 5574, 3751, 1134, −42},
{0, 84, 1554, 4216, 5582, 3814, 1176, −42},
{0, 42, 1449, 4124, 5607, 3923, 1260, −21},
A fourth set of exemplary 8-tap filters are as follows:
{672, 3360, 7520, 9664, 7520, 3360, 672, 0},
{651, 3276, 7390, 9597, 7587, 3490, 756, 21},
{630, 3192, 7260, 9530, 7654, 3620, 840, 42},
{609, 3108, 7130, 9463, 7721, 3750, 924, 63},
{588, 3024, 7000, 9396, 7788, 3880, 1008, 84},
{567, 2940, 6870, 9329, 7855, 4010, 1092, 105},
{546, 2856, 6740, 9262, 7922, 4140, 1176, 126},
{525, 2772, 6610, 9195, 7989, 4270, 1260, 147},
{504, 2688, 6480, 9128, 8056, 4400, 1344, 168},
{483, 2604, 6350, 9061, 8123, 4530, 1428, 189},
{462, 2520, 6220, 8994, 8190, 4660, 1512, 210},
{441, 2436, 6090, 8927, 8257, 4790, 1596, 231},
{420, 2352, 5960, 8860, 8324, 4920, 1680, 252},
{399, 2268, 5830, 8793, 8391, 5050, 1764, 273},
{378, 2184, 5700, 8726, 8458, 5180, 1848, 294},
{357, 2100, 5570, 8659, 8525, 5310, 1932, 315},
{336, 2016, 5440, 8592, 8592, 5440, 2016, 336},
{315, 1932, 5310, 8525, 8659, 5570, 2100, 357},
{294, 1848, 5180, 8458, 8726, 5700, 2184, 378},
{273, 1764, 5050, 8391, 8793, 5830, 2268, 399},
{252, 1680, 4920, 8324, 8860, 5960, 2352, 420},
{231, 1596, 4790, 8257, 8927, 6090, 2436, 441},
{210, 1512, 4660, 8190, 8994, 6220, 2520, 462},
{189, 1428, 4530, 8123, 9061, 6350, 2604, 483},
{168, 1344, 4400, 8056, 9128, 6480, 2688, 504},
{147, 1260, 4270, 7989, 9195, 6610, 2772, 525},
{126, 1176, 4140, 7922, 9262, 6740, 2856, 546},
{105, 1092, 4010, 7855, 9329, 6870, 2940, 567},
{84, 1008, 3880, 7788, 9396, 7000, 3024, 588},
{63, 924, 3750, 7721, 9463, 7130, 3108, 609},
{42, 840, 3620, 7654, 9530, 7260, 3192, 630},
{21, 756, 3490, 7587, 9597, 7390, 3276, 651}
{0, 42, 1449, 4124, 5607, 3923, 1260, −21},
In another example of this embodiment, a first set of exemplary 8-tap filters are as follows:
{253, 1615, 3785, 4994, 3781, 1641, 293, 22},
{231, 1553, 3719, 4994, 3847, 1703, 315, 22},
{209, 1491, 3653, 4994, 3913, 1765, 337, 22},
{198, 1449, 3600, 4981, 3959, 1816, 359, 22},
{176, 1376, 3514, 4968, 4038, 1898, 392, 22},
{165, 1334, 3461, 4955, 4084, 1949, 414, 22},
{143, 1261, 3375, 4942, 4163, 2031, 447, 22},
{132, 1219, 3322, 4929, 4209, 2082, 469, 22},
{121, 1166, 3249, 4903, 4268, 2153, 502, 22},
{110, 1124, 3196, 4890, 4314, 2204, 524, 22},
{99, 1071, 3123, 4864, 4373, 2275, 557, 22},
{88, 1018, 3039, 4818, 4419, 2359, 610, 33},
{77, 965, 2966, 4792, 4478, 2430, 643, 33},
{66, 923, 2913, 4779, 4524, 2481, 665, 33},
{66, 890, 2842, 4720, 4550, 2554, 718, 44},
{55, 837, 2769, 4694, 4609, 2625, 751, 44},
{44, 784, 2696, 4668, 4668, 2696, 784, 44},
{44, 751, 2625, 4609, 4694, 2769, 837, 55},
{44, 718, 2554, 4550, 4720, 2842, 890, 66},
{33, 665, 2481, 4524, 4779, 2913, 923, 66},
{33, 643, 2430, 4478, 4792, 2966, 965, 77},
{33, 610, 2359, 4419, 4818, 3039, 1018, 88},
{22, 557, 2275, 4373, 4864, 3123, 1071, 99},
{22, 524, 2204, 4314, 4890, 3196, 1124, 110},
{22, 502, 2153, 4268, 4903, 3249, 1166, 121},
{22, 469, 2082, 4209, 4929, 3322, 1219, 132},
{22, 447, 2031, 4163, 4942, 3375, 1261, 143},
{22, 414, 1949, 4084, 4955, 3461, 1334, 165},
{22, 392, 1898, 4038, 4968, 3514, 1376, 176},
{22, 359, 1816, 3959, 4981, 3600, 1449, 198},
{22, 337, 1765, 3913, 4994, 3653, 1491, 209},
{22, 315, 1703, 3847, 4994, 3719, 1553, 231},
A second set of exemplary 8-tap filters are as follows:
{121, 1507, 3902, 5366, 3904, 1494, 101, −11},
{99, 1434, 3816, 5353, 3983, 1576, 134, −11},
{77, 1372, 3761, 5373, 4062, 1625, 136, −22},
{66, 1319, 3688, 5347, 4121, 1696, 169, −22},
{44, 1246, 3613, 5354, 4213, 1765, 182, −33},
{22, 1162, 3507, 5328, 4305, 1867, 226, −33},
{11, 1120, 3465, 5335, 4364, 1905, 228, −44},
{0, 1056, 3372, 5296, 4436, 1996, 272, −44},
{−11, 1003, 3299, 5270, 4495, 2067, 305, −44},
{−22, 950, 3237, 5264, 4567, 2125, 318, −55},
{−33, 886, 3144, 5225, 4639, 2216, 362, −55},
{−44, 822, 3051, 5186, 4711, 2307, 406, −55},
{−44, 789, 3002, 5167, 4763, 2354, 419, −66},
{−55, 725, 2909, 5128, 4835, 2445, 463, −66},
{−55, 692, 2849, 5089, 4874, 2505, 496, −66},
{−66, 628, 2756, 5050, 4946, 2596, 540, −66},
{−66, 584, 2676, 4998, 4998, 2676, 584, −66},
{−66, 540, 2596, 4946, 5050, 2756, 628, −66},
{−66, 496, 2505, 4874, 5089, 2849, 692, −55},
{−66, 463, 2445, 4835, 5128, 2909, 725, −55}, {−66, 419, 2354, 4763, 5167, 3002, 789, −44},
{−55, 406, 2307, 4711, 5186, 3051, 822, −44},
{−55, 362, 2216, 4639, 5225, 3144, 886, −33},
{−55, 318, 2125, 4567, 5264, 3237, 950, −22},
{−44, 305, 2067, 4495, 5270, 3299, 1003, −11},
{−44, 272, 1996, 4436, 5296, 3372, 1056, 0},
{−44, 228, 1905, 4364, 5335, 3465, 1120, 11},
{−33, 226, 1867, 4305, 5328, 3507, 1162, 22},
{−33, 182, 1765, 4213, 5354, 3613, 1246, 44},
{−22, 169, 1696, 4121, 5347, 3688, 1319, 66},
{−22, 136, 1625, 4062, 5373, 3761, 1372, 77},
{−11, 134, 1576, 3983, 5353, 3816, 1434, 99},
A third set of exemplary 8-tap filters are as follows:
{0, 704, 1984, 2816, 1984, 704, 0, 0},
{−11, 662, 1931, 2803, 2030, 755, 22, 0},
{−22, 620, 1878, 2790, 2076, 806, 44, 0},
{−22, 598, 1849, 2784, 2115, 833, 46, −11},
{−22, 576, 1820, 2778, 2154, 860, 48, −22},
{−33, 534, 1767, 2765, 2200, 911, 70, −22},
{−44, 492, 1714, 2752, 2246, 962, 92, −22},
{−44, 481, 1694, 2739, 2259, 982, 103, −22},
{−44, 470, 1674, 2726, 2272, 1002, 114, −22},
{−55, 428, 1621, 2713, 2318, 1053, 136, −22},
{−66, 386, 1568, 2700, 2364, 1104, 158, −22},
{−66, 353, 1519, 2681, 2416, 1151, 171, −33},
{−66, 320, 1470, 2662, 2468, 1198, 184, −44},
{−55, 329, 1463, 2636, 2461, 1207, 195, −44},
{−44, 338, 1456, 2610, 2454, 1216, 206, −44},
{−44, 305, 1396, 2571, 2493, 1276, 239, −44},
{−44, 272, 1336, 2532, 2532, 1336, 272, −44},
{−44, 239, 1276, 2493, 2571, 1396, 305, −44},
{−44, 206, 1216, 2454, 2610, 1456, 338, −44},
{−44, 195, 1207, 2461, 2636, 1463, 329, −55},
{−44, 184, 1198, 2468, 2662, 1470, 320, −66},
{−33, 171, 1151, 2416, 2681, 1519, 353, −66},
{−22, 158, 1104, 2364, 2700, 1568, 386, −66},
{−22, 136, 1053, 2318, 2713, 1621, 428, −55},
{−22, 114, 1002, 2272, 2726, 1674, 470, −44},
{−22, 103, 982, 2259, 2739, 1694, 481, −44},
{−22, 92, 962, 2246, 2752, 1714, 492, −44},
{−22, 70, 911, 2200, 2765, 1767, 534, −33},
{−22, 48, 860, 2154, 2778, 1820, 576, −22},
{−11, 46, 833, 2115, 2784, 1849, 598, −22},
{0, 44, 806, 2076, 2790, 1878, 620, −22},
{0, 22, 755, 2030, 2803, 1931, 662, −11},
A fourth set of exemplary 8-tap filters are as follows:
{352, 1696, 3744, 4800, 3744, 1696, 352, 0},
{341, 1654, 3680, 4767, 3777, 1760, 394, 11},
{330, 1612, 3616, 4734, 3810, 1824, 436, 22},
{319, 1570, 3552, 4701, 3843, 1888, 478, 33},
{308, 1528, 3488, 4668, 3876, 1952, 520, 44},
{297, 1486, 3424, 4635, 3909, 2016, 562, 55},
{286, 1444, 3360, 4602, 3942, 2080, 604, 66},
{275, 1402, 3296, 4569, 3975, 2144, 646, 77},
{264, 1360, 3232, 4536, 4008, 2208, 688, 88},
{253, 1318, 3168, 4503, 4041, 2272, 730, 99},
{242, 1276, 3104, 4470, 4074, 2336, 772, 110},
{231, 1234, 3040, 4437, 4107, 2400, 814, 121},
{220, 1192, 2976, 4404, 4140, 2464, 856, 132},
{209, 1150, 2912, 4371, 4173, 2528, 898, 143},
{198, 1108, 2848, 4338, 4206, 2592, 940, 154},
{187, 1066, 2784, 4305, 4239, 2656, 982, 165},
{176, 1024, 2720, 4272, 4272, 2720, 1024, 176},
{165, 982, 2656, 4239, 4305, 2784, 1066, 187},
{154, 940, 2592, 4206, 4338, 2848, 1108, 198},
{143, 898, 2528, 4173, 4371, 2912, 1150, 209},
{132, 856, 2464, 4140, 4404, 2976, 1192, 220},
{121, 814, 2400, 4107, 4437, 3040, 1234, 231},
{110, 772, 2336, 4074, 4470, 3104, 1276, 242},
{99, 730, 2272, 4041, 4503, 3168, 1318, 253},
{88, 688, 2208, 4008, 4536, 3232, 1360, 264},
{77, 646, 2144, 3975, 4569, 3296, 1402, 275},
{66, 604, 2080, 3942, 4602, 3360, 1444, 286},
{55, 562, 2016, 3909, 4635, 3424, 1486, 297},
{44, 520, 1952, 3876, 4668, 3488, 1528, 308},
{33, 478, 1888, 3843, 4701, 3552, 1570, 319},
{22, 436, 1824, 3810, 4734, 3616, 1612, 330},
{11, 394, 1760, 3777, 4767, 3680, 1654, 341}
In a third example, a first set of exemplary 8-tap filters are as follows:
{26, 135, 221, 255, 222, 135, 28, 2},
{24, 131, 219, 255, 224, 139, 30, 2},
{22, 128, 217, 255, 226, 142, 32, 2},
{20, 125, 215, 255, 228, 145, 34, 2},
{18, 120, 213, 254, 230, 149, 38, 2},
{17, 117, 211, 254, 231, 152, 40, 2},
{15, 112, 208, 254, 233, 156, 44, 2},
{14, 109, 207, 253, 234, 159, 46, 2},
{13, 105, 204, 253, 236, 162, 49, 2},
{11, 102, 203, 253, 237, 165, 51, 2},
{10, 98, 200, 252, 239, 168, 55, 2},
{9, 94, 197, 251, 240, 171, 59, 3},
{8, 90, 195, 250, 242, 174, 62, 3},
{7, 87, 193, 250, 243, 176, 65, 3},
{7, 84, 190, 248, 244, 179, 68, 4},
{6, 80, 187, 247, 245, 182, 72, 5},
{5, 75, 185, 247, 247, 185, 75, 5},
{5, 72, 182, 245, 247, 187, 80, 6},
{4, 68, 179, 244, 248, 190, 84, 7},
{3, 65, 176, 243, 250, 193, 87, 7},
{3, 62, 174, 242, 250, 195, 90, 8},
{3, 59, 171, 240, 251, 197, 94, 9},
{2, 55, 168, 239, 252, 200, 98, 10},
{2, 51, 165, 237, 253, 203, 102, 11},
{2, 49, 162, 236, 253, 204, 105, 13},
{2, 46, 159, 234, 253, 207, 109, 14},
{2, 44, 156, 233, 254, 208, 112, 15},
{2, 40, 152, 231, 254, 211, 117, 17},
{2, 38, 149, 230, 254, 213, 120, 18},
{2, 34, 145, 228, 255, 215, 125, 20},
{2, 32, 142, 226, 255, 217, 128, 22},
{2, 30, 139, 224, 255, 219, 131, 24}
A second set of exemplary 8-tap filters are as follows:
{13, 140, 228, 264, 228, 140, 12, −1},
{10, 136, 226, 264, 230, 144, 15, −1},
{8, 132, 225, 264, 232, 148, 17, −2},
{7, 128, 223, 264, 233, 151, 20, −2},
{5, 123, 221, 264, 236, 155, 23, −3},
{2, 117, 218, 264, 238, 160, 28, −3},
{1, 115, 217, 264, 241, 162, 29, −5},
{0, 109, 214, 263, 243, 166, 34, −5},
{−1, 105, 212, 262, 244, 169, 38, −5},
{−2, 101, 211, 262, 246, 172, 40, −6},
{−3, 96, 208, 261, 248, 176, 44, −6},
{−5, 91, 205, 261, 250, 179, 49, −6},
{−5, 87, 204, 261, 251, 181, 52, −7},
{−6, 82, 201, 260, 253, 185, 56, −7},
{−6, 79, 199, 259, 253, 187, 60, −7},
{−7, 74, 196, 258, 255, 191, 64, −7},
{−7, 68, 194, 257, 257, 194, 68, −7},
{−7, 64, 191, 255, 258, 196, 74, −7},
{−7, 60, 187, 253, 259, 199, 79, −6},
{−7, 56, 185, 253, 260, 201, 82, −6},
{−7, 52, 181, 251, 261, 204, 87, −5}, {−6, 49, 179, 250, 261, 205, 91, −5},
{−6, 44, 176, 248, 261, 208, 96, −3},
{−6, 40, 172, 246, 262, 211, 101, −2},
{−5, 38, 169, 244, 262, 212, 105, −1},
{−5, 34, 166, 243, 263, 214, 109, 0},
{−5, 29, 162, 241, 264, 217, 115, 1},
{−3, 28, 160, 238, 264, 218, 117, 2},
{−3, 23, 155, 236, 264, 221, 123, 5},
{−2, 20, 151, 233, 264, 223, 128, 7},
{−2, 17, 148, 232, 264, 225, 132, 8},
{−1, 15, 144, 230, 264, 226, 136, 10}, A third set of exemplary 8-tap filters are as follows:
{0, 73, 115, 136, 115, 73, 0, 0},
{−1, 70, 114, 135, 117, 75, 2, 0},
{−2, 67, 112, 134, 118, 78, 5, 0},
{−2, 65, 112, 134, 119, 79, 6, −1},
{−2, 62, 112, 134, 120, 80, 8, −2},
{−3, 59, 110, 134, 122, 82, 10, −2},
{−5, 56, 109, 134, 123, 85, 12, −2},
{−5, 55, 108, 134, 123, 86, 13, −2},
{−5, 54, 107, 133, 123, 87, 15, −2},
{−6, 51, 106, 133, 124, 89, 17, −2},
{−7, 48, 104, 133, 126, 91, 19, −2},
{−7, 45, 103, 132, 127, 93, 22, −3},
{−7, 42, 102, 132, 128, 95, 25, −5},
{−6, 41, 102, 132, 128, 94, 26, −5},
{−5, 41, 102, 131, 127, 94, 27, −5},
{−5, 37, 100, 130, 128, 96, 31, −5},
{−5, 34, 98, 129, 129, 98, 34, −5},
{−5, 31, 96, 128, 130, 100, 37, −5},
{−5, 27, 94, 127, 131, 102, 41, −5},
{−5, 26, 94, 128, 132, 102, 41, −6},
{−5, 25, 95, 128, 132, 102, 42, −7},
{−3, 22, 93, 127, 132, 103, 45, −7},
{−2, 19, 91, 126, 133, 104, 48, −7},
{−2, 17, 89, 124, 133, 106, 51, −6},
{−2, 15, 87, 123, 133, 107, 54, −5},
{−2, 13, 86, 123, 134, 108, 55, −5},
{−2, 12, 85, 123, 134, 109, 56, −5},
{−2, 10, 82, 122, 134, 110, 59, −3},
{−2, 8, 80, 120, 134, 112, 62, −2},
{−1, 6, 79, 119, 134, 112, 65, −2},
{0, 5, 78, 118, 134, 112, 67, −2},
{0, 2, 75, 117, 135, 114, 70, −1}.

A fourth set of exemplary 8-tap filters are as follows:
{36, 131, 219, 251, 220, 131, 36, 0},
{35, 128, 217, 250, 221, 133, 39, 1},
{34, 125, 214, 249, 222, 136, 42, 2},
{33, 122, 211, 248, 223, 139, 45, 3},
{32, 119, 208, 247, 223, 142, 48, 5},
{31, 116, 206, 246, 224, 144, 51, 6},
{30, 113, 203, 245, 225, 147, 54, 7},
{29, 110, 200, 244, 226, 150, 57, 8},
{27, 107, 197, 243, 228, 153, 60, 9},
{26, 104, 195, 242, 228, 156, 63, 10},
{25, 101, 192, 241, 229, 159, 66, 11,},
{24, 98, 189, 240, 230, 161, 69, 13},
{23, 95, 186, 239, 231, 164, 72, 14},
{22, 92, 183, 238, 232, 167, 75, 15},
{20, 89, 181, 237, 233, 170, 78, 16},
{19, 87, 178, 236, 234, 172, 81, 17},
{18, 84, 175, 235, 235, 175, 84, 18},
{17, 81, 172, 234, 236, 178, 87, 19},
{16, 78, 170, 233, 237, 181, 89, 20},
{15, 75, 167, 232, 238, 183, 92, 22},
{14, 72, 164, 231, 239, 186, 95, 23},
{13, 69, 161, 230, 240, 189, 98, 24},
{11, 66, 159, 229, 241, 192, 101, 25},
{10, 63, 156, 228, 242, 195, 104, 26},
{9, 60, 153, 228, 243, 197, 107, 27},
{8, 57, 150, 226, 244, 200, 110, 29},
{7, 54, 147, 225, 245, 203, 113, 30},
{6, 51, 144, 224, 246, 206, 116, 31},
{5, 48, 142, 223, 247, 208, 119, 32},
{3, 45, 139, 223, 248, 211, 122, 33},
{2, 42, 136, 222, 249, 214, 125, 34},
{1, 39, 133, 221, 250, 217, 128, 35}

In a fourth example, a first set of exemplary 8-tap filters are as follows:
{33, 156, 209, 223, 211, 156, 33, 3},
{30, 153, 208, 223, 212, 159, 36, 3},
{27, 149, 208, 223, 213, 162, 39, 3},
{26, 146, 207, 223, 213, 164, 42, 3},
{23, 141, 206, 223, 214, 168, 46, 3},
{21, 138, 205, 223, 215, 170, 49, 3},
{18, 133, 204, 223, 216, 174, 53, 3},
{17, 130, 204, 222, 216, 176, 56, 3},
{16, 125, 203, 222, 217, 178, 60, 3},
{14, 123, 202, 222, 217, 180, 63, 3},
{13, 118, 201, 222, 218, 182, 67, 3},
{12, 113, 199, 222, 218, 184, 72, 4},
{10, 109, 198, 221, 219, 187, 76, 4},
{9, 106, 198, 221, 219, 188, 79, 4},
{9, 101, 195, 221, 219, 189, 84, 6},
{7, 97, 195, 220, 220, 191, 88, 6},
{6, 92, 194, 220, 220, 194, 92, 6},
{6, 88, 191, 220, 220, 195, 97, 7},
{6, 84, 189, 219, 221, 195, 101, 9},
{4, 79, 188, 219, 221, 198, 106, 9},
{4, 76, 187, 219, 221, 198, 109, 10},
{4, 72, 184, 218, 222, 199, 113, 12},
{3, 67, 182, 218, 222, 201, 118, 13},
{3, 63, 180, 217, 222, 202, 123, 14},
{3, 60, 178, 217, 222, 203, 125, 16},
{3, 56, 176, 216, 222, 204, 130, 17},
{3, 53, 174, 216, 223, 204, 133, 18},
{3, 49, 170, 215, 223, 205, 138, 21},
{3, 46, 168, 214, 223, 206, 141, 23},
{3, 42, 164, 213, 223, 207, 146, 26},
{3, 39, 162, 213, 223, 208, 149, 27},
{3, 36, 159, 212, 223, 208, 153, 30}

A second set of exemplary 8-tap filters are as follows:
{16, 170, 215, 226, 214, 169, 15, −1},
{13, 165, 214, 226, 215, 173, 20, −2},
{10, 162, 215, 226, 216, 176, 22, −3},
{8, 157, 214, 226, 216, 179, 27, −3},
{6, 152, 214, 226, 217, 182, 31, −4},
{3, 146, 213, 226, 218, 186, 36, −4},
{2, 143, 214, 226, 218, 188, 39, −6},
{0, 137, 213, 226, 219, 190, 45, −6},
{−1, 132, 212, 226, 220, 192, 49, −6},
{−3, 128, 213, 226, 220, 194, 53, −7},
{−4, 122, 211, 225, 221, 197, 59, −7},
{−6, 116, 210, 225, 222, 200, 64, −7},
{−6, 112, 211, 225, 222, 200, 68, −8},
{−7, 106, 210, 225, 222, 203, 74, −9},
{−7, 101, 209, 225, 223, 204, 78, −9},
{−9, 96, 208, 224, 224, 206, 84, −9},
{−9, 90, 207, 224, 224, 207, 90, −9},
{−9, 84, 206, 224, 224, 208, 96, −9},
{−9, 78, 204, 223, 225, 209, 101, −7},
{−9, 74, 203, 222, 225, 210, 106, −7},
{−8, 68, 200, 222, 225, 211, 112, −6},
{−7, 64, 200, 222, 225, 210, 116, −6}, {−7, 59, 197, 221, 225, 211, 122, −4},
{−7, 53, 194, 220, 226, 213, 128, −3},
{−6, 49, 192, 220, 226, 212, 132, −1},
{−6, 45, 190, 219, 226, 213, 137, 0},
{−6, 39, 188, 218, 226, 214, 143, 2},
{−4, 36, 186, 218, 226, 213, 146, 3},
{−4, 31, 182, 217, 226, 214, 152, 6},
{−3, 27, 179, 216, 226, 214, 157, 8},
{−3, 22, 176, 216, 226, 215, 162, 10},
{−2, 20, 173, 215, 226, 214, 165, 13}
A third set of exemplary 8-tap filters are as follows:
{0, 91, 108, 114, 108, 91, 0, 0},
{−1, 88, 107, 114, 108, 93, 3, 0},
{−3, 85, 106, 114, 109, 95, 6, 0},
{−3, 82, 107, 114, 109, 96, 8, −1},
{−3, 79, 109, 114, 109, 96, 11, −3},
{−4, 76, 108, 114, 109, 98, 14, −3},
{−6, 73, 107, 114, 110, 100, 17, −3},
{−6, 72, 107, 114, 110, 100, 18, −3},
{−6, 70, 107, 114, 110, 100, 20, −3},
{−7, 67, 106, 114, 111, 102, 22, −3},
{−8, 64, 106, 113, 111, 104, 25, −3},
{−9, 60, 106, 113, 112, 105, 29, −4},
{−9, 56, 107, 113, 112, 106, 33, −6},
{−7, 54, 107, 113, 112, 104, 35, −6},
{−6, 53, 107, 113, 112, 103, 36, −6},
{−6, 49, 106, 113, 112, 104, 40, −6},
{−6, 45, 105, 112, 112, 105, 45, −6},
{−6, 40, 104, 112, 113, 106, 49, −6},
{−6, 36, 103, 112, 113, 107, 53, −6},
{−6, 35, 104, 112, 113, 107, 54, −7},
{−6, 33, 106, 112, 113, 107, 56, −9},
{−4, 29, 105, 112, 113, 106, 60, −9},
{−3, 25, 104, 111, 113, 106, 64, −8},
{−3, 22, 102, 111, 114, 106, 67, −7},
{−3, 20, 100, 110, 114, 107, 70, −6},
{−3, 18, 100, 110, 114, 107, 72, −6},
{−3, 17, 100, 110, 114, 107, 73, −6},
{−3, 14, 98, 109, 114, 108, 76, −4},
{−3, 11, 96, 109, 114, 109, 79, −3},
{−1, 8, 96, 109, 114, 107, 82, −3},
{0, 6, 95, 109, 114, 106, 85, −3},
{0, 3, 93, 108, 114, 107, 88, −1}
A fourth set of exemplary 8-tap filters are as follows:
{46, 145, 210, 222, 210, 145, 46, 0},
{44, 142, 208, 221, 211, 147, 49, 2},
{43, 139, 206, 221, 211, 149, 52, 3},
{41, 136, 204, 221, 212, 151, 55, 4},
{40, 133, 202, 220, 212, 153, 58, 6},
{39, 130, 200, 220, 212, 155, 61, 7},
{37, 126, 198, 220, 213, 157, 64, 9},
{36, 123, 196, 219, 213, 160, 67, 10},
{34, 120, 194, 219, 213, 162, 71, 11},
{33, 117, 192, 218, 214, 163, 74, 13},
{31, 114, 190, 218, 214, 166, 77, 14},
{30, 111, 188, 218, 214, 167, 80, 16},
{28, 108, 186, 217, 215, 170, 83, 17},
{27, 105, 184, 217, 215, 172, 86, 18},
{26, 101, 182, 217, 215, 174, 89, 20},
{24, 99, 180, 216, 216, 176, 92, 21},
{23, 95, 178, 216, 216, 178, 95, 23},
{21, 92, 176, 216, 216, 180, 99, 24},
{20, 89, 174, 215, 217, 182, 101, 26},
{18, 86, 172, 215, 217, 184, 105, 27},
{17, 83, 170, 215, 217, 186, 108, 28},
{16, 80, 167, 214, 218, 188, 111, 30},
{14, 77, 166, 214, 218, 190, 114, 31},
{13, 74, 163, 214, 218, 192, 117, 33},
{11, 71, 162, 213, 219, 194, 120, 34},
{10, 67, 160, 213, 219, 196, 123, 36},
{9, 64, 157, 213, 220, 198, 126, 37},
{7, 61, 155, 212, 220, 200, 130, 39},
{6, 58, 153, 212, 220, 202, 133, 40},
{4, 55, 151, 212, 221, 204, 136, 41},
{3, 52, 149, 211, 221, 206, 139, 43},
{2, 49, 147, 211, 221, 208, 142, 44}

In some embodiments, a 7-tap filter and a 6-tap filter are provided. That is, dependent on the sub-pel position, the filters with different tap numbers are used for interpolation.

For example, one flag is signaled for each block to switch between the original 4-tap interpolation filter and the proposed 8-tap interpolation filter. The flag can be signaled in a high level such as sequence parameter set, sequence header, picture parameter set, picture header, slice header or patch header. Alternatively, the flag can be signaled in a low level, such as coding tree unit level, coding unit level, prediction unit level or transform unit level.

Figure 10:
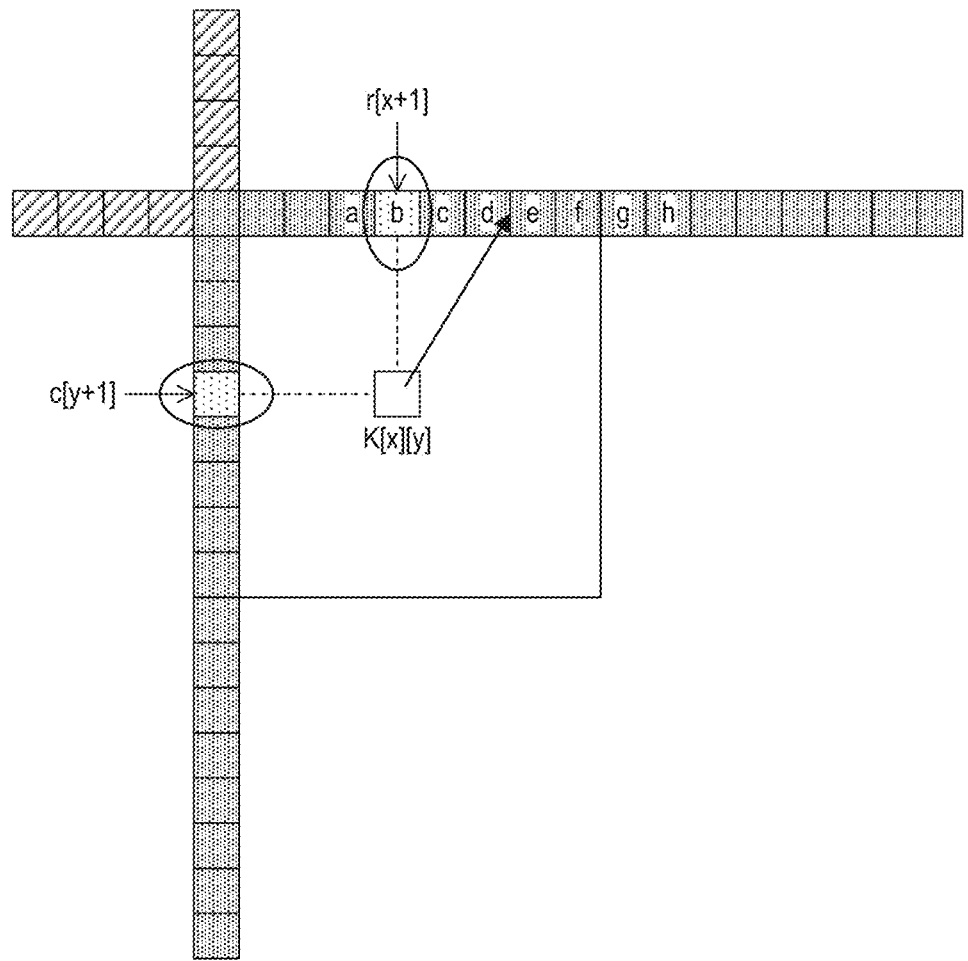
FIG. 10 is a schematic diagram illustrating an angular mode in intra prediction, according to some embodiments of the present disclosure.

In some embodiments, as shown in FIG. 9, more reference samples can be used to generate the predicted value of the current sample, while the above-described long-tap interpolation filter is performed. For example, as shown in FIG. 10, after the above-described 8-tap interpolation filtering is performed, the left reference sample in the same row as the current sample and the top reference sample in the same column as the current sample are also used to generate the predicted value of the current sample. In this example, if the current sample is k[i][j] with i being the index of the column and j being the index of the row where the current sample is in, the additional reference samples are c[j] and r[i]. The derivation of the predicted value of the sample k can be described as Equation. (11) or Equation. (12):

$$\text{Pred}_{k[x][y]} = (((f_0 \times a + f_1 \times b + f_2 \times c + f_3 \times d + f_4 \times e + f_5 \times f + f_6 \times g + f_7 \times h + \text{offset}_1) >> \text{shift}_1) \times w_0 + c[y+1] \times w_1 + r[x+1] \times w_2 + \text{offset}_2) >> \text{shift}_2 \quad \text{(Eq. 11)}$$

or $$\text{Pred}_{k[x][y]} = ((f_0 \times a \times w_0 + f_1 \times b \times w_0 + f_2 \times c \times w_0 + f_3 \times d \times w_0 + f_4 \times e \times w_0 + f_5 \times f \times w_0 + f_6 \times g \times w_0 + f_7 \times h \times w_0) + (c[y+1] \times w_1 << \text{shift}_1) + (r[x+1] \times w_2 << \text{shift}_1) + (\text{offset}_1 << \text{shift}_2)) >> (\text{shift}_2 + \text{shift}_1) \quad \text{(Eq. 12)}$$

In the above equations, $\text{Pred}_{k[x][y]}$ is the predicted value of sample $K[x][y]$ (x=0~M−1, y=0~N−1) in the row y and column x. $f_0$, $f_1$, $f_2$, $f_3$, $f_4$, $f_5$, $f_6$ and $f_7$ are interpolation filter coefficients defined as in previous examples. "shift" is the right shift number wherein the sum of $f_0$ to $f_7$ is equal to $\text{shift}_1$-th power of 2. $\text{Offset}_1$ is equal to $(\text{shift}_1-1)$-th power of 2. $w_0$, $w_1$ and $w_2$ are the weights with fixed values. "$\text{shift}_2$" is the right shift number wherein the sum of $w_0$ to $w_2$ is equal to $\text{shift}_2$-th power of 2. Offsets is equal to $(\text{shift}_2-1)$-th power of 2. For example, $w_0$ may be equal to 2, $w_1$ may be equal to 1, and $w_2$ may be equal to 1. In some embodiments, $w_0$ may be equal to 14, $w_1$ may be equal to 1, and $w_2$ may be equal to 1.

Figure 11:
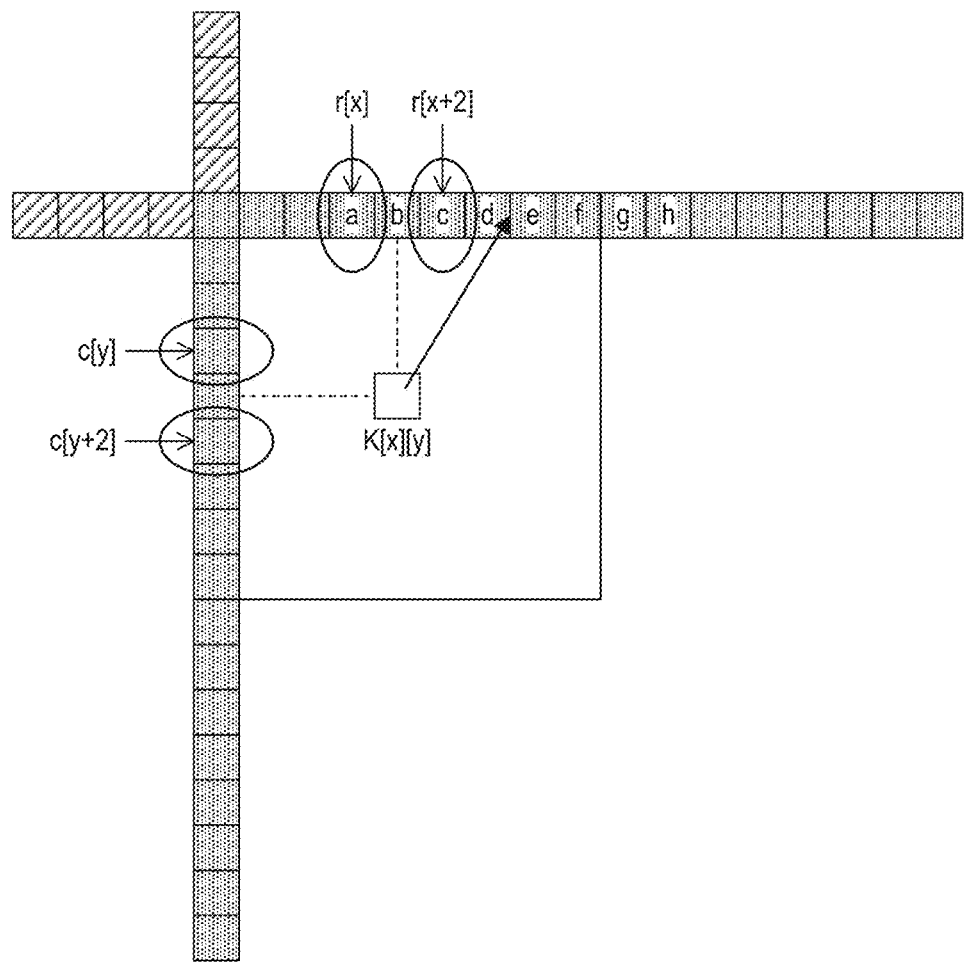
FIG. 11 is a schematic diagram illustrating an angular mode in intra prediction, according to some embodiments of the present disclosure.

FIG. 11 shows another example for using more reference samples to generate the predicted value of the current sample while the above-described 8-tap interpolation filtering is described, according to some disclosed embodiments. As shown in FIG. 11, after the interpolation filtered is performed, the left reference samples surrounding the left reference sample in the same row as the current sample and the top reference samples surrounding the top reference sample in the same column as the current sample are used with the interpolated value to generate the predicted value of the current sample. In this example, if the current sample is k[i][j] with i being the index of the column and j being the index of the row where the current sample is in, the additional reference samples are c[j], c[j+2], r[i] and r[i+2]), the predicted value of the sample k can be derived as a weighted combination of interpolated value and the values of reference samples as in the following Equation 13 or Equation 14:

$$Pred_{k[x][y]}=(((f_0 \times a + f_1 \times b + f_2 \times c + f_3 \times d + f_4 \times e + f_5 \times f + f_6 \times g + f_7 \times h + \text{offset}_1) >> \text{shift}_1) \times w_0 + c[y] \times w_1 + c[y+2] \times w_2 + r[x] \times w_3 + r[x+2] \times w_4 + \text{offset}_2) >> \text{shift}_2 \quad \text{(Eq. 13)}$$

or $$Pred_{k[x][y]}=((f_0 \times a \times w_0 + f_1 \times b \times w_0 + f_2 \times c \times w_0 + f_3 \times d \times w_0 + f_4 \times e \times w_0 + f_5 \times f \times w_0 + f_6 \times g \times w_0 + f_7 \times h \times w_0) + (c[y] \times w_1 << \text{shift}_1) + (c[y+2] \times w_2 << \text{shift}_1) + (r[x] \times w_3 << \text{shift}_1) + (r[x+2] \times w_4 << \text{shift}_1) + (\text{offset}_1 << \text{shift}_2)) >> (\text{shift}_2 + \text{shift}_1) \quad \text{(Eq. 14)}$$

In the above equations: $Pred_k[x][y]$ is the predicted value of sample $K[x][y]$ ($x=0 \sim M-1, y=0 \sim N-1$) in the row y and column x. $f_0, f_1, f_2, f_3, f_4, f_5, f_6$ and $f_7$ are interpolation filter coefficients defined as in previous example. "shift" is the right shift number wherein the sum of $f_0$ to $f_7$ is equal to $\text{shift}_1$-th power of 2. $\text{Offset}_1$ is equal to $(\text{shift}_1-1)$-th power of 2. $w_0, w_1, w_2, w_3$ and $w_4$ are the weights with fixed values. "$\text{shift}_2$," is the right shift number wherein the sum of $w_0$ to $w_2$ is equal to $\text{shift}_2$-th power of 2. $\text{Offset}_1$ is equal to $(\text{shift}_2-1)$-th power of 2. For example, $w_0$ may be equal to 4, $w_1$ may be equal to 1, $w_2$ may be equal to 1, $w_3$ may be equal to 1, and $w_4$ may be equal to 1. For another example, $w_0$ may be equal to 28, $w_1$ may be equal to 1, $w_2$ may be equal to 1, $w_3$ may be equal to 1, and $w_4$ may be equal to 1.

In some embodiments, the reference samples c[y], c[y+1], c[y+2], r[x], r[x+1] and r[x+2] in FIG. 11 are all used for predicted value derivation, while performing the interpolaiton filtering. Moreover, position of other reference samples are corresponding to the position of the current sample. In some embodiments, the other reference samples can be used together with the reference samples which used in the interplolation to derive the predicted value of the current predicted value. For example, a weight is assigned to each reference sample and the predicted value is derived as the weighted sum of the reference sample values.

The present disclosure also provides embodiments associated with weighted DC mode. In the current DC mode, the averaged value of the neighbouring reference samples is used as the predicted value of all samples in the block. Samples near the top boundary and left boundary are more correlated with the reference samples, because these samples are close to the reference samples. In some embodiments, the DC value that is an averaged value of all the available reference samples is not used as the predicted value for all the samples in the block. For the samples on the first K1 row and the samples on the first K2 column samples, a more accurate predicted value is derived as a weighted combination of DC value and the value of the reference samples close to the predicted samples. For example, K1 and K2 can be equal to 2. Thus, for the predicted samples in the first two rows of the block and the predicted samples in the first two columns of the block, the predicted values are derived based on the DC value and the values of reference samples near the predicted samples. For another example, K1 and K2 may be dependent on the size of the block.

Figure 12A:
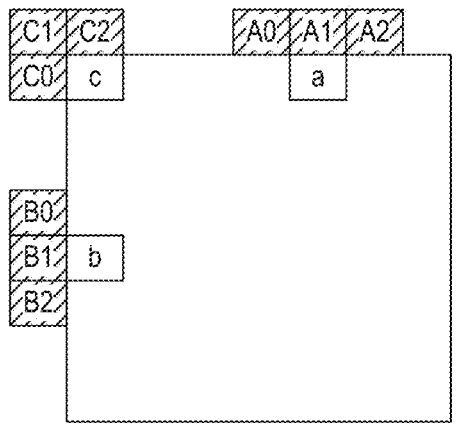
FIGS. 12(a)-12(f) illustrate weighted samples in weighted direct-current mode and weighted plane mode, according to some embodiments of the present disclosure.

For example, as shown in FIG. 12(a), in additional to a DC value, for the sample a on the first row but not on the first two columns, the three top reference samples marked as A0, A1 and A2 are used to derive the predicted value of a; for the sample b on the first column but not on the first two rows, the three left reference sample marked as B0, B1 and B2 are used to derive the predicted value of b; for the sample c on the cross of the first column and the first row (i.e., the first sample of the first row or the first sample of the first column), the three reference sample marked as C0, C1 and C2 are used to derive the predicted value of c. The derivation is performed based on the weighted combination as the following Equations (15)-(17):

$$a=(f_0 \times A0 + f_1 \times A1 + f_2 \times A2 + f_3 \times DC + \text{offset}) >> \text{shift} \quad \text{(Eq. 15)}$$

$$b=(f_0 \times B0 + f_1 \times B1 + f_2 \times B2 + f_3 \times DC + \text{offset}) >> \text{shift} \quad \text{(Eq. 16)}$$

$$c=(g_0 \times C0 + g_1 \times C1 + g_2 \times C2 + g_3 \times DC + \text{offset}) >> \text{shift} \quad \text{(Eq. 17)}$$

In the above equations, $f_i$ and $g_i$ (i=0,1,2 or 3) are weights used in weighted averaging. For example, $f_0$ is equal to 18, $f_1$ is equal to 38, $f_2$ is equal to 18, and $f_3$ is equal to 182. $g_0$ is equal to 38, $g_1$ is equal to 18, $g_2$ is equal to 38 and $g_3$ is equal to 162. Offset is equal to 128 and shift is equal to 8. $f_1$ and $g_1$ may be other values including negative values. In this embodiment, the sum of $f_0$ to $f_3$ and the sum of $g_0$ to $g_3$ are power of 2 so that the division operation can be implemented by bit shifting operation.

Figure 12B:
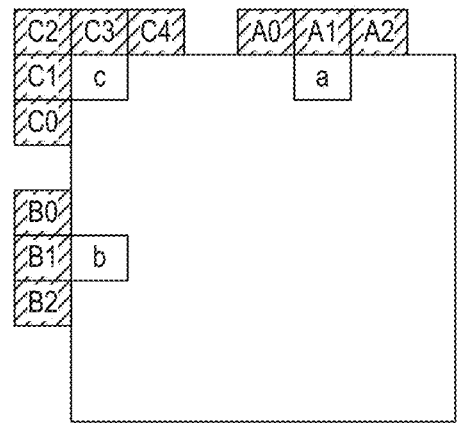

For example, as shown in FIG. 12(b), in additional to DC value, for the sample a on the first row but not on the first two columns, the three top reference samples marked as A0, A1 and A2 are used to derive the predicted value of a; for the sample b on the first column but not on the first two rows, the three left reference sample marked as B0, B1 and B2 are used to derive the predicted value of b; for the sample c on the cross of the first column and the first row (i.e., the first sample of the first row or the first sample of the first column), the five reference samples marked as C0, C1, C2, C3 and C4 are used to derive the predicted value of c. The derivation of a and b are described in Eq. 15 and Eq. 16, and the derivation of c is performed based on the weighted combination as following Equation (18):

$$c=(g_0 \times C0 + g_1 \times C1 + g_2 \times C2 + g_3 \times C3 + g_4 \times C4 + g_5 \times DC + \text{offset}) >> \text{shift} \quad \text{(Eq. 18)}$$

In Equation (18), the variables $g_i$ are weights used in weighted averaging. For example, $g_0$ is equal to 18, $g_1$ is equal to 38, $g_2$ is equal to 18, $g_3$ is equal to 38, $g_4$ is equal to 18, and $g_5$ is equal to 126. Offset is equal to 128 and "shift" is equal to 8. In this embodiment, the sum of $g_0$ to $g_5$ is power of 2 so that the division operation can be implemented by bit shifting operation.

Figure 12C:
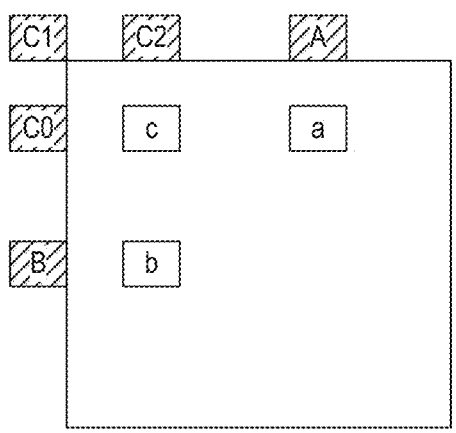

For example, as shown in FIG. 12(c), in additional to DC value, for the sample a on the second row but not on the first two columns, one top reference sample marked as A is used to derive the predicted value of sample a; for the sample b on the second column but not on the first two rows, one left reference sample marked as B is used to derive the predicted value of sample b; for the sample c on the cross of the second row and the second column (i.e., the second sample of the second row or the second sample of the second column), the three reference sample marked as C0, C1 and C2 are used to derive the predicted value of sample c. The derivation can be performed based on the weighted combination as following Equations (19)-(21):

$$a=(f_0 \times A0 + f_1 \times DC + \text{offset}) >> \text{shift} \quad \text{(Eq. 19)}$$

$$b=(f_0 \times B0 + f_1 \times DC + \text{offset}) >> \text{shift} \quad \text{(Eq. 20)}$$

$$c=(g_0 \times C0 + g_1 \times C1 + g_2 \times C2 + g_3 \times DC + \text{offset}) >> \text{shift} \quad \text{(Eq. 21)}$$

In the above equations, $f_1$ and $g_1$ are weights used in weighted averaging. For example, $f_0$ is equal to 13, $f_1$ is equal to 243. $g_0$ is equal to 13, $g_1$ is equal to 5, $g_2$ is equal to 13, and $g_3$ is equal to 225. "Offset" is equal to 128 and "shift" is equal to 8. In this embodiment, the sum of $f_0$ to $f_1$ and the sum of $g_0$ to $g_3$ are power of 2 so that the division operation can be implemented by bit shifting operation.

Figure 12D:
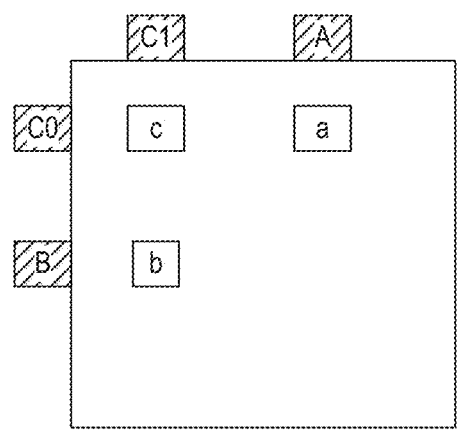

For example, as shown in FIG. 12(d), in additional to DC value, for the sample a on the second row but not on the first two columns, one top reference sample marked as A is used to derive the predicted value of sample a; for the sample b on the second column but not on the first two rows, one left reference sample marked as B is used to derive the predicted value of sample b; for the sample c on the cross of the second column and the second row (i.e., the second sample of the second row or the second sample of the second column), the two reference samples marked as C0, and C1 are used to derive the predicted value of sample c. The derivation can be performed based on the weighted combination as following Equations 22-24:

$$a = (f_0 \times A0 + f_1 \times DC + \text{offset}) >> \text{shift} \quad (\text{Eq. 22})$$

$$b = (f_0 \times B0 + f_1 \times DC + \text{offset}) >> \text{shift} \quad (\text{Eq. 23})$$

$$c = (g_0 \times C0 + g_1 \times C1 + g_2 \times DC + \text{offset}) >> \text{shift} \quad (\text{Eq. 24})$$

In the above equations, $f_1$ and $g_1$ are weights used in weighted averaging. For example, $f_0$ is equal to 13, $f_1$ is equal to 243, $g_0$ is equal to 13, $g_1$ is equal to 13, and $g_2$ is equal to 230. "Offset" is equal to 128 and "shift" is equal to 8. In this embodiment, the sum of $f_0$ to $f_1$ and the sum of $g_0$ to $g_2$ are power of 2, so that the division operation can be implemented by bit shifting operation.

Figure 12E:
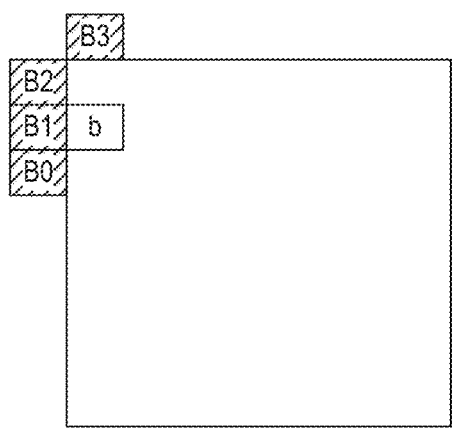

For example, as shown in FIG. 12(e); in additional to DC value, for the first sample b on the cross of the first column and the second row (i.e., the first sample of the second row), the four left reference sample marked as B0, B1, B2 and B3 are used to derive the predicted value of sample b. The derivation can be performed based on the weighted combination as following Equation 25:

$$b = (f_0 \times B0 + f_1 \times B1 + f_2 \times B2 + f_3 \times B3 + f_4 \times DC + \text{offset}) >> \text{shift} \quad (\text{Eq. 25})$$

Figure 12F:
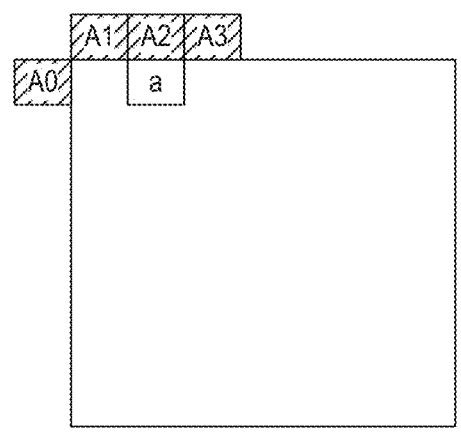

In Equation 25, $f_1$ are weights used in weighted averaging. For example, $f_0$ is equal to 18, $f_1$ is equal to 38, $f_1$ is equal to 18, $f_3$ is equal to 13, $f_4$ is equal to 169 "Offset" is equal to 128 and "shift" is equal to 8. In this embodiment, the sum of $f_0$ to $f_4$ is power of 2 so that the division operation can be implemented by bit shifting operation For example, as shown in FIG. 12(f), for the second sample a on the cross of the first row and the second column (i.e., the second sample of the first row), the four reference samples marked as A0, A1, A2 and A3 are used to derive the predicted value of sample a. The derivation can be performed based on the weighted combination as following Equation 26:

$$b = (f_0 \times A0 + f_1 \times A1 + f_2 \times A2 + f_3 \times A3 + f_4 \times DC + \text{offset}) >> \text{shift} \quad (\text{Eq. 26})$$

In Equation 26, $f_1$ are weights used in weighted averaging. For example, $f_0$ is equal to 13, $f_1$ is equal to 18, $f_1$ is equal to 38, $f_3$ is equal to 18, $f_4$ is equal to 169 "Offset" is equal to 128 and "shift" is equal to 8. In this embodiment, the sum of $f_0$ to $f_4$ is power of 2 so that the division operation can be implemented by bit shifting operation.

To switch between the original DC mode and the proposed weighted DC mode, 1 flag is signaled for each block. The flag can be signaled in a high level such as sequence parameter set, sequence header, picture parameter set, picture header, slice header or patch header. Alternatively, the flag can be signaled in a low level, such as coding tree unit level, coding unit level, prediction unit level or transform unit level.

Plane mode derives the predicted values of samples based on a plane. The vertical and horizontal slope are calculated by the top and left reference samples. However, for the samples within the current block, with the distance from the current sample to the reference samples increasing, the correlation decreases. Thus, the values of samples near the top and left boundary are closer to the reference samples than the values of samples far away from the top and left boundary. That is to say, the linear model is not accurate enough to describe all the samples values in the current block. Thus, in some embodiments, for the samples on the first K1 rows samples and the samples on the first K2 columns, based on the original plane-based predicted value, a new predicted value is derived by considering the affect of reference samples near the predicted samples. For example, K1 and K2 are equal to 2. Thus, for the samples in the first two rows in the block and the samples in first two columns in the block, the predicted values are derived based on a weighted combination of a base value derived according to a plane model and values of corresponding reference samples. K1 and K2 may be different from each other and may be dependent on the block size.

To derive the predicted values of the samples near the top and left boundary, the reference samples involved in the derivation process are determined first.

For example, as shown in FIG. 12(a), in additional to a base value, for the sample a on the first row but not on the first two columns, the three top reference sample marked as A0, A1 and A2 are used to derive the predicted value of sample a; for the sample b on the first column but not on the first two rows, the three left reference sample marked as B0, B1 and B2 are used to derive the predicted value of sample b; for the sample c on the cross of the first column and the first row (i.e., the first sample of the first row or the first sample of the first column), the three reference sample marked as C0, C1 and C2 are used to derive the predicted value of sample c.

For example, as shown in FIG. 12(b), in additional to a base value, for the sample a on the first row but not on the first two columns, the three top reference sample marked as A0, A1 and A2 are used to derive the predicted value of sample a; for the sample b on the first column but not on the first two rows, the three left reference sample marked as B0, B1 and B2 are used to derive the predicted value of sample b; for the sample c on the cross of the first column and the first row (i.e., the first sample of the first row or the first sample of the first column), the five reference samples marked as C0, C1, C2, C3 and C4 are used to derive the predicted value of sample c.

For example, as shown in FIG. 12(c), in additional to a base value, for the sample a on the second row but not on the first two columns, one top reference sample marked as A is used in the derivation of the predicted value of sample a; for the sample b on the second column but not on the first two rows, one left reference sample marked as B is used in the derivation of the predicted value of sample b; for the sample c on the cross of the second column and the second row (i.e., the second sample of the second row or the second sample of the second column), the three reference sample marked as C0, C1 and C2 are used in the derivation of the predicted value of sample c.

For example, as shown in FIG. 12(d), in additional to a base value, for the sample a on the second row but not on the first two columns, one top reference sample marked as A is used in the derivation of the predicted value of sample a; for the sample b on the second column but not on the first two rows, one left reference sample marked as B is used in the derivation of the predicted value of sample b; for the sample c on the cross of the second column and the second row (i.e., the second sample of the second row or the second sample of the second column), the two reference samples marked as C0 and C1 are used in the derivation of the predicted value of sample c.

For example, as shown in FIGS., in additional to a base value, 12(*e*) and 12(*f*); for the sample b on the cross of the first column and the second row (i.e., the first sample of the second row), the four left reference sample marked as B0, B1, B2 and B3 are used in the derivation of the predicted value of sample b; for the sample a on the cross of the first row and the second column (i.e., the second sample of the first row), the four reference sample marked as A0, A1, A2 and A3 are used to refine the predicted value of sample a.

After determining the reference samples involved in the derivation process, the derivation of predicted value of samples in the first K1 rows and first K2 column are described as follows, taking K1=2 and K2=2 as an example.

In some embodiments, the slope in horizontal direction (picture width direction) ib, slope in vertical direction (picture height direction) is, and the center point value ia and the top-left point value it can be derived based on the following Equations 27-30.

$$ib=((ih<<5)\times imh+(1<<(ish-1)))>>ish \quad \text{(Eq. 27)}$$

$$is=((iv<<5)\times imv+(1<<(isv-1)))>>isv \quad \text{(Eq. 28)}$$

$$ia=(r[M]+c[N])<<4 \quad \text{(Eq. 29)}$$

$$it=ia-((M>>1)-1)\times ib-((N>>1)-1)\times ic+16 \quad \text{(Eq. 30)}$$

In the above equations, imh, imv, ish, and isv are dependent on the size of the block. imh=ibMult[Log(M)−2], ish=ibShift[Log(M)−2], imv=ibMult[Log(N)−2], isv=ibShift[Log(N)−2], ibMult[5]={13, 17, 5, 11, 23}, and ibShift[5]={7, 10, 11, 15, 19}.

Then, in FIGS. 12(*a*)-12(*f*), for the samples a, b and c, predicted values are determined based on the weighted combination as following Equations 31-39:

$$\text{Pred}[x][0]=((A0<<5)\times f0+(A1<<5)\times f1+(A2<<5)\times f2+x\times ib\times f3+it\times f3+87\times ic+\text{offset})>>(\text{shift}+5)\ (x>1) \quad \text{(Eq. 31)}$$

$$\text{Pred}[x][1]=((A<<5)\times g0+x\times ib\times g1+it\times g1+269\times ic+\text{offset})>>(\text{shift}+5)\ (x>1) \quad \text{(Eq. 32)}$$

$$\text{Pred}[0][y]=((B0<<5)\times f0+(B1<<5)\times f1+(B2<<5)\times f2+y\times ic\times f3+it\times f3+87\times ib+\text{offset})>>(\text{shift}+5)\ (y>1) \quad \text{(Eq. 33)}$$

$$\text{Pred}[1][y]=((B<<5)\times g0+y\times ic\times g1+it\times g1+269\times ib+\text{offset})>>(\text{shift}+5)\ (y>1) \quad \text{(Eq. 34)}$$

$$\text{Pred}[0][0]=((C0<<5)\times h0+(C1<<5)\times h1+(C2<<5)\times h2+it\times h3+69\times ic+69\times ib+\text{offset})>>(\text{shift}+5) \quad \text{(Eq. 35)}$$

Or $$\text{Pred}[0][0]=((C0<<5)\times p0+(C1<<5)\times p1+(C2<<5)\times p2+(C3<<5)\times p3+(C4<<5)\times p4+it\times p5+69\times ic+69\times ib+\text{offset})>>(\text{shift}+5) \quad \text{(Eq. 36)}$$

$$\text{Pred}[1][1]=((C0<<5)\times k0+(C1<<5)\times k1+it\times k2+256\times ic+256\times ib+\text{offset})>>(\text{shift}+5) \quad \text{(Eq. 37)}$$

$$\text{Pred}[1][0]=((A0<<5)\times m0+(A1<<5)\times m1+(A2<<5)\times m2+(A3<<5)\times m3+it\times m4+195\times ib+87\times ic+\text{offset})>>(\text{shift}+5) \quad \text{(Eq. 38)}$$

$$\text{Pred}[0][1]=((B0<<5)\times n0+(B1<<5)\times n1+(B2<<5)\times n2+(B3<<5)\times n3+it\times n4+195\times ic+87\times ib+\text{offset})>>(\text{shift}+5) \quad \text{(Eq. 39)}$$

Please note that mathematically Eq. 31 to Eq. 39 are equivalent to the following Eq. 31b to Eq. 39b by reducing 5 least significant bits in the calculation.

$$\text{Pred}[x][0]=(A0\times f0+A1\times f1+A2\times f2+((x\times ib\times f3+it\times f3+87\times ic)>>5)+\text{offset'})>>\text{shift}\ (x>1) \quad \text{(Eq. 31b)}$$

$$\text{Pred}[x][1]=(A\times g0+((x\times ib\times g1+it\times g1+269\times ic)>>5)+\text{offset'})>>\text{shift}\ (x>1) \quad \text{(Eq. 32b)}$$

$$\text{Pred}[0][y]=(B0\times f0+B1\times f1+B2\times f2+((y\times ic\times f3+it\times f3+87\times ib)>>5)+\text{offset'})>>\text{shift}\ (y>1) \quad \text{(Eq. 33b)}$$

$$\text{Pred}[1][y]=(B\times g0+((y\times ic\times g1+it\times g1+269\times ib)>>5)+\text{offset'})>>\text{shift}\ (y>1) \quad \text{(Eq. 34b)}$$

$$\text{Pred}[0][0]=(C0\times h0+C1\times h1+C2\times h2+((it\times h3+69\times ic+69\times ib)>>5)+\text{offset'})>>\text{shift} \quad \text{(Eq. 35b)}$$

Or $$\text{Pred}[0][0]=(C0\times p0+C\times p1+C2\times p2+C3\times p3+C4\times p4+((it\times p5+69\times ic+69\times ib)>>5)+\text{offset'})>>\text{shift} \quad \text{(Eq. 36b)}$$

$$\text{Pred}[1][1]=(C0\times k0+C1\times k1+((it\times k2+256\times ic+256\times ib)>>5)+\text{offset'})>>\text{shift} \quad \text{(Eq. 37b)}$$

$$\text{Pred}[1][0]=(A0\times m0+A1\times m1+A2\times m2+A3\times m3+((it\times m4+195\times ib+87\times ic))>>5)+\text{offset'})>>\text{shift} \quad \text{(Eq. 38b)}$$

$$\text{Pred}[0][1]=(B0\times n0+B1\times n1+B2\times n2+B3\times n3+((it\times n4+195\times ic+87\times ib)>>5)+\text{offset'})>>\text{shift} \quad \text{(Eq. 39b)}$$

wherein offset'=offset>>5

In the above equations, Pred[x][0] is the (x+1)-th sample on the first row with location (x, 0), Pred[x][1] is the (x+1)-th sample on the second row with location (x, 1), Pred[0][y] is the (y+1)-th sample on the first column with location (0, y), Pred[1][y] is the (y+1)-th sample on the second column with location (1, y), Pred[0][0] is the first sample on the first row, Pred[1][0] is the first sample on the second column or the second sample on the first row and Pred[0][1] is the second sample on the second row or the second sample on the first column. $f_0$ is equal to 18, $f_1$ is equal to 38, $f_2$ is equal to 18, and $f_3$ is equal to 182. $g_0$ is equal to 13, and $g_1$ is equal to 243. $h_0$ is equal to 38, $h_1$ is equal to 18, $h_2$ is equal 38, and $h_3$ is equal to 162. $k_0$ is equal to 13, $k_1$ is equal to 13, and $k_2$ is equal to 230. $p_0$ is equal to 18, $p_1$ is equal to 38, $p_2$ is equal to 18, $p_3$ is equal to 38, $p_4$ is equal to 18, and $p_5$ is equal to 126. $m_0$ is equal to 13, $m_1$ is equal to 18, $m_2$ is equal to 38, $m_3$ is equal 18, and $m_4$ is equal to 169. $n_0$ is equal to 18, $n_1$ is equal to 38, $n_2$ is equal to 18, $n_3$ is equal 13, and $n_4$ is equal to 169. "shift" is equal to 8, and "offset" is equal to 1<<12.

To switch between the original plane mode and the proposed weighted plane mode, 1 flag is signaled for each block. The flag can be signaled in a high level such as sequence parameter set, sequence header, picture parameter set, picture header, slice header, or patch header. Alternatively, the flag can be signaled in a low level, such as coding tree unit level, coding unit level, prediction unit level or transform unit level.

Bilinear mode generates the predicted values by the weighted averaging value of two linear interpolated values. The linear interpolation is based on the distance between the samples to be predicted and the reference samples. Thus, every two adjacent samples along the same direction have the same predicted value difference. But for the smoothing block, the value changes between two adjacent samples might be too big. Additionally, the reference samples are the reconstructed samples of the previously coded block. Thus, the reference sample values contain the coding errors which decreases the quality of the prediction. Thus, a smoothed bilinear mode is proposed in this embodiment, in which the predicted value of the current samples is smoothed filtered by the predicted values of the neighboring sample.

In some embodiments, the reference samples are firstly smoothing filtered, and then the different values between the top-right reference sample and the left reference samples and the different values between bottom-left reference sample and the top reference samples are also smoothing filtered. The smoothing filtering may be implemented by a weighted combination or a weighted averaging. Then, based on these filtered values, the refined predicted value of each sample is derived.

The prediction process could be described as follows. In some embodiments, ia, ib, is and wt can be determined based on the following Equations 40-43:

$$ia = r[M] \qquad (\text{Eq. 40})$$

$$ib = c[N] \qquad (\text{Eq. 41})$$

$$ic = (M==N)?\ (ia+ib+1) >> 1:\ (((ia << \text{Log}(M)) + (ib << \text{Log}(N))) \times \text{weight} + (1 << (\text{ishift}+5))) >> (\text{ishift}+6) \qquad (\text{Eq. 42})$$

$$wt = ((ic << 2) - ia - ib) \qquad (\text{Eq. 43})$$

In the above equations, ishift=Log(Min(M,N)), weight=bilinearWeight[Log(Max(M,N)/Min(M,N))−1], and bilinearWeight[3]={21, 13, 7}.

In some embodiments, the reference samples and the difference values between the reference samples can be smoothing filtered based on the following Equations 44-47:

$$fdc[y] = (ia-c[y-1]) \times f_0 + (ia-c[y]) \times f_1 + (ia-c[y+1]) \times f_2 + (ia-c[y+2]) \times f_3 + (ia-c[y+3]) \times f_4 \qquad (\text{Eq. 44})$$

$$fdr[x] = (ib-r[x-1]) \times f_0 + (ib-r[x]) \times f_1 + (ib-r[x+1]) \times f_2 + (ib-r[x+2]) \times f_3 + (ib-r[x+3]) \times f_4 \qquad (\text{Eq. 45})$$

$$fc[y] = (c[y-1] << \log(M)) \times f_0 + (c[y] << \log(M)) \times f_1 + (c[y+1] << \log(M)) \times f_2 + (c[y+2] << \log(M)) \times f_3 + (c[y+3] << \log(M)) \times f_4 \qquad (\text{Eq. 46})$$

$$fr[x] = (r[x-1] << \log(N)) \times f_0 + (r[x] << \log(N)) \times f_1 + (r[x+1] << \log(N)) \times f_2 + (r[x+2] << \log(N)) \times f_3 + (r[x+3] << \log(N)) \times f_4 \qquad (\text{Eq. 47})$$

fwt[x][y] can be derived as Equation 48:

$$fwt[x][y] = wt \Sigma_{i=-2}^{2} \Sigma_{j=-2}^{2} g[i+2][j+2] \times h(x+i, y+j) \qquad (\text{Eq. 48})$$

wherein $f_0$ is equal to 82, $f_1$ is equal to 252, $f_2$ is equal to 356, $f_3$ is equal to 252, $f_4$ is equal to 82, and g[5][5] is a two-dimension array as follows:
g[5][5]={{7,20,28,20,7]},
 {20,62,88,62,20},
 {28,88,124,88,28},
 {20,62,88,62,20},
 {7,20,28,20,7]}
and h(x,y) is a bivariate function defined according to Equation 49 or 50.

$$h(x,y) = xy \qquad (\text{Eq. 49})$$

or $$h(x, y) = \begin{cases} xy & \text{when } x > 0 \text{ and } y > 0 \\ 0 & \text{otherwise} \end{cases} \qquad (\text{Eq. 50})$$

so fwt[x][y] can be simplified as $$fwt[x][x] = wt \times x \times y << 10 \qquad (\text{Eq. 51})$$

Then, the predicted value of each sample can be derived based on the following Equation 52:

$$\text{Pred}[x][y] = (((fdc[y+1]) \times (x+1)) << \text{Log}(N)) + ((fdr[y+1] \times (y+1)) << \text{Log}(M)) + ((fr[x+1] + fc[y+1]) << (\text{Log}(M) + \text{Log}(N))) + fwt[x][y] + (1 << (\text{Log}(M) + \text{Log}(N) + \text{shift}))) >> (\text{Log}(M) + \text{Log}(N) + \text{shift} + 1),\ (x=0\sim M-1, y=0\sim N-1) \qquad (\text{Eq. 52})$$

In Equation 52, Pred[x][y] is the predicted value of the sample derived in smoothing bilinear mode located in (x, y) in the current block and "shift" is equal to 10.

Mathmatically, Equation 52 can be reformated as following Equation 53

$$\text{Pred}[x][y] = (((((ia << \text{shift}) - (c[y-1] \times f_0 + c[y] \times f_1 c[y+1] \times f_2 + c[y+2] \times f_3 + c[y+3] \times f_4)) \times (x+1)) << \text{Log}(N)) + (((ib << \text{shift}) - (r[x-1] \times f_0 + r[x] \times f_1 + r[x+1] \times f_2 + c[y+2] \times f_3 + c[y+3] \times f_4) \times (y+1)) << \text{Log}(M)) + ((c[y-1] \times f_0 + c[y] \times f_1 + c[y+1] \times f_2 + c[y+2] \times f_3 + c[y+3] \times f_1 + r[x-1] \times f_0 + r[x] \times f_1 + r[x+1] \times f_2 + c[y+2] \times f_3 + c[y+3] \times f_4) << (\text{Log}(M) + \text{Log}(N))) + (((ic << 1) - ia - ib) \times x \times y << \text{shift}) + (1 << (\text{Log}(M) + \text{Log}(N) + \text{shift}))) >> (\text{Log}(M) + \text{Log}(N) + \text{shift} + 1),\ (x=0\sim M-1, y=0\sim N-1) \qquad (\text{Eq. 53})$$

wherein $c[y-1] \times f_0 + c[y] \times f_1 + c[y+1] \times f_2 + c[y+2] \times f_3 + c[y+3] \times f_4$ is a weighted of left reference samples and $r[x-1] \times f_0 + r[x] \times f_1 + r[x+1] \times f_2 + c[y+2] \times f_3 + c[y+3] \times f_4$ is a weighted combination of top reference samples. $f_0$, $f_1$, $f_2$, $f_3$ and $f_4$ are weights with value euqal to 82, 252, 356, 252 and 82, respectively.

In some embodiments, at least one flag is signaled for each block to switch between the original bilinear mode and the proposed weighted bilinear mode. The flag can be signaled in a high level such as sequence parameter set, sequence header, picture parameter set, picture header, slice header or patch header. Alternatively, the flag can be signaled in a low level, such as coding tree unit level, coding unit level, prediction unit level or transform unit level.

Figure 13:
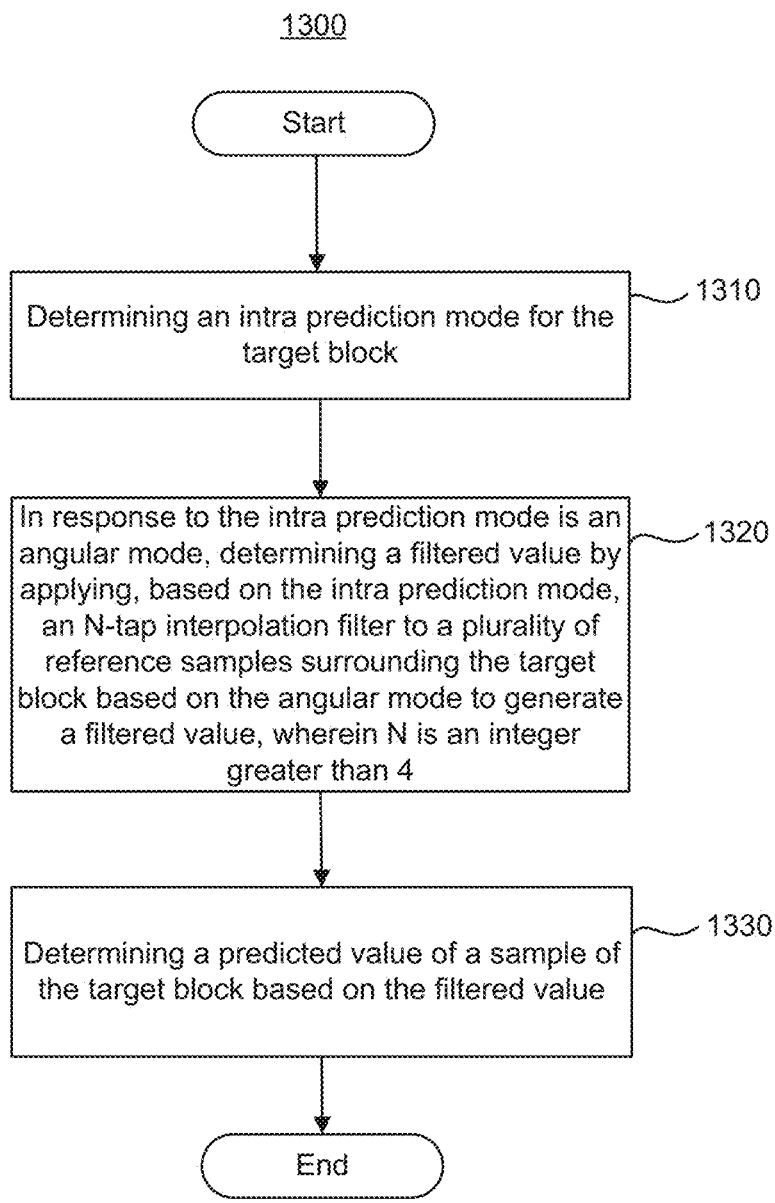
FIG. 13 illustrates an exemplary flow diagram for an intra prediction processing for long-tap interpolation in angular mode, consistent with some embodiments of the present disclosure.
Figure 14:
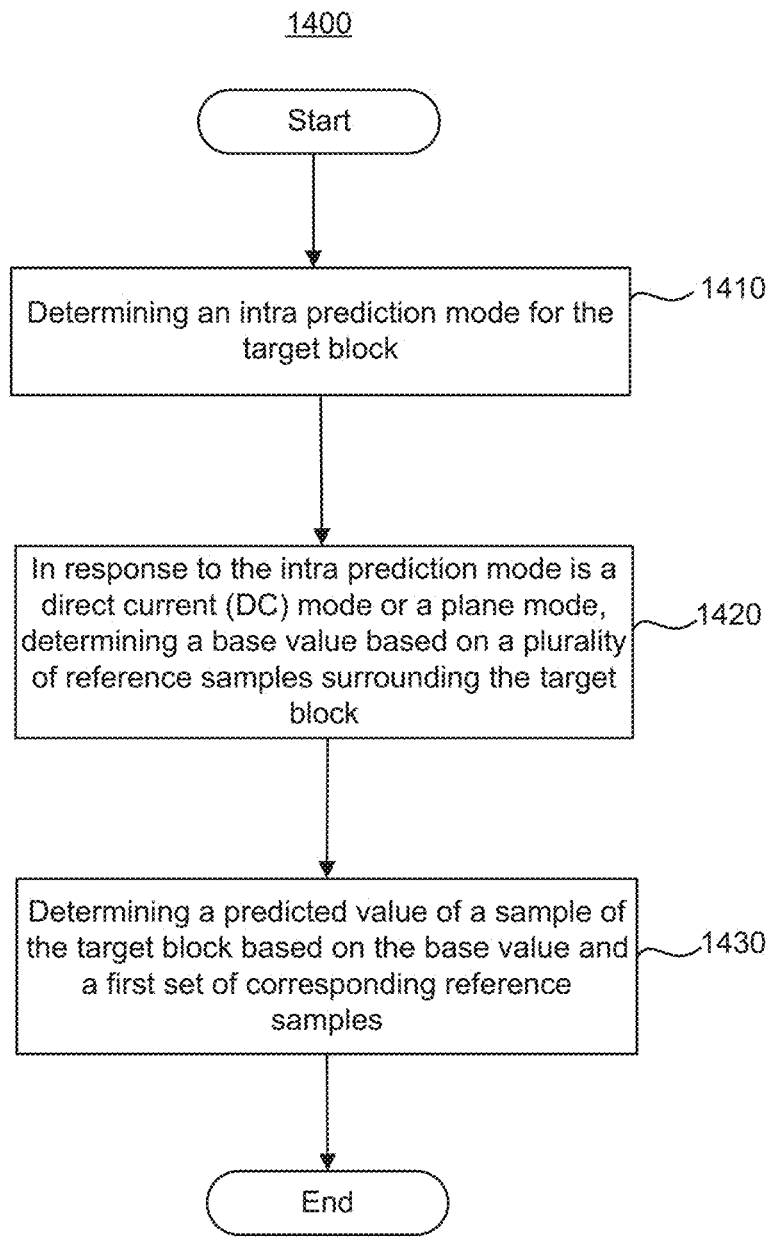
FIG. 14 illustrates exemplary flow diagram for an intra prediction processing in direct-current (DC) mode or plane mode, consistent with some embodiments of the present disclosure.
Figure 15:
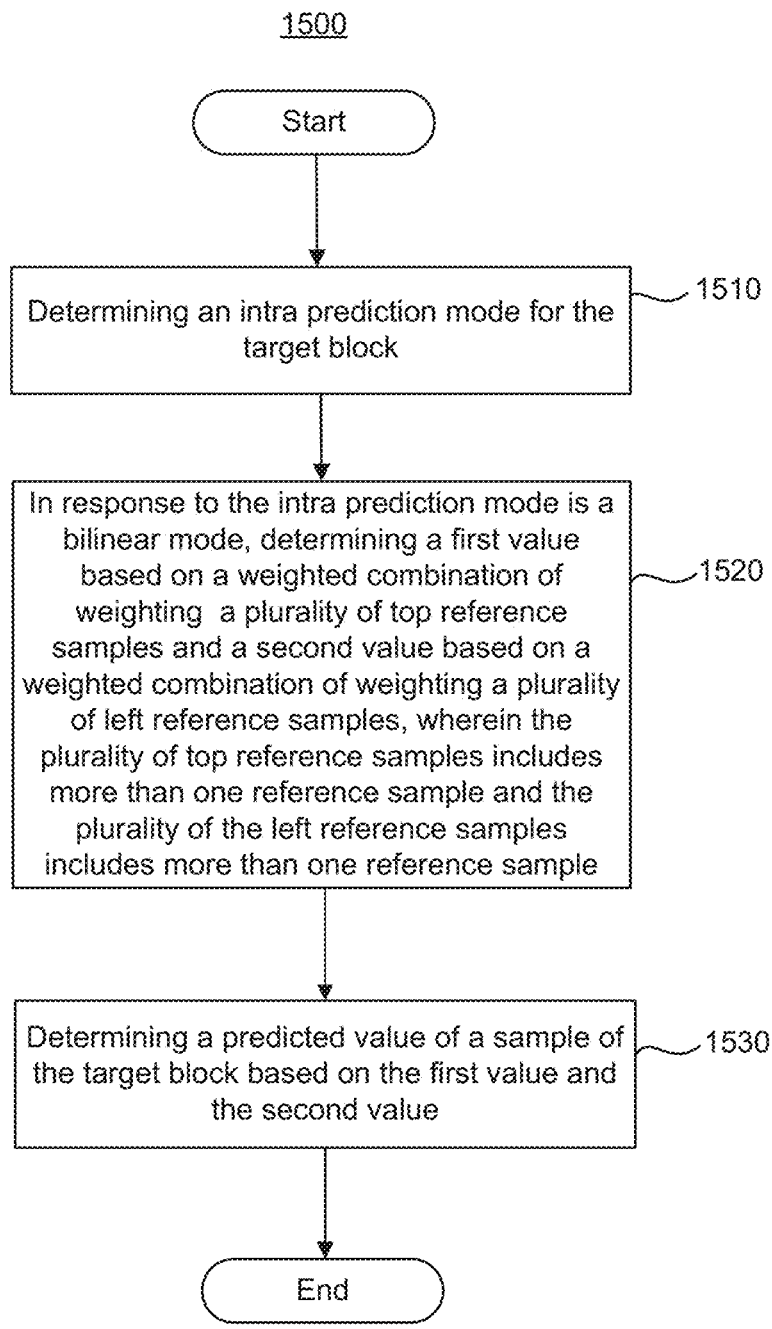
FIG. 15 illustrates exemplary flow diagram for an intra prediction processing in bilinear mode, consistent with some embodiments of the present disclosure.

Embodiments of the present disclosure further include methods for intra prediction methods in video coding. FIGS. 13-15 show flow charts of an example of a process of video decoding.

FIG. 13 illustrates a flow chart of an exemplary method 1300 for video processing regarding intra prediction, according to some embodiments of the disclosure. Method 1300 can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1300. In some embodiments, method 1300 can be implemented by a computer program product, embodied in a computer-readable medium, including computer-executable instructions such as program code, executed by computers (e.g., apparatus 400 of FIG. 4.)

As shown in FIG. 13, according to some embodiments, in step 1310, an intra prediction mode can be determined for a target block. For example, the intra prediction modes is an angular mode, the predicted value is generated by directional extrapolation or interpolation of the reference samples.

In step 1320, in response to the angular mode, an N-tap interpolation filter is applied to a plurality of reference samples surrounding the target block based on the intra prediction mode to determine a filtered value. In some embodiments, N is an integer greater than 4. For example, in FIG. 9, an 8-tap interpolation filter is applied to eight integer reference samples, a, b, c, d, e, f, g, h, surrounding the reference position referred to by the sample to be predicted are used to generate the filtered value as following equation: $Pred_k=(f_0 \times a + f_1 \times b + f_2 \times c + f_3 \times d + f_4 \times e + f_5 \times f + f_6 \times g + f_7 \times h + offset) >> shift$, wherein $f_0$, $f_1$, $f_2$, $f_3$, $f_4$, $f_5$, $f_6$ and $f_7$ are interpolation filter coefficients, and "shift" is the right shift number wherein the sum of $f_0$ to $f_7$ is equal to shift-th power of 2. In some embodiments, an offset is equal to (shift−1)-th power of 2.

In step 1330, a predicted value of a sample of the target block is determined based on the filtered value. In some embodiments, in FIG. 9, the $Pred_k$ is the predicted value of sample K. In some other embodiments, the $Pred_k$ is further weighted averaged with some corresponding reference samples to generate predicted value of sample K.

FIG. 14 illustrates a flow chart of an exemplary method 1400 for video processing regarding intra prediction, according to some embodiments of the disclosure. Method 1400 can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1400. In some embodiments, method 1400 can be implemented by a computer program product, embodied in a computer-readable medium, including computer-executable instructions such as program code, executed by computers (e.g., apparatus 400 of FIG. 4.)

As shown in FIG. 14, according to some embodiments, in step 1410, an intra prediction mode is determined for the target block. For example, the intra prediction mode is a direct current (DC) mode or a plane mode. DC mode derives the predicted value based on a averaged value of reference sample Plane mode derives the predicted values of samples based on a plane model.

In step 1420, in response to the DC mode or the plane mode, a base value is determined based on a plurality of reference samples surrounding the target block. For example, the base value is derived based on the average of the reference samples surrounding the target block in DC mode, or based on a vertical slope and a horizontal slop which are derived from the reference sample value difference.

In step 1430, a predicted value of a sample of the target block is determined based on the base value and a first set of corresponding reference samples. In some embodiments, in FIG. 12, K is equal to 2 and the predicted values of the samples in the first two rows of the block and first two columns of the block are derived based on the base value and the values of reference sample near the current sample. The number of the above K row samples and first K columns samples is not limited here.

FIG. 15 illustrates a flow chart of an exemplary method 1500 for video processing regarding intra prediction, according to some embodiments of the disclosure. Method 1500 can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1500. In some embodiments, method 1500 can be implemented by a computer program product, embodied in a computer-readable medium, including computer-executable instructions such as program code, executed by computers (e.g., apparatus 400 of FIG. 4.)

As shown in FIG. 15, in step 1510, an intra prediction mode is determined for the target block. For example, the intra prediction mode is a bilinear mode. The predicted value of the bilinear mode is based on two linear interpolated values.

In step 1520, in response to the bilinear mode, a first value based on a weighted combination of a plurality of top reference samples and a second value based on a weighted combination of a plurality of left reference samples are determined. For example, the plurality of top reference samples includes more than one reference sample and the plurality of the left reference samples includes more than one reference sample. In some embodiments, the reference samples are smoothing filtered, and the different value between the bottom-right corner and top-left corner and bottom-left corner are also smoothing filtered. The derivation of the first value and the second value could be described as follows.

$fdc[y]=(ia-c[y-1]) \times f_0+(ia-c[y]) \times f_1+(ia-c[y+1]) \times f_2+(ia-c[y+2]) \times f_3+(ia-c[y+3]) \times f_4$ $fdr[x]=(ib-r[x-1]) \times f_0+(ib-r[x]) \times f_0+(ib-r[x+1]) \times f_2+(ib-r[x+2]) \times f_3+(ib-r[x+3]) \times f_4$ $fc[y]=(c[y-1]<<\log(M)) \times f_0+(c[y]<<\log(M)) \times f_1+(c[y+1]<<\log(M)) \times f_2+(c[y+2]<<\log(M)) \times f_3+(c[y+3]<<\log(M)) \times f_4$ $fr[x]=(r[x-1]<<\log(N)) \times f_0+(r[x]<<\log(N)) \times f_1+(r[x+1]<<\log(N)) \times f_2+(r[x+2]<<\log(N)) \times f_3+(r[x+3]<<\log(N)) \times f_4$ In step 1530, a predicted value of a sample of the target block is determined based on the first value and the second value. In some embodiments, based on the filtered values of the reference samples, the refined predicted value of each sample is derived. The derivation of predicted values can be described as follows.

$Pred[x][y]=(((((ia<<shift)-(c[y-1] \times f_0+c[y] \times f_1+c[y+1] \times f_2+c[y+2] \times f_3+c[y+3] \times f_4)) \times (x+1))<<Log(N))+(((((ib<<shift)-(r[x-1] \times f_0+r[x] \times f_1+r[x+1] \times f_2+c[y+2] \times f_3+c[y+3] \times f_4)) \times (y+1))<<Log(M))+((c[y-1] \times f_0+c[y] \times f_1+c[y+1] \times f_2+c[y+2] \times f_3+c[y+3] \times f_4+r[x-1] \times f_0+r[x] \times f_1+r[x+1] \times f_2+c[y+2] \times f_3+c[y+3] \times f_4)<<(Log(M)+Log(N)))+(((ic<<1)-ia-ib) \times x \times y<<shfit)+(1<<(Log(M)+Log(N)+shift)))>>(Log(M)+Log(N)+shift+1)$ The methods shown in FIGS. 13-15 are for illustrative purpose and are described below from the perspective of both decoder and encoder. It is contemplated that a video encoder can perform all or a subset of the inverse operations of the decoding operations. Unless otherwise noted, techniques of video decoding described in the present disclosure are also intended to encompass the inverse of the disclosed video encoding techniques (i.e., video encoding techniques associated with the disclosed video decoding techniques), and vice versa.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The embodiments may further be described using the following clauses:

1. A computer-implemented video or image processing method, comprising:
   performing an intra predicting process for a target block, wherein performing the intra predicting process comprises:
   determining an intra prediction mode for the target block;
   in response to the intra prediction mode is an angular mode, determining a filtered value by applying an N-tap interpolation filter to a plurality of reference samples surrounding the target block based on the angular mode, wherein N is an integer greater than 4; and
   determining a predicted value of a sample of the target block based on the filtered value.
2. The method according to clause 1, wherein determining the predicted value of the sample of the target block based on the filtered value further comprising:
   determining the predicted value of the sample of the target block based on a weighted combination of the filtered value and values of corresponding reference samples.
3. The method according to clause 1, further comprising:
   determining a flag; and
   determining the filtered value by applying the N-tap interpolation filter when the flag is equal to a first value and determining the filtered value by applying an M-tap interpolation filter when the flag is equal to a second value, wherein M is an integer less than N.
4. The method according to clause 1, wherein N is equal to 6, 7, or 8.
5. The method according to clause 1, wherein the plurality of reference samples comprises a left reference sample in a row to the left of the target block or a top reference sample in a column to the top of the target block, further comprising:
   padding more than two left reference samples from the top reference samples of the target block; or
   padding more than two top reference samples from the left reference samples of the target block.
6. The method of clause 5, wherein padding the reference samples independently on the intra prediction mode.
7. The method of clause 2, wherein the corresponding reference samples includes two left reference samples in a column to the left of the target block and two top reference samples in a row to the top of the target block.
8. The method of clause 1, further comprising:
   selecting the N-tap filter from a plurality of sets of filters based on the intra prediction mode, wherein the plurality of sets of filters including a first set of filters and a second set of filters.
9. The method of clause 8, wherein the first set of filters or the second set of filters includes:
   {33, 156, 209, 223, 211, 156, 33, 3},
   {30, 153, 208, 223, 212, 159, 36, 3},
   {27, 149, 208, 223, 213, 162, 39, 3},
   {26, 146, 207, 223, 213, 164, 42, 3},
   {23, 141, 206, 223, 214, 168, 46, 3},
   {21, 138, 205, 223, 215, 170, 49, 3},
   {18, 133, 204, 223, 216, 174, 53, 3},
   {17, 130, 204, 222, 216, 176, 56, 3},
   {16, 125, 203, 222, 217, 178, 60, 3},
   {14, 123, 202, 222, 217, 180, 63, 3},
   {13, 118, 201, 222, 218, 182, 67, 3},
   {12, 113, 199, 222, 218, 184, 72, 4},
   {10, 109, 198, 221, 219, 187, 76, 4},
   {9, 106, 198, 221, 219, 188, 79, 4},
   {9, 101, 195, 221, 219, 189, 84, 6},
   {7, 97, 195, 220, 220, 191, 88, 6},
   {6, 92, 194, 220, 220, 194, 92, 6},
   {6, 88, 191, 220, 220, 195, 97, 7},
   {6, 84, 189, 219, 221, 195, 101, 9},
   {4, 79, 188, 219, 221, 198, 106, 9},
   {4, 76, 187, 219, 221, 198, 109, 10},
   {4, 72, 184, 218, 222, 199, 113, 12},
   {3, 67, 182, 218, 222, 201, 118, 13},
   {3, 63, 180, 217, 222, 202, 123, 14},
   {3, 60, 178, 217, 222, 203, 125, 16},
   {3, 56, 176, 216, 222, 204, 130, 17},
   {3, 53, 174, 216, 223, 204, 133, 18},
   {3, 49, 170, 215, 223, 205, 138, 21},
   {3, 46, 168, 214, 223, 206, 141, 23},
   {3, 42, 164, 213, 223, 207, 146, 26},
   {3, 39, 162, 213, 223, 208, 149, 27},
   {3, 36, 159, 212, 223, 208, 153, 30}
   or
   {16, 170, 215, 226, 214, 169, 15, −1},
   {13, 165, 214, 226, 215, 173, 20, −2},
   {10, 162, 215, 226, 216, 176, 22, −3},
   {8, 157, 214, 226, 216, 179, 27, −3},
   {6, 152, 214, 226, 217, 182, 31, −4},
   {3, 146, 213, 226, 218, 186, 36, −4},
   {2, 143, 214, 226, 218, 188, 39, −6},
   {0, 137, 213, 226, 219, 190, 45, −6},
   {−1, 132, 212, 226, 220, 192, 49, −6},
   {−3, 128, 213, 226, 220, 194, 53, −7},
   {−4, 122, 211, 225, 221, 197, 59, −7},
   {−6, 116, 210, 225, 222, 200, 64, −7},
   {−6, 112, 211, 225, 222, 200, 68, −8},
   {−7, 106, 210, 225, 222, 203, 74, −9},
   {−7, 101, 209, 225, 223, 204, 78, −9},
   {−9, 96, 208, 224, 224, 206, 84, −9},
   {−9, 90, 207, 224, 224, 207, 90, −9},
   {−9, 84, 206, 224, 224, 208, 96, −9},
   {−9, 78, 204, 223, 225, 209, 101, −7},
   {−9, 74, 203, 222, 225, 210, 106, −7},
   {−8, 68, 200, 222, 225, 211, 112, −6},
   {−7, 64, 200, 222, 225, 210, 116, −6},
   {−7, 59, 197, 221, 225, 211, 122, −4},
   {−7, 53, 194, 220, 226, 213, 128, −3},
   {−6, 49, 192, 220, 226, 212, 132, −1},
   {−6, 45, 190, 219, 226, 213, 137, 0},
   {−6, 39, 188, 218, 226, 214, 143, 2},
   {−4, 36, 186, 218, 226, 213, 146, 3},
   {−4, 31, 182, 217, 226, 214, 152, 6},
   {−3, 27, 179, 216, 226, 214, 157, 8}, {−3, 22, 176, 216, 226, 215, 162, 10},
{−2, 20, 173, 215, 226, 214, 165, 13}
or
{0, 91, 108, 114, 108, 91, 0, 0},
{−1, 88, 107, 114, 108, 93, 3, 0},
{−3, 85, 106, 114, 109, 95, 6, 0},
{−3, 82, 107, 114, 109, 96, 8, −1},
{−3, 79, 109, 114, 109, 96, 11, −3},
{−4, 76, 108, 114, 109, 98, 14, −3},
{−6, 73, 107, 114, 110, 100, 17, −3},
{−6, 72, 107, 114, 110, 100, 18, −3},
{−6, 70, 107, 114, 110, 100, 20, −3},
{−7, 67, 106, 114, 111, 102, 22, −3},
{−8, 64, 106, 113, 111, 104, 25, −3},
{−9, 60, 106, 113, 112, 105, 29, −4},
{−9, 56, 107, 113, 112, 106, 33, −6},
{−7, 54, 107, 113, 112, 104, 35, −6},
{−6, 53, 107, 113, 112, 103, 36, −6},
{−6, 49, 106, 113, 112, 104, 40, −6},
{−6, 45, 105, 112, 112, 105, 45, −6},
{−6, 40, 104, 112, 113, 106, 49, −6},
{−6, 36, 103, 112, 113, 107, 53, −6},
{−6, 35, 104, 112, 113, 107, 54, −7},
{−6, 33, 106, 112, 113, 107, 56, −9},
{−4, 29, 105, 112, 113, 106, 60, −9},
{−3, 25, 104, 111, 113, 106, 64, −8},
{−3, 22, 102, 111, 114, 106, 67, −7},
{−3, 20, 100, 110, 114, 107, 70, −6},
{−3, 18, 100, 110, 114, 107, 72, −6},
{−3, 17, 100, 110, 114, 107, 73, −6},
{−3, 14, 98, 109, 114, 108, 76, −4},
{−3, 11, 96, 109, 114, 109, 79, −3},
{−1, 8, 96, 109, 114, 107, 82, −3},
{0, 6, 95, 109, 114, 106, 85, −3},
{0, 3, 93, 108, 114, 107, 88, −1}
or
{46, 145, 210, 222, 210, 145, 46, 0},
{44, 142, 208, 221, 211, 147, 49, 2},
{43, 139, 206, 221, 211, 149, 52, 3},
{41, 136, 204, 221, 212, 151, 55, 4},
{40, 133, 202, 220, 212, 153, 58, 6},
{39, 130, 200, 220, 212, 155, 61, 7},
{37, 126, 198, 220, 213, 157, 64, 9},
{36, 123, 196, 219, 213, 160, 67, 10},
{34, 120, 194, 219, 213, 162, 71, 11},
{33, 117, 192, 218, 214, 163, 74, 13},
{31, 114, 190, 218, 214, 166, 77, 14},
{30, 111, 188, 218, 214, 167, 80, 16},
{28, 108, 186, 217, 215, 170, 83, 17},
{27, 105, 184, 217, 215, 172, 86, 18},
{26, 101, 182, 217, 215, 174, 89, 20},
{24, 99, 180, 216, 216, 176, 92, 21},
{23, 95, 178, 216, 216, 178, 95, 23},
{21, 92, 176, 216, 216, 180, 99, 24},
{20, 89, 174, 215, 217, 182, 101, 26},
{18, 86, 172, 215, 217, 184, 105, 27},
{17, 83, 170, 215, 217, 186, 108, 28},
{16, 80, 167, 214, 218, 188, 111, 30},
{14, 77, 166, 214, 218, 190, 114, 31},
{13, 74, 163, 214, 218, 192, 117, 33},
{11, 71, 162, 213, 219, 194, 120, 34},
{10, 67, 160, 213, 219, 196, 123, 36},
{9, 64, 157, 213, 220, 198, 126, 37},
{7, 61, 155, 212, 220, 200, 130, 39},
{6, 58, 153, 212, 220, 202, 133, 40},
{4, 55, 151, 212, 221, 204, 136, 41},
{3, 52, 149, 211, 221, 206, 139, 43},
{2, 49, 147, 211, 221, 208, 142, 44}.

10. A system for video or image processing, the system comprising:
a memory storing a set of instructions; and
one or more processors configured to execute the set of instructions to cause the system to perform an intra predicting process for a target block:
determining an intra prediction mode for the target block;
in response to the intra prediction mode is an angular mode, determining a filtered value by applying an N-tap interpolation filter to a plurality of reference samples surrounding the target block based on the angular mode, wherein N is an integer greater than 4; and determining a predicted value of a sample of the target block based on the filtered value.

11. The system according to clause 10, wherein determining the predicted value of the sample of the target block based on the filtered value further comprising:
determining the predicted value of the sample of the target block based on a weighted combination of the filtered value and values of corresponding reference samples.

12. The system according to clause 10, wherein the one or more processors are further configured to execute the set of instruction to cause the system to perform:
determining a flag; and
determining the filtered value by applying the N-tap interpolation filter when the flag is equal to a first value and determining the filtered value by applying an M-tap interpolation filter when the flag is equal to a second value, wherein M is an integer less than N.

13. The system according to clause 10, wherein N is equal to 6, 7. 8.

14. The system according to clause 10, wherein the plurality of reference samples comprises a left reference sample in a row to the left of the target block or a top reference sample in a column to the top of the target block, further comprising:
padding more than two left reference samples from the top reference samples of the target block; or
padding more than two top reference samples from the left reference samples of the target block.

15. The system according to clause 14, wherein padding the reference samples independently on the intra prediction mode.

16. The system according to clause 10, wherein the corresponding reference samples includes two left reference samples in a column to the left of the target block and two top reference samples in a row to the top of the target block.

17. The system according to clause 9, wherein the one or more processors are further configured to execute the set of instruction to cause the system to perform:
selecting the N-tap filter from a plurality of sets of filters based on the intra prediction mode, wherein the plurality of sets of filters including a first set of filters and a second set of filters.

18. The system of clause 17, wherein the first set of filters or the second set of filters includes:
{33, 156, 209, 223, 211, 156, 33, 3},
{30, 153, 208, 223, 212, 159, 36, 3},
{27, 149, 208, 223, 213, 162, 39, 3},
{26, 146, 207, 223, 213, 164, 42, 3},
{23, 141, 206, 223, 214, 168, 46, 3},
{21, 138, 205, 223, 215, 170, 49, 3},
{18, 133, 204, 223, 216, 174, 53, 3}, {17, 130, 204, 222, 216, 176, 56, 3},
{16, 125, 203, 222, 217, 178, 60, 3},
{14, 123, 202, 222, 217, 180, 63, 3},
{13, 118, 201, 222, 218, 182, 67, 3},
{12, 113, 199, 222, 218, 184, 72, 4},
{10, 109, 198, 221, 219, 187, 76, 4},
{9, 106, 198, 221, 219, 188, 79, 4},
{9, 101, 195, 221, 219, 189, 84, 6},
{7, 97, 195, 220, 220, 191, 88, 6},
{6, 92, 194, 220, 220, 194, 92, 6},
{6, 88, 191, 220, 220, 195, 97, 7},
{6, 84, 189, 219, 221, 195, 101, 9},
{4, 79, 188, 219, 221, 198, 106, 9},
{4, 76, 187, 219, 221, 198, 109, 10},
{4, 72, 184, 218, 222, 199, 113, 12},
{3, 67, 182, 218, 222, 201, 118, 13},
{3, 63, 180, 217, 222, 202, 123, 14},
{3, 60, 178, 217, 222, 203, 125, 16},
{3, 56, 176, 216, 222, 204, 130, 17},
{3, 53, 174, 216, 223, 204, 133, 18},
{3, 49, 170, 215, 223, 205, 138, 21},
{3, 46, 168, 214, 223, 206, 141, 23},
{3, 42, 164, 213, 223, 207, 146, 26},
{3, 39, 162, 213, 223, 208, 149, 27},
{3, 36, 159, 212, 223, 208, 153, 30}
or
{16, 170, 215, 226, 214, 169, 15, −1},
{13, 165, 214, 226, 215, 173, 20, −2},
{10, 162, 215, 226, 216, 176, 22, −3},
{8, 157, 214, 226, 216, 179, 27, −3},
{6, 152, 214, 226, 217, 182, 31, −4},
{3, 146, 213, 226, 218, 186, 36, −4},
{2, 143, 214, 226, 218, 188, 39, −6},
{0, 137, 213, 226, 219, 190, 45, −6},
{−1, 132, 212, 226, 220, 192, 49, −6},
{−3, 128, 213, 226, 220, 194, 53, −7},
{−4, 122, 211, 225, 221, 197, 59, −7},
{−6, 116, 210, 225, 222, 200, 64, −7},
{−6, 112, 211, 225, 222, 200, 68, −8},
{−7, 106, 210, 225, 222, 203, 74, −9},
{−7, 101, 209, 225, 223, 204, 78, −9},
{−9, 96, 208, 224, 224, 206, 84, −9},
{−9, 90, 207, 224, 224, 207, 90, −9},
{−9, 84, 206, 224, 224, 208, 96, −9},
{−9, 78, 204, 223, 225, 209, 101, −7},
{−9, 74, 203, 222, 225, 210, 106, −7},
{−8, 68, 200, 222, 225, 211, 112, −6},
{−7, 64, 200, 222, 225, 210, 116, −6},
{−7, 59, 197, 221, 225, 211, 122, −4},
{−7, 53, 194, 220, 226, 213, 128, −3},
{−6, 49, 192, 220, 226, 212, 132, −1},
{−6, 45, 190, 219, 226, 213, 137, 0},
{−6, 39, 188, 218, 226, 214, 143, 2},
{−4, 36, 186, 218, 226, 213, 146, 3},
{−4, 31, 182, 217, 226, 214, 152, 6},
{−3, 27, 179, 216, 226, 214, 157, 8},
{−3, 22, 176, 216, 226, 215, 162, 10},
{−2, 20, 173, 215, 226, 214, 165, 13}
or
{0, 91, 108, 114, 108, 91, 0, 0},
{−1, 88, 107, 114, 108, 93, 3, 0},
{−3, 85, 106, 114, 109, 95, 6, 0},
{−3, 82, 107, 114, 109, 96, 8, −1},
{−3, 79, 109, 114, 109, 96, 11, −3},
{−4, 76, 108, 114, 109, 98, 14, −3},
{−6, 73, 107, 114, 110, 100, 17, −3},
{−6, 72, 107, 114, 110, 100, 18, −3},
{−6, 70, 107, 114, 110, 100, 20, −3},
{−7, 67, 106, 114, 111, 102, 22, −3},
{−8, 64, 106, 113, 111, 104, 25, −3},
{−9, 60, 106, 113, 112, 105, 29, −4},
{−9, 56, 107, 113, 112, 106, 33, −6},
{−7, 54, 107, 113, 112, 104, 35, −6},
{−6, 53, 107, 113, 112, 103, 36, −6},
{−6, 49, 106, 113, 112, 104, 40, −6},
{−6, 45, 105, 112, 112, 105, 45, −6},
{−6, 40, 104, 112, 113, 106, 49, −6},
{−6, 36, 103, 112, 113, 107, 53, −6},
{−6, 35, 104, 112, 113, 107, 54, −7},
{−6, 33, 106, 112, 113, 107, 56, −9},
{−4, 29, 105, 112, 113, 106, 60, −9},
{−3, 25, 104, 111, 113, 106, 64, −8},
{−3, 22, 102, 111, 114, 106, 67, −7},
{−3, 20, 100, 110, 114, 107, 70, −6},
{−3, 18, 100, 110, 114, 107, 72, −6},
{−3, 17, 100, 110, 114, 107, 73, −6},
{−3, 14, 98, 109, 114, 108, 76, −4},
{−3, 11, 96, 109, 114, 109, 79, −3},
{−1, 8, 96, 109, 114, 107, 82, −3},
{0, 6, 95, 109, 114, 106, 85, −3},
{0, 3, 93, 108, 114, 107, 88, −1}
or
{46, 145, 210, 222, 210, 145, 46, 0},
{44, 142, 208, 221, 211, 147, 49, 2},
{43, 139, 206, 221, 211, 149, 52, 3},
{41, 136, 204, 221, 212, 151, 55, 4},
{40, 133, 202, 220, 212, 153, 58, 6},
{39, 130, 200, 220, 212, 155, 61, 7},
{37, 126, 198, 220, 213, 157, 64, 9},
{36, 123, 196, 219, 213, 160, 67, 10},
{34, 120, 194, 219, 213, 162, 71, 11},
{33, 117, 192, 218, 214, 163, 74, 13},
{31, 114, 190, 218, 214, 166, 77, 14},
{30, 111, 188, 218, 214, 167, 80, 16},
{28, 108, 186, 217, 215, 170, 83, 17},
{27, 105, 184, 217, 215, 172, 86, 18},
{26, 101, 182, 217, 215, 174, 89, 20},
{24, 99, 180, 216, 216, 176, 92, 21},
{23, 95, 178, 216, 216, 178, 95, 23},
{21, 92, 176, 216, 216, 180, 99, 24},
{20, 89, 174, 215, 217, 182, 101, 26},
{18, 86, 172, 215, 217, 184, 105, 27},
{17, 83, 170, 215, 217, 186, 108, 28},
{16, 80, 167, 214, 218, 188, 111, 30},
{14, 77, 166, 214, 218, 190, 114, 31},
{13, 74, 163, 214, 218, 192, 117, 33},
{11, 71, 162, 213, 219, 194, 120, 34},
{10, 67, 160, 213, 219, 196, 123, 36},
{9, 64, 157, 213, 220, 198, 126, 37},
{7, 61, 155, 212, 220, 200, 130, 39},
{6, 58, 153, 212, 220, 202, 133, 40},
{4, 55, 151, 212, 221, 204, 136, 41},
{3, 52, 149, 211, 221, 206, 139, 43},
{2, 49, 147, 211, 221, 208, 142, 44}.

19. A non-transitory computer readable medium that stores a set of instructions that is executable by one or more processors of an apparatus to cause the apparatus to initiate a method for video or image processing, the method comprising:

performing an intra predicting process for a target block, wherein performing the intra predicting process comprises:

determining an intra prediction mode for the target block;

in response to the intra prediction mode is an angular mode, determining a filtered value by applying an N-tap interpolation filter to a plurality of reference samples surrounding the target block based on the angular mode, wherein N is an integer greater than 4; and determining a predicted value of a sample of the target block based on the filtered value.

20. The non-transitory computer readable medium of clause 19, wherein determining the predicted value of the sample of the target block based on the filtered value further comprising:

determining the predicted value of the sample of the target block based on a weighted combination of the filtered value and values of corresponding reference samples.

21. The non-transitory computer readable medium of clause 19, wherein the set of instructions that is executable by one or more processors of the apparatus to cause the apparatus to further perform:

determining a flag; and determining the filtered value by applying the N-tap interpolation filter when the flag is equal to a first value and determining the filtered value by applying an M-tap interpolation filter when the flag is equal to a second value, wherein M is an integer less than N.

22. The non-transitory computer readable medium of clause 19, wherein N is equal to 6, 7. 8.

23. The non-transitory computer readable medium of clause 19, wherein the plurality of reference samples comprises a left reference sample in a row to the left of the target block or a top reference sample in a column to the top of the target block, further comprising:

padding more than two left reference samples from the top reference samples of the target block; or padding more than two top reference samples from the left reference samples of the target block.

24. The non-transitory computer readable medium of clause 23, wherein padding the reference samples independently on the intra prediction mode.

25. The non-transitory computer readable medium of clause 20, wherein the corresponding reference samples includes two left reference samples in a column to the left of the target block and two top reference samples in a row to the top of the target block.

26. The non-transitory computer readable medium of clause 19, wherein the set of instructions that is executable by one or more processors of the apparatus to cause the apparatus to further perform:

selecting the N-tap filter from a plurality of sets of filters based on the intra prediction mode, wherein the plurality of sets of filters including a first set of filters and a second set of filters.

27. The non-transitory computer readable medium of clause 26, wherein the first set of filters or the second set of filters includes:

{33, 156, 209, 223, 211, 156, 33, 3},
{30, 153, 208, 223, 212, 159, 36, 3},
{27, 149, 208, 223, 213, 162, 39, 3},
{26, 146, 207, 223, 213, 164, 42, 3},
{23, 141, 206, 223, 214, 168, 46, 3},
{21, 138, 205, 223, 215, 170, 49, 3},
{18, 133, 204, 223, 216, 174, 53, 3},
{17, 130, 204, 222, 216, 176, 56, 3},
{16, 125, 203, 222, 217, 178, 60, 3},
{14, 123, 202, 222, 217, 180, 63, 3},
{13, 118, 201, 222, 218, 182, 67, 3},
{12, 113, 199, 222, 218, 184, 72, 4},
{10, 109, 198, 221, 219, 187, 76, 4},
{9, 106, 198, 221, 219, 188, 79, 4},
{9, 101, 195, 221, 219, 189, 84, 6},
{7, 97, 195, 220, 220, 191, 88, 6},
{6, 92, 194, 220, 220, 194, 92, 6},
{6, 88, 191, 220, 220, 195, 97, 7},
{6, 84, 189, 219, 221, 195, 101, 9},
{4, 79, 188, 219, 221, 198, 106, 9},
{4, 76, 187, 219, 221, 198, 109, 10},
{4, 72, 184, 218, 222, 199, 113, 12},
{3, 67, 182, 218, 222, 201, 118, 13},
{3, 63, 180, 217, 222, 202, 123, 14},
{3, 60, 178, 217, 222, 203, 125, 16},
{3, 56, 176, 216, 222, 204, 130, 17},
{3, 53, 174, 216, 223, 204, 133, 18},
{3, 49, 170, 215, 223, 205, 138, 21},
{3, 46, 168, 214, 223, 206, 141, 23},
{3, 42, 164, 213, 223, 207, 146, 26},
{3, 39, 162, 213, 223, 208, 149, 27},
{3, 36, 159, 212, 223, 208, 153, 30} or

{16, 170, 215, 226, 214, 169, 15, −1},
{13, 165, 214, 226, 215, 173, 20, −2},
{10, 162, 215, 226, 216, 176, 22, −3},
{8, 157, 214, 226, 216, 179, 27, −3},
{6, 152, 214, 226, 217, 182, 31, −4},
{3, 146, 213, 226, 218, 186, 36, −4},
{2, 143, 214, 226, 218, 188, 39, −6},
{0, 137, 213, 226, 219, 190, 45, −6},
{−1, 132, 212, 226, 220, 192, 49, −6},
{−3, 128, 213, 226, 220, 194, 53, −7},
{−4, 122, 211, 225, 221, 197, 59, −7},
{−6, 116, 210, 225, 222, 200, 64, −7},
{−6, 112, 211, 225, 222, 200, 68, −8},
{−7, 106, 210, 225, 222, 203, 74, −9},
{−7, 101, 209, 225, 223, 204, 78, −9},
{−9, 96, 208, 224, 224, 206, 84, −9},
{−9, 90, 207, 224, 224, 207, 90, −9},
{−9, 84, 206, 224, 224, 208, 96, −9},
{−9, 78, 204, 223, 225, 209, 101, −7},
{−9, 74, 203, 222, 225, 210, 106, −7},
{−8, 68, 200, 222, 225, 211, 112, −6},
{−7, 64, 200, 222, 225, 210, 116, −6},
{−7, 59, 197, 221, 225, 211, 122, −4},
{−7, 53, 194, 220, 226, 213, 128, −3},
{−6, 49, 192, 220, 226, 212, 132, −1},
{−6, 45, 190, 219, 226, 213, 137, 0},
{−6, 39, 188, 218, 226, 214, 143, 2},
{−4, 36, 186, 218, 226, 213, 146, 3},
{−4, 31, 182, 217, 226, 214, 152, 6},
{−3, 27, 179, 216, 226, 214, 157, 8},
{−3, 22, 176, 216, 226, 215, 162, 10},
{−2, 20, 173, 215, 226, 214, 165, 13} or

{0, 91, 108, 114, 108, 91, 0, 0},
{−1, 88, 107, 114, 108, 93, 3, 0},
{−3, 85, 106, 114, 109, 95, 6, 0},
{−3, 82, 107, 114, 109, 96, 8, −1},
{−3, 79, 109, 114, 109, 96, 11, −3},
{−4, 76, 108, 114, 109, 98, 14, −3},
{−6, 73, 107, 114, 110, 100, 17, −3},
{−6, 72, 107, 114, 110, 100, 18, −3},
{−6, 70, 107, 114, 110, 100, 20, −3},

{-7, 67, 106, 114, 111, 102, 22, -3},
{-8, 64, 106, 113, 111, 104, 25, -3},
{-9, 60, 106, 113, 112, 105, 29, -4},
{-9, 56, 107, 113, 112, 106, 33, -6},
{-7, 54, 107, 113, 112, 104, 35, -6},
{-6, 53, 107, 113, 112, 103, 36, -6},
{-6, 49, 106, 113, 112, 104, 40, -6},
{-6, 45, 105, 112, 112, 105, 45, -6},
{-6, 40, 104, 112, 113, 106, 49, -6},
{-6, 36, 103, 112, 113, 107, 53, -6},
{-6, 35, 104, 112, 113, 107, 54, -7},
{-6, 33, 106, 112, 113, 107, 56, -9},
{-4, 29, 105, 112, 113, 106, 60, -9},
{-3, 25, 104, 111, 113, 106, 64, -8},
{-3, 22, 102, 111, 114, 106, 67, -7},
{-3, 20, 100, 110, 114, 107, 70, -6},
{-3, 18, 100, 110, 114, 107, 72, -6},
{-3, 17, 100, 110, 114, 107, 73, -6},
{-3, 14, 98, 109, 114, 108, 76, -4},
{-3, 11, 96, 109, 114, 109, 79, -3},
{-1, 8, 96, 109, 114, 107, 82, -3},
{0, 6, 95, 109, 114, 106, 85, -3},
{0, 3, 93, 108, 114, 107, 88, -1}
or
{46, 145, 210, 222, 210, 145, 46, 0},
{44, 142, 208, 221, 211, 147, 49, 2},
{43, 139, 206, 221, 211, 149, 52, 3},
{41, 136, 204, 221, 212, 151, 55, 4},
{40, 133, 202, 220, 212, 153, 58, 6},
{39, 130, 200, 220, 212, 155, 61, 7},
{37, 126, 198, 220, 213, 157, 64, 9},
{36, 123, 196, 219, 213, 160, 67, 10},
{34, 120, 194, 219, 213, 162, 71, 11},
{33, 117, 192, 218, 214, 163, 74, 13},
{31, 114, 190, 218, 214, 166, 77, 14},
{30, 111, 188, 218, 214, 167, 80, 16},
{28, 108, 186, 217, 215, 170, 83, 17},
{27, 105, 184, 217, 215, 172, 86, 18},
{26, 101, 182, 217, 215, 174, 89, 20},
{24, 99, 180, 216, 216, 176, 92, 21},
{23, 95, 178, 216, 216, 178, 95, 23},
{21, 92, 176, 216, 216, 180, 99, 24},
{20, 89, 174, 215, 217, 182, 101, 26},
{18, 86, 172, 215, 217, 184, 105, 27},
{17, 83, 170, 215, 217, 186, 108, 28},
{16, 80, 167, 214, 218, 188, 111, 30},
{14, 77, 166, 214, 218, 190, 114, 31},
{13, 74, 163, 214, 218, 192, 117, 33},
{11, 71, 162, 213, 219, 194, 120, 34},
{10, 67, 160, 213, 219, 196, 123, 36},
{9, 64, 157, 213, 220, 198, 126, 37},
{7, 61, 155, 212, 220, 200, 130, 39},
{6, 58, 153, 212, 220, 202, 133, 40},
{4, 55, 151, 212, 221, 204, 136, 41},
{3, 52, 149, 211, 221, 206, 139, 43},
{2, 49, 147, 211, 221, 208, 142, 44}.

28. A computer-implemented video or image processing method, comprising:
performing an intra predicting process for a target block, wherein performing the intra predicting process comprises:
determining an intra prediction mode for the target block;
in response to the intra prediction mode is a direct current (DC) mode or a plane mode, determining a base value based on a plurality of reference samples surrounding the target block; and
determining a predicted value of a sample of the target block based on the base value and a first set of corresponding reference samples.

29. The method according to clause 28, wherein determining the predicted value of the sample of the target block based on the base value and the first set of corresponding reference samples further comprising:
determining the predicted value of the sample on first two columns or the sample on first two rows of the target block based on a weighted combination of the base value and the values of the first set of corresponding reference samples.

30. The method according to clause 29, further comprising: the weighted combination includes a weight equal to 18, 38, 13, 126, 169, 230, 182 or 243.

31. The method according to clause 29, further comprising at least one of:
determining the predicted value of the sample on a cross of a first row and a first column of the target block based on the weighted combination of the base value and the values of the first set of corresponding reference samples, wherein the first set of corresponding reference samples includes two top reference samples, two left reference samples and one top-left reference sample; or
determining the predicted value of the sample on a cross of the first row and a second column of the target block based on the weighted combination of the base value and the values of the first set of corresponding reference samples, wherein the first set of corresponding reference samples includes three top reference samples and one left reference sample; or
determining the predicted value of the sample on a cross of a second row and the first column of the target block based on the weighted combination of the base value and the values of the first set of corresponding reference samples, wherein the first set of corresponding reference samples includes three left reference samples and one top reference sample; or
determining the predicted value of the sample on a cross of the second row and the second column of the target block based on the weighted combination of the base value and the values of the first set of corresponding reference samples, wherein the first set of corresponding reference samples includes one left reference sample and one top reference sample; or
determining the predicted value of the sample on the first row but not on the first two columns of the target block based on the weighted combination of the base value and the values of the first set of corresponding reference samples, wherein the first set of corresponding reference samples includes three top reference samples; or
determining the predicted value of the sample on the second row but not on the first two columns of the target block based on the weighted combination of the base value and the values of the first set of corresponding reference samples, wherein the first set of corresponding reference samples includes one top reference sample; or
determining the predicted value of the sample on the first column but not on the first two rows of the target block based on the weighted combination of the base value and the values of the first set of corresponding reference samples, wherein the first set of corresponding reference samples includes three left reference samples; or determining the predicted value of the sample on the second column but not on the first two rows of the target block based on the weighted combination of the base value and the values of the first set of corresponding reference samples, wherein the first set of corresponding reference samples includes one left reference sample.

32. The method according to clause 28, further comprising:
determining a final predicted value of the sample based on a weighted combination of the predicted value of the sample and the values of a second set of corresponding reference samples, wherein the second set of corresponding reference samples are not the same as the first set of corresponding reference samples.

33. The method according to clause 28, further comprising: in response to the intra prediction mode is the plane mode, determining a horizontal slope and a vertical slope of the target block based on top reference samples and left reference samples of the plurality of reference samples; and
determining the base value based on the horizontal slope and the vertical slope.

34. The method according to clause 28, further comprising:
in response to the intra prediction mode is the DC mode, determining the base value by averaging reference samples of the plurality of reference samples.

35. The method according to clause 28, further comprising: determining a flag; and
in response to the flag equal to a first value, determining the predicted value of the sample of the target block based on the base value and the first set of corresponding reference samples.

36. The method according to clause 35, further comprising:
in response to the flag equal to a second value, determining the predicted value of the sample of the target block based on the base value and not based on the first set of corresponding reference samples.

37. A system for video or image processing, the system comprising: a memory storing a set of instructions; and
one or more processors configured to execute the set of instructions to cause the system to perform an intra predicting process for a target block, wherein performing the intra predicting process comprises:
determining an intra prediction mode for the target block;
in response to the intra prediction mode is a direct current (DC) mode or a plane mode, determining a base value based on a plurality of reference samples surrounding the target block; and
determining a predicted value of a sample of the target block based on the base value and a first set of corresponding reference samples.

38. The system according to clause 37, wherein determining the predicted value of the sample of the target block based on the base value and the first corresponding reference samples further comprising:
determining the predicted value of the sample on first two columns or the sample on first two rows of the target block based on a weighted combination of the base value and the values of the first set of corresponding reference samples.

39. The system according to clause 38, wherein the weighted combination includes a weight equal to 18, 38, 13, 126, 169, 230, 182 or 243.

40. The system according to clause 38, wherein the set of instructions that is executable by one or more processors of the apparatus to cause the apparatus to further perform:
determining the predicted value of the sample on a cross of a first row and a first column of the target block based on the weighted combination of the base value and the values of the first set of corresponding reference samples, wherein the first set of corresponding reference samples includes two top reference samples, two left reference samples and one top-left reference sample; or
determining the predicted value of the sample on a cross of the first row and a second column of the target block based on the weighted combination of the base value and the values of the first set of corresponding reference samples, wherein the first set of corresponding reference samples includes three top reference samples and one left reference sample; or
determining the predicted value of the sample on a cross of a second row and the first column of the target block based on the weighted combination of the base value and the values of the first set of corresponding reference samples, wherein the first set of corresponding reference samples includes three left reference samples and one top reference sample; or
determining the predicted value of the sample on a cross of the second row and the second column of the target block based on the weighted combination of the base value and the values of the first set of corresponding reference samples, wherein the first set of corresponding reference samples includes one left reference sample and one top reference sample; or
determining the predicted value of the sample on the first row but not on the first two columns of the target block based on the weighted combination of the base value and the values of the first set of corresponding reference samples, wherein the first set of corresponding reference samples includes three top reference samples; or
determining the predicted value of the sample on the second row but not on the first two columns of the target block based on the weighted combination of the base value and the values of the first set of corresponding reference samples, wherein the first set of corresponding reference samples includes one top reference sample; or
determining the predicted value of the sample on the first column but not on the first two rows of the target block based on the weighted combination of the base value and the values of the first set of corresponding reference samples, wherein the first set of corresponding reference samples includes three left reference samples; or
for the predicted value of the sample on the second column but not on the first two rows of the target block based on the weighted combination of the base value and the values of the first set of corresponding reference samples, wherein the first set of corresponding reference samples includes one left reference sample.

41. The system according to clause 37, wherein the one or more processors are further configured to execute the set of instruction to cause the system to perform:
determining a final predicted value of the sample based on a weighted combination of the predicted value of the sample and the values of a second set of corresponding reference samples, wherein the second set of corresponding reference samples are not the same as the first set of corresponding reference samples.

42. The system according to clause 37, wherein the one or more processors are further configured to execute the set of instruction to cause the system to perform:
in response to the intra prediction mode is the plane mode, determining a horizontal slope and a vertical slope of the target block based on top reference samples and left reference samples of the plurality of reference samples; and
determining the base value based on the horizontal slope and the vertical slope.

43. The system according to clause 37, wherein the one or more processors are further configured to execute the set of instruction to cause the system to perform: in response to the intra prediction mode is the DC mode, determining the base value by averaging reference samples of the plurality of reference samples.

44. The system according to clause 37, wherein the one or more processors are further configured to execute the set of instruction to cause the system to perform:
determining a flag; and
in response to the flag equal to a first value, determining the predicted value of the sample of the target block based on the base value and the first set of corresponding reference samples.

45. The system according to clause 44, wherein the one or more processors are further configured to execute the set of instruction to cause the system to perform:
in response to the flag equal to a second value, determining the predicted value of the sample of the target block based on the base value and not based on the first set of corresponding reference samples.

46. A non-transitory computer readable medium that stores a set of instructions that is executable by one or more processors of an apparatus to cause the apparatus to initiate a method for video or image processing, the method comprising:
performing an intra predicting process for a target block, wherein performing the intra predicting process comprises:
determining an intra prediction mode for the target block;
in response to the intra prediction mode is a direct current (DC) mode or a plane mode, determining a base value based on a plurality of reference samples surrounding the target block; and
determining a predicted value of a sample of the target block based on the base value and a first set of corresponding reference samples.

47. The non-transitory computer readable medium according to clause 46, wherein determining the predicted value of the sample of the target block based on the base value and the first corresponding reference samples further comprising:
determining the predicted value of the sample on first two columns or the sample on first two rows of the target block based on a weighted combination of the base value and the values of the first set of corresponding reference samples.

48. The non-transitory computer readable medium according to clause 47, wherein the weighted combination includes a weighted equal to 18, 38, 126, 230, 182 or 243.

49. The non-transitory computer readable medium according to clause 47, wherein the set of instructions that is executable by one or more processors of the apparatus to cause the apparatus to further perform:
determining the predicted value of the sample on a cross of a first row and a first column of the target block based on the weighted combination of the base value and the values of the first set of corresponding reference samples, wherein the first set of corresponding reference samples includes two top reference samples, two left reference samples and one top-left reference sample; or
determining the predicted value of the sample on a cross of the first row and a second column of the target block based on the weighted combination of the base value and the values of the first set of corresponding reference samples, wherein the first set of corresponding reference samples includes three top reference samples and one left reference sample; or
determining the predicted value of the sample on a cross of a second row and the first column of the target block based on the weighted combination of the base value and the values of the first set of corresponding reference samples, wherein the first set of corresponding reference samples includes three left reference samples and one top reference sample; or
determining the predicted value of the sample on a cross of the second row and the second column of the target block based on the weighted combination of the base value and the values of the first set of corresponding reference samples, wherein the first set of corresponding reference samples includes one left reference sample and one top reference sample; or
determining the predicted value of the sample on the first row but not on the first two columns of the target block based on the weighted combination of the base value and the values of the first set of corresponding reference samples, wherein the first set of corresponding reference samples includes three top reference samples; or
determining the predicted value of the sample on the second row but not on the first two columns of the target block based on the weighted combination of the base value and the values of the first set of corresponding reference samples, wherein the first set of corresponding reference samples includes one top reference sample; or
determining the predicted value of the sample on the first column but not on the first two rows of the target block based on the weighted combination of the base value and the values of the first set of corresponding reference samples, wherein the first set of corresponding reference samples includes three left reference samples; or
determining the predicted value of the sample on the second column but not on the first two rows of the target block based on the weighted combination of the base value and the values of the first set of corresponding reference samples, wherein the first set of corresponding reference samples includes one left reference sample.

50. The non-transitory computer readable medium according to clause 46, wherein the set of instructions that is executable by one or more processors of the apparatus to cause the apparatus to further perform:
determining a refined predicted value of the sample based on a weighted combination of the predicted value of the sample and the values of a second set of corresponding reference samples, wherein the second set of corresponding reference samples are not the same as the first set of corresponding reference samples.

51. The non-transitory computer readable medium according to clause 46, wherein the set of instructions that is executable by one or more processors of the apparatus to cause the apparatus to further perform:
in response to the intra prediction mode is the plane mode, determining a horizontal slope and a vertical slope of the target block based on top reference samples and left reference samples of the plurality of reference samples; and
determining the base value based on the horizontal slope and the vertical slope.

52. The non-transitory computer readable medium according to clause 46, wherein the set of instructions that is executable by one or more processors of the apparatus to cause the apparatus to further perform:
in response to the intra prediction mode is the DC mode, determining the base value by averaging reference samples of the plurality of reference samples.

53. The non-transitory computer readable medium according to clause 46, wherein the set of instructions that is executable by one or more processors of the apparatus to cause the apparatus to further perform:
determining a flag; and
in response to the flag equal to a first value, determining the predicted value of the sample of the target block based on the base value and the first set of corresponding reference samples.

54. The non-transitory computer readable medium according to clause 53, wherein the set of instructions that is executable by one or more processors of the apparatus to cause the apparatus to further perform:
in response to the flag equal to a second value, determining the predicted value of the sample of the target block based on the base value and not based on the first set of corresponding reference samples.

55. A computer-implemented video or image processing method, comprising: performing an intra predicting process for a target block, wherein performing the intra predicting process comprises:
determining an intra prediction mode for the target block;
in response to the intra prediction mode is a bilinear mode, determining a first value based on a weighted combination of a plurality of top reference samples and a second value based on a weighted combination of a plurality of left reference samples, wherein the plurality of the top reference samples include more than one reference sample and the plurality of the left reference samples include more than one reference sample; and
determining a predicted value of a sample of the target block based on the first value and the second value.

56. The method according to clause 55, further comprising at least one of:
determining the first value based on the weighted combination of the plurality of the top reference samples, wherein the weighted combination includes a weight equal to 82, 252 or 356; or
determining the second value based on the weighted combination of the plurality of the left reference samples, wherein the weighted combination includes a weight equal to 82, 252 or 356.

57. The method according to clause 55, wherein the plurality of the top reference samples includes five top reference samples with weights equal to 82, 252, 356, 252, 82, respectively; and
wherein the plurality of the left reference samples includes five left reference samples with weights equal to 82, 252, 356, 252, 82, respectively.

58. The method according to clause 55, further comprising:
determining a third value based on the first value, the second value and a width of the target block and a height of the target block; and
demining the predicted value of the sample of the target block further based on the third value.

59. The method according to clause 55, further comprising:
determining a flag; and
in response to the flag equal to a first value, determining the first value based on the weighted combination of the plurality of the top reference samples and the second value based on the weighted combination of the plurality of the left reference samples, wherein the plurality of the top reference samples includes more than one reference sample and the plurality of the left reference samples includes more than one reference sample, and determining the predicted value of the sample of the target block based on the first value and the second value.

60. The method according to clause 59, further comprising:
in response to the flag equal to a second value, determining the first value based on only one top reference sample and the second value based on only one left reference sample, and determining the predicted value of the sample of the target block based on the first value and the second value.

61. A system for video or image processing, the system comprising: a memory storing a set of instructions; and
a one or more processors configured to execute the set of instructions to cause the system to perform:
determining an intra prediction mode for the target block;
in response to the intra prediction mode is a bilinear mode, determining a first value based on a weighted combination of a plurality of top reference samples and a second value based on a weighted combination of a plurality of left reference samples, wherein the plurality of the top reference samples include more than one reference sample and the plurality of the left reference samples include more than one reference sample; and
determining a predicted value of a sample of the target block based on the first value and the second value.

62. The system according to clause 61, wherein the one or more processors are configured to execute the set of instructions to cause the system to further perform at least one of:
determining the first value based on the weighted combination of the plurality of the top reference samples, wherein the weighted combination includes a weight equal to 82, 252 or 356; or
determining the second value based on the weighted combination of the plurality of the left reference samples, wherein the weighted combination includes a weight equal to 82, 252 or 356.

63. 6The system according to clause 61, wherein the plurality of the top reference samples includes five top reference samples with weights equal to 82, 252, 356, 252, 82, respectively; and
wherein the plurality of the left reference samples includes five left reference samples with weights equal to 82, 252, 356, 252, 82, respectively.

64. The system according to clause 61, wherein the one or more processors are configured to execute the set of instructions to cause the system to further perform:

determining a third value based on the first value, the second value and a width of the target block and a height of the target block; and demining the predicted value of the sample of the target block further based on the third value.

65. The system according to clause 61, wherein the one or more processors are configured to execute the set of instructions to cause the system to further perform: determining a flag; and
in response to the flag equal to a first value, determining the first value based on the weighted combination of the plurality of the top reference samples and the second value based on the weighted combination of the plurality of the left reference samples, wherein the plurality of the top reference samples includes more than one reference sample and the plurality of the left reference samples includes more than one reference sample, and determining the predicted value of the sample of the target block based on the first value and the second value.

66. The system according to clause 65, wherein the one or more processors are configured to execute the set of instructions to cause the system to further perform:
in response to the flag equal to a second value, determining the first value based on only one top reference sample and the second value based on only one left reference sample, and determining the predicted value of the sample of the target block based on the first value and the second value.

67. A non-transitory computer readable medium that stores a set of instructions that is executable by one or more processors of an apparatus to cause the apparatus to initiate a method for video or image processing, the method comprising:
performing an intra predicting process for a target block, wherein performing the intra predicting process comprises:
determining an intra prediction mode for the target block;
in response to the intra prediction mode is a bilinear mode, determining a first value based on a weighted combination of a plurality of top reference samples and a second value based on a weighted combination of a plurality of left reference samples, wherein the plurality of the top reference samples include more than one reference sample and the plurality of the left reference samples include more than one reference sample; and
determining a predicted value of a sample of the target block based on the first value and the second value.

68. The non-transitory computer readable medium according to clause 67, wherein the set of instructions that is executable by the one or more processors of the apparatus to cause the apparatus to further perform at least one of:
determining the first value based on the weighted combination of the plurality of the top reference samples, wherein the weighted combination includes a weight equal to 82, 252 or 356; or
determining the second value based on the weighted combination of the plurality of the left reference samples, wherein the weighted combination includes with a weight equal to 82, 252 or 356.

69. The non-transitory computer readable medium according to claim 67, wherein the set of instructions that is executable by the one or more processors of the apparatus to cause the apparatus to further perform at least one of:
the plurality of the top reference samples includes five top reference samples with weights equal to 82, 252, 356, 252, 82, respectively; and
the plurality of the left reference samples includes five left reference samples with weights equal to 82, 252, 356, 252, 82, respectively.

70. The non-transitory computer readable medium according to clause 67, wherein the set of instructions that is executable by the one or more processors of the apparatus to cause the apparatus to further perform:
determining a third value based on the first value, the second value and a width of the target block and a height of the target block; and
determining the predicted value of the sample of the target block further based on the third value.

71. The non-transitory computer readable medium according to clause 67, wherein the set of instructions that is executable by the one or more processors of the apparatus to cause the apparatus to further perform:
determining a flag; and
in response to the flag equal to a first value, determining the first value based on the weighted combination of the plurality of the top reference samples and the second value based on the weighted combination of the plurality of the left reference samples, wherein the plurality of the top reference samples includes more than one reference sample and the plurality of the left reference samples includes more than one reference sample, and determining the predicted value of the sample of the target block based on the first value and the second value.

72. The non-transitory computer readable medium according to clause 71, wherein the set of instructions that is executable by the one or more processors of the apparatus to cause the apparatus to further perform:
in response to the flag equal to a second value, determining the first value based on only one top reference sample and the second value based on only one left reference samples, and determining the predicted value of the sample of the target block based on the first value and the second value.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As another example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method for decoding a bitstream associated with one or more pictures, the method comprising:
   decoding a flag associated with a target block; and
   performing an intra predicting process to reconstruct the target block, wherein performing the intra predicting process comprises:
   determining an intra prediction mode for the target block;
   in response to the intra prediction mode is an angular mode, determining a filtered value by applying an 8-tap interpolation filter to a plurality of reference samples around the target block when the flag has a first value, and determining the filtered value by applying an M-tap interpolation filter to the plurality of reference samples when the flag has a second value, M being an integer less than 8; and
   determining a predicted value of a sample of the target block based on the filtered value,
   wherein the 8-tap interpolation filter is selected from a plurality of sets of interpolation filters based on the intra prediction mode, wherein each set of the plurality of sets of interpolation filters comprises 32 8-tap interpolation filters, and the plurality of sets of interpolation filters comprises at least one of:
   a first set of 32 8-tap interpolation filters:
   {33, 156, 209, 223, 211, 156, 33, 3},
   {30, 153, 208, 223, 212, 159, 36, 3},
   {27, 149, 208, 223, 213, 162, 39, 3},
   {26, 146, 207, 223, 213, 164, 42, 3},
   {23, 141, 206, 223, 214, 168, 46, 3},
   {21, 138, 205, 223, 215, 170, 49, 3},
   {18, 133, 204, 223, 216, 174, 53, 3},
   {17, 130, 204, 222, 216, 176, 56, 3},
   {16, 125, 203, 222, 217, 178, 60, 3},
   {14, 123, 202, 222, 217, 180, 63, 3},
   {13, 118, 201, 222, 218, 182, 67, 3},
   {12, 113, 199, 222, 218, 184, 72, 4},
   {10, 109, 198, 221, 219, 187, 76, 4},
   {9, 106, 198, 221, 219, 188, 79, 4},
   {9, 101, 195, 221, 219, 189, 84, 6},
   {7, 97, 195, 220, 220, 191, 88, 6},
   {6, 92, 194, 220, 220, 194, 92, 6},
   {6, 88, 191, 220, 220, 195, 97, 7},
   {6, 84, 189, 219, 221, 195, 101, 9},
   {4, 79, 188, 219, 221, 198, 106, 9},
   {4, 76, 187, 219, 221, 198, 109, 10},
   {4, 72, 184, 218, 222, 199, 113, 12},
   {3, 67, 182, 218, 222, 201, 118, 13},
   {3, 63, 180, 217, 222, 202, 123, 14},
   {3, 60, 178, 217, 222, 203, 125, 16},
   {3, 56, 176, 216, 222, 204, 130, 17},
   {3, 53, 174, 216, 223, 204, 133, 18},
   {3, 49, 170, 215, 223, 205, 138, 21},
   {3, 46, 168, 214, 223, 206, 141, 23},
   {3, 42, 164, 213, 223, 207, 146, 26},
   {3, 39, 162, 213, 223, 208, 149, 27},
   {3, 36, 159, 212, 223, 208, 153, 30}; or
   a second set of 32 8-tap interpolation filters:
   {16, 170, 215, 226, 214, 169, 15, −1},
   {13, 165, 214, 226, 215, 173, 20, −2},
   {10, 162, 215, 226, 216, 176, 22, −3},
   {8, 157, 214, 226, 216, 179, 27, −3},
   {6, 152, 214, 226, 217, 182, 31, −4},
   {3, 146, 213, 226, 218, 186, 36, −4},
   {2, 143, 214, 226, 218, 188, 39, −6},
   {0, 137, 213, 226, 219, 190, 45, −6},
   {−1, 132, 212, 226, 220, 192, 49, −6},
   {−3, 128, 213, 226, 220, 194, 53, −7},
   {−4, 122, 211, 225, 221, 197, 59, −7},
   {−6, 116, 210, 225, 222, 200, 64, −7},
   {−6, 112, 211, 225, 222, 200, 68, −8},
   {−7, 106, 210, 225, 222, 203, 74, −9},
   {−7, 101, 209, 225, 223, 204, 78, −9},
   {−9, 96, 208, 224, 224, 206, 84, −9},
   {−9, 90, 207, 224, 224, 207, 90, −9},
   {−9, 84, 206, 224, 224, 208, 96, −9},
   {−9, 78, 204, 223, 225, 209, 101, −7},
   {−9, 74, 203, 222, 225, 210, 106, −7},
   {−8, 68, 200, 222, 225, 211, 112, −6},
   {−7, 64, 200, 222, 225, 210, 116, −6},
   {−7, 59, 197, 221, 225, 211, 122, −4},
   {−7, 53, 194, 220, 226, 213, 128, −3},
   {−6, 49, 192, 220, 226, 212, 132, −1},
   {−6, 45, 190, 219, 226, 213, 137, 0},
   {−6, 39, 188, 218, 226, 214, 143, 2},
   {−4, 36, 186, 218, 226, 213, 146, 3},
   {−4, 31, 182, 217, 226, 214, 152, 6},
   {−3, 27, 179, 216, 226, 214, 157, 8},
   {−3, 22, 176, 216, 226, 215, 162, 10},
   {−2, 20, 173, 215, 226, 214, 165, 13}; or
   a third set of 32 8-tap interpolation filters:
   {0, 91, 108, 114, 108, 91, 0, 0},
   {−1, 88, 107, 114, 108, 93, 3, 0},
   {−3, 85, 106, 114, 109, 95, 6, 0},
   {−3, 82, 107, 114, 109, 96, 8, −1},
   {−3, 79, 109, 114, 109, 96, 11, −3},
   {−4, 76, 108, 114, 109, 98, 14, −3},
   {−6, 73, 107, 114, 110, 100, 17, −3},
   {−6, 72, 107, 114, 110, 100, 18, −3},
   {−6, 70, 107, 114, 110, 100, 20, −3},
   {−7, 67, 106, 114, 111, 102, 22, −3},
   {−8, 64, 106, 113, 111, 104, 25, −3},
   {−9, 60, 106, 113, 112, 105, 29, −4},
   {−9, 56, 107, 113, 112, 106, 33, −6},
   {−7, 54, 107, 113, 112, 104, 35, −6},
   {−6, 53, 107, 113, 112, 103, 36, −6},
   {−6, 49, 106, 113, 112, 104, 40, −6},
   {−6, 45, 105, 112, 112, 105, 45, −6},
   {−6, 40, 104, 112, 113, 106, 49, −6},
   {−6, 36, 103, 112, 113, 107, 53, −6},
   {−6, 35, 104, 112, 113, 107, 54, −7},
   {−6, 33, 106, 112, 113, 107, 56, −9},
   {−4, 29, 105, 112, 113, 106, 60, −9},
   {−3, 25, 104, 111, 113, 106, 64, −8}, {−3, 22, 102, 111, 114, 106, 67, −7},
{−3, 20, 100, 110, 114, 107, 70, −6},
{−3, 18, 100, 110, 114, 107, 72, −6},
{−3, 17, 100, 110, 114, 107, 73, −6},
{−3, 14, 98, 109, 114, 108, 76, −4},
{−3, 11, 96, 109, 114, 109, 79, −3},
{−1, 8, 96, 109, 114, 107, 82, −3},
{0, 6, 95, 109, 114, 106, 85, −3},
{0, 3, 93, 108, 114, 107, 88, −1}; or
a fourth set of 32 8-tap interpolation filters:
{46, 145, 210, 222, 210, 145, 46, 0},
{44, 142, 208, 221, 211, 147, 49, 2},
{43, 139, 206, 221, 211, 149, 52, 3},
{41, 136, 204, 221, 212, 151, 55, 4},
{40, 133, 202, 220, 212, 153, 58, 6},
{39, 130, 200, 220, 212, 155, 61, 7},
{37, 126, 198, 220, 213, 157, 64, 9},
{36, 123, 196, 219, 213, 160, 67, 10},
{34, 120, 194, 219, 213, 162, 71, 11},
{33, 117, 192, 218, 214, 163, 74, 13},
{31, 114, 190, 218, 214, 166, 77, 14},
{30, 111, 188, 218, 214, 167, 80, 16},
{28, 108, 186, 217, 215, 170, 83, 17},
{27, 105, 184, 217, 215, 172, 86, 18},
{26, 101, 182, 217, 215, 174, 89, 20},
{24, 99, 180, 216, 216, 176, 92, 21},
{23, 95, 178, 216, 216, 178, 95, 23},
{21, 92, 176, 216, 216, 180, 99, 24},
{20, 89, 174, 215, 217, 182, 101, 26},
{18, 86, 172, 215, 217, 184, 105, 27},
{17, 83, 170, 215, 217, 186, 108, 28},
{16, 80, 167, 214, 218, 188, 111, 30},
{14, 77, 166, 214, 218, 190, 114, 31},
{13, 74, 163, 214, 218, 192, 117, 33},
{11, 71, 162, 213, 219, 194, 120, 34},
{10, 67, 160, 213, 219, 196, 123, 36},
{9, 64, 157, 213, 220, 198, 126, 37},
{7, 61, 155, 212, 220, 200, 130, 39},
{6, 58, 153, 212, 220, 202, 133, 40},
{4, 55, 151, 212, 221, 204, 136, 41},
{3, 52, 149, 211, 221, 206, 139, 43},
{2, 49, 147, 211, 221, 208, 142, 44}.

2. The method of claim 1, wherein the plurality of reference samples comprises a left reference sample in a row to the left of the target block or a top reference sample in a column to the top of the target block, and the intra predicting process further comprises:
padding more than two left reference samples from the top reference samples of the target block; or
padding more than two top reference samples from the left reference samples of the target block.

3. The method of claim 2, wherein the padding of the reference samples is independent from the intra prediction mode.

4. The method of claim 1, wherein determining the predicted value of the sample of the target block based on the filtered value further comprising:
determining the predicted value of the sample of the target block based on a weighted combination of the filtered value and values of corresponding reference samples.

5. The method of claim 4, wherein the corresponding reference samples comprise two left reference samples in a column to the left of the target block and two top reference samples in a row to the top of the target block.

6. A computer-implemented method for encoding one or more pictures, the method comprising:
performing intra prediction of a target block, wherein performing the intra prediction comprises:
determining an intra prediction mode for the target block;
in response to the intra prediction mode is an angular mode, determining a filtered value by applying an 8-tap interpolation filter to a plurality of reference samples around the target block; and
determining a predicted value of a sample of the target block based on the filtered value,
wherein the 8-tap interpolation filter is selected from a plurality of sets of interpolation filters based on the intra prediction mode, wherein each set of the plurality of sets of interpolation filters comprises 32 8-tap interpolation filters, and the plurality of sets of interpolation filters comprises at least one of:
a first set of 32 8-tap interpolation filters:
{33, 156, 209, 223, 211, 156, 33, 3},
{30, 153, 208, 223, 212, 159, 36, 3},
{27, 149, 208, 223, 213, 162, 39, 3},
{26, 146, 207, 223, 213, 164, 42, 3},
{23, 141, 206, 223, 214, 168, 46, 3},
{21, 138, 205, 223, 215, 170, 49, 3},
{18, 133, 204, 223, 216, 174, 53, 3},
{17, 130, 204, 222, 216, 176, 56, 3},
{16, 125, 203, 222, 217, 178, 60, 3},
{14, 123, 202, 222, 217, 180, 63, 3},
{13, 118, 201, 222, 218, 182, 67, 3},
{12, 113, 199, 222, 218, 184, 72, 4},
{10, 109, 198, 221, 219, 187, 76, 4},
{9, 106, 198, 221, 219, 188, 79, 4},
{9, 101, 195, 221, 219, 189, 84, 6},
{7, 97, 195, 220, 220, 191, 88, 6},
{6, 92, 194, 220, 220, 194, 92, 6},
{6, 88, 191, 220, 220, 195, 97, 7},
{6, 84, 189, 219, 221, 195, 101, 9},
{4, 79, 188, 219, 221, 198, 106, 9},
{4, 76, 187, 219, 221, 198, 109, 10},
{4, 72, 184, 218, 222, 199, 113, 12},
{3, 67, 182, 218, 222, 201, 118, 13},
{3, 63, 180, 217, 222, 202, 123, 14},
{3, 60, 178, 217, 222, 203, 125, 16},
{3, 56, 176, 216, 222, 204, 130, 17},
{3, 53, 174, 216, 223, 204, 133, 18},
{3, 49, 170, 215, 223, 205, 138, 21},
{3, 46, 168, 214, 223, 206, 141, 23},
{3, 42, 164, 213, 223, 207, 146, 26},
{3, 39, 162, 213, 223, 208, 149, 27},
{3, 36, 159, 212, 223, 208, 153, 30}; or
a second set of 32 8-tap interpolation filters:
{16, 170, 215, 226, 214, 169, 15, −1},
{13, 165, 214, 226, 215, 173, 20, −2},
{10, 162, 215, 226, 216, 176, 22, −3},
{8, 157, 214, 226, 216, 179, 27, −3},
{6, 152, 214, 226, 217, 182, 31, −4},
{3, 146, 213, 226, 218, 186, 36, −4},
{2, 143, 214, 226, 218, 188, 39, −6},
{0, 137, 213, 226, 219, 190, 45, −6},
{−1, 132, 212, 226, 220, 192, 49, −6},
{−3, 128, 213, 226, 220, 194, 53, −7},
{−4, 122, 211, 225, 221, 197, 59, −7},
{−6, 116, 210, 225, 222, 200, 64, −7},
{−6, 112, 211, 225, 222, 200, 68, −8},
{−7, 106, 210, 225, 222, 203, 74, −9},
{−7, 101, 209, 225, 223, 204, 78, −9}, {−9, 96, 208, 224, 224, 206, 84, −9},
{−9, 90, 207, 224, 224, 207, 90, −9},
{−9, 84, 206, 224, 224, 208, 96, −9},
{−9, 78, 204, 223, 225, 209, 101, −7},
{−9, 74, 203, 222, 225, 210, 106, −7},
{−8, 68, 200, 222, 225, 211, 112, −6},
{−7, 64, 200, 222, 225, 210, 116, −6},
{−7, 59, 197, 221, 225, 211, 122, −4},
{−7, 53, 194, 220, 226, 213, 128, −3},
{−6, 49, 192, 220, 226, 212, 132, −1},
{−6, 45, 190, 219, 226, 213, 137, 0},
{−6, 39, 188, 218, 226, 214, 143, 2},
{−4, 36, 186, 218, 226, 213, 146, 3},
{−4, 31, 182, 217, 226, 214, 152, 6},
{−3, 27, 179, 216, 226, 214, 157, 8},
{−3, 22, 176, 216, 226, 215, 162, 10},
{−2, 20, 173, 215, 226, 214, 165, 13}; or
a third set of 32 8-tap interpolation filters:
{0, 91, 108, 114, 108, 91, 0, 0},
{−1, 88, 107, 114, 108, 93, 3, 0},
{−3, 85, 106, 114, 109, 95, 6, 0},
{—3, 82, 107, 114, 109, 96, 8, −1},
{−3, 79, 109, 114, 109, 96, 11, −3},
{−4, 76, 108, 114, 109, 98, 14, −3},
{−6, 73, 107, 114, 110, 100, 17, −3},
{−6, 72, 107, 114, 110, 100, 18, −3},
{−6, 70, 107, 114, 110, 100, 20, −3},
{−7, 67, 106, 114, 111, 102, 22, −3},
{−8, 64, 106, 113, 111, 104, 25, −3},
{—9, 60, 106, 113, 112, 105, 29, −4},
{−9, 56, 107, 113, 112, 106, 33, −6},
{−7, 54, 107, 113, 112, 104, 35, −6},
{−6, 53, 107, 113, 112, 103, 36, −6},
{−6, 49, 106, 113, 112, 104, 40, −6},
{−6, 45, 105, 112, 112, 105, 45, −6},
{−6, 40, 104, 112, 113, 106, 49, −6},
{−6, 36, 103, 112, 113, 107, 53, −6},
{−6, 35, 104, 112, 113, 107, 54, −7},
{−6, 33, 106, 112, 113, 107, 56, −9},
{−4, 29, 105, 112, 113, 106, 60, −9},
{−3, 25, 104, 111, 113, 106, 64, −8},
{−3, 22, 102, 111, 114, 106, 67, −7},
{−3, 20, 100, 110, 114, 107, 70, −6},
{−3, 18, 100, 110, 114, 107, 72, −6},
{−3, 17, 100, 110, 114, 107, 73, −6},
{−3, 14, 98, 109, 114, 108, 76, −4},
{−3, 11, 96, 109, 114, 109, 79, −3},
{—1, 8, 96, 109, 114, 107, 82, −3},
{0, 6, 95, 109, 114, 106, 85, −3},
{0, 3, 93, 108, 114, 107, 88, −1}; or
a fourth set of 32 8-tap interpolation filters:
{46, 145, 210, 222, 210, 145, 46, 0},
{44, 142, 208, 221, 211, 147, 49, 2},
{43, 139, 206, 221, 211, 149, 52, 3},
{41, 136, 204, 221, 212, 151, 55, 4},
{40, 133, 202, 220, 212, 153, 58, 6},
{39, 130, 200, 220, 212, 155, 61, 7},
{37, 126, 198, 220, 213, 157, 64, 9},
{36, 123, 196, 219, 213, 160, 67, 10},
{34, 120, 194, 219, 213, 162, 71, 11},
{33, 117, 192, 218, 214, 163, 74, 13},
{31, 114, 190, 218, 214, 166, 77, 14},
{30, 111, 188, 218, 214, 167, 80, 16},
{28, 108, 186, 217, 215, 170, 83, 17},
{27, 105, 184, 217, 215, 172, 86, 18},
{26, 101, 182, 217, 215, 174, 89, 20},
{24, 99, 180, 216, 216, 176, 92, 21},
{23, 95, 178, 216, 216, 178, 95, 23},
{21, 92, 176, 216, 216, 180, 99, 24},
{20, 89, 174, 215, 217, 182, 101, 26},
{18, 86, 172, 215, 217, 184, 105, 27},
{17, 83, 170, 215, 217, 186, 108, 28},
{16, 80, 167, 214, 218, 188, 111, 30},
{14, 77, 166, 214, 218, 190, 114, 31},
{13, 74, 163, 214, 218, 192, 117, 33},
{11, 71, 162, 213, 219, 194, 120, 34},
{10, 67, 160, 213, 219, 196, 123, 36},
{9, 64, 157, 213, 220, 198, 126, 37},
{7, 61, 155, 212, 220, 200, 130, 39},
{6, 58, 153, 212, 220, 202, 133, 40},
{4, 55, 151, 212, 221, 204, 136, 41},
{3, 52, 149, 211, 221, 206, 139, 43},
{2, 49, 147, 211, 221, 208, 142, 44}.

7. The method of claim 6, wherein the plurality of reference samples comprises a left reference sample in a row to the left of the target block or a top reference sample in a column to the top of the target block, and the intra predicting process further comprises:
padding more than two left reference samples from the top reference samples of the target block; or
padding more than two top reference samples from the left reference samples of the target block.

8. The method of claim 7, wherein the padding of the reference samples is independent from the intra prediction mode.

9. The method of claim 6, wherein determining the predicted value of the sample of the target block based on the filtered value further comprising:
determining the predicted value of the sample of the target block based on a weighted combination of the filtered value and values of corresponding reference samples.

10. The method of claim 9, wherein the corresponding reference samples comprise two left reference samples in a column to the left of the target block and two top reference samples in a row to the top of the target block.

11. The method of claim 6, further comprising:
encoding, into a bitstream, a flag indicating that the 8-tap interpolation filter is applied to the plurality of reference samples in the intra prediction.

12. The method of claim 11, wherein:
a first value of the flag indicates that the 8-tap interpolation filter is applied to the plurality of reference samples in the intra prediction; and
a second value of the flag indicates that an M-tap interpolation filter is applied to the plurality of reference samples in the intra prediction, M being an integer less than 8.

13. A non-transitory computer-readable storage medium in communication with one or more processors for storing instructions associated with a video sequence, which when executed by the one or more processors, generates a bitstream comprising: a flag associated with a target block, wherein the flag indicates whether an 8-tap interpolation filter or an n M-tap interpolation filter is used for performing intra prediction in an angular mode, wherein a filtered value for a sample in the target block is determined by applying the 8-tap interpolation filter or the M-tap interpolation filter to a plurality of reference samples around the target block, wherein a predicted value of the sample of the target block is determined based on the filtered value, and wherein the 8-tap interpolation filter is selected from a plurality of sets of interpolation filters based on the intra prediction mode, wherein each set of the plurality of sets of interpolation filters comprises 32 8-tap interpolation filters, and the plurality of sets of interpolation filters comprises at least one of:
a first set of 32 8-tap interpolation filters: {33, 156, 209, 223, 211, 156, 33, 3}, {30, 153, 208, 223, 212, 159, 36, 3}, {27, 149, 208, 223, 213, 162, 39, 3}, {26, 146, 207, 223, 213, 164, 42, 3}, {23, 141, 206, 223, 214, 168, 46, 3}, {21, 138, 205, 223, 215, 170, 49, 3}, {18, 133, 204, 223, 216, 174, 53, 3}, {17, 130, 204, 222, 216, 176, 56, 3}, {16, 125, 203, 222, 217, 178, 60, 3},{14, 123, 202, 222, 217, 180, 63, 3}, {13, 118, 201, 222, 218, 182, 67, 3}, {12, 113, 199, 222, 218, 184, 72, 4}, {10, 109, 198, 221, 219, 187, 76, 4}, {9, 106, 198, 221, 219, 188, 79, 4}, {9, 101, 195, 221, 219, 189, 84, 6}, {7, 97, 195, 220, 220, 191, 88, 6}, {6, 92, 194, 220, 220, 194, 92, 6}, {6, 88, 191, 220, 220, 195, 97, 7}, {6, 84, 189, 219, 221, 195, 101, 9}, {4, 79, 188, 219, 221, 198, 106, 9}, {4, 76, 187, 219, 221, 198, 109, 10}, {4, 72, 184, 218, 222, 199, 113, 12}, {3, 67, 182, 218, 222, 201, 118, 13}, {3, 63, 180, 217, 222, 202, 123, 14}, {3, 60, 178, 217, 222, 203, 125, 16}, {3, 56, 176, 216, 222, 204, 130, 17}, {3, 53, 174, 216, 223, 204, 133, 18}, {3,49, 170,215,223,205, 138, 21}, {3, 46, 168, 214, 223, 206, 141, 23}, {3, 42, 164, 213, 223, 207, 146, 26}, {3, 39, 162, 213, 223, 208, 149, 27}, {3, 36, 159, 212, 223, 208, 153, 30};

or a second set of 32 8-tap interpolation filters: {16, 170, 215, 226, 214, 169, 15, −1}, {13, 165, 214, 226, 215, 173, 20, −2}, {10, 162, 215, 226, 216, 176, 22, −3},{8, 157, 214, 226, 216, 179, 27, −3}, {6, 152, 214, 226, 217, 182, 31, −4}, {3, 146, 213, 226, 218, 186, 36, −4}, {2, 143, 214, 226, 218, 188, 39, −6}, {0, 137, 213, 226, 219, 190, 45, −6}, {−1, 132, 212, 226, 220, 192, 49, −6}, {−3, 128, 213, 226, 220, 194, 53, −7}, {−4, 122, 211, 225, 221, 197, 59, −7}, {−6, 116, 210, 225, 222, 200, 64, −7}, {−6, 112, 211, 225, 222, 200, 68, −8}, {−7, 106, 210, 225, 222, 203, 74, −9}, {−7, 101, 209, 225, 223, 204, 78, −9}, {−9, 96, 208, 224, 224, 206, 84, −9}, {−9, 90, 207, 224, 224, 207, 90, −9}, {−9, 84, 206, 224, 224, 208, 96, −9}, {−9, 78, 204, 223, 225, 209, 101, −7}, {−9, 74, 203, 222, 225, 210, 106, −7}, {−8, 68, 200, 222, 225, 211, 112, −6}, {−7, 64, 200, 222, 225, 210, 116, −6}, {−7, 59, 197, 221, 225, 211, 122, −4}, {−7, 53, 194, 220, 226, 213, 128, −3}, {−6, 49, 192, 220, 226, 212, 132, −1}, {−6, 45, 190, 219, 226, 213, 137, 0}, {−6, 39, 188, 218, 226, 214, 143, 2}, {−4, 36, 186, 218, 226, 213, 146, 3}, {−4, 31, 182, 217, 226, 214, 152, 6}, {−3, 27, 179, 216, 226, 214, 157, 8}, {−3, 22, 176, 216, 215, 162, 10}, {−2, 20, 173, 215, 226, 214, 165, 13}; or a third set of 32 8-tap interpolation filters: {0, 91, 108, 114, 108, 91, 0, 0}, {−1, 88, 107, 114, 108, 93, 3, 0}, {−3, 85, 106, 114, 109, 95, 6, 0}, {−3, 82, 107, 114, 109, 96, 8, −1}, {−3, 79, 109, 114, 109, 96, 11, −3}, {−4, 76, 108, 114, 109, 98, 14, −3}, {−6, 73, 107, 114, 110, 100, 17, −3}, {−6, 72, 107, 114, 110, 100, 18, −3}, {−6, 70, 107, 114, 110, 100, 20, −3}, {−7, 67, 106, 114, 111, 102, 22, −3}, {−8, 64, 106, 113, 111, 104, 25, −3}, {−9, 60, 106, 113, 112, 105, 29, −4}, {−9, 56, 107, 113, 112, 106, 33, −6}, {−7, 54, 107, 113, 112, 104, 35, −6}, {−6, 53, 107, 113, 112, 103, 36, −6}, {−6, 49, 106, 113, 112, 104, 40, −6}, {−6, 45, 105, 112, 112, 105, 45, −6}, {−6, 40, 104, 112, 113, 106, 49, −6}, {−6, 36, 103, 112, 113, 107, 53, −6}, {−6, 35, 104, 112, 113, 107, 54, −7}, {−6, 33, 106, 112, 113, 107, 56, −9}, {−4, 29, 105, 112, 113, 106, 60, −9}, {−3, 25, 104, 111, 113, 106, 64, −8}, {−3, 22, 102, 111, 114, 106, 67, −7}, {−3, 20, 100, 110, 114, 107, 70, −6}, {−3, 18, 100, 110, 114, 107, 72, −6}, {−3, 17, 100, 110, 114, 107, 73, −6}, {−3, 14, 98, 109, 114, 108, 76, −4}, {−3, 11, 96, 109, 114, 109, 79, −3}, {−1, 8, 96, 109, 114, 107, 82, −3}, {0, 6, 95, 109, 114, 106, 85, −3}, {0, 3, 93, 108, 114, 107, 88, −1}; or a fourth set of 32 8-tap interpolation filters: {46, 145, 210, 222, 210, 145, 46, 0}, {44, 142, 208, 221, 211, 147, 49, 2}, {43, 139, 206, 221, 211, 149, 52, 3}, {41, 136, 204, 221, 212, 151, 55, 4}, {40, 133, 202, 220, 212, 153, 58, 6}, {39, 130, 200, 220, 212, 155, 61, 7}, {37, 126, 198, 220, 213, 157, 64, 9}, {36, 123, 196, 219, 213, 160, 67, 10}, {34, 120, 194, 219, 213, 162, 71, 11}, {33, 117, 192, 218, 214, 163, 74, 13}, {31, 114, 190, 218, 214, 166, 77, 14}, {30, 111, 188, 218, 214, 167, 80, 16}, {28, 108, 186, 217, 215, 170, 83, 17}, {27, 105, 184, 217, 215, 172, 86, 18}, {26, 101, 182, 217, 215, 174, 89, 20}, {24, 99, 180, 216, 216, 176, 92, 21}, {23, 95, 178, 216, 216, 178, 95, 23}, {21, 92, 176, 216, 216, 180, 99, 24}, {20, 89, 174, 215, 217, 182, 101, 26}, {18, 86, 172, 215, 217, 184, 105, 27}, {17, 83, 170, 215, 217, 186, 108, 28}, {16, 80, 167, 214, 218, 188, 111, 30}, {14, 77, 166, 214, 218, 190, 114, 31}, {13, 74, 163, 214, 218, 192, 117, 33}, {11, 71, 162, 213, 219, 194, 120, 34}, {10, 67, 160, 213, 219, 196, 123, 36}, {9, 64, 157, 213, 220, 198, 126, 37}, {7, 61, 155, 212, 220, 200, 130, 39}, {6, 58, 153, 212, 220, 202, 133, 40}, {4, 55, 151, 212, 221, 204, 136, 41}, {3, 52, 149, 211, 221, 206, 139, 43}, {2,49, 147,211,221,208, 142, 44}.

14. The non-transitory computer-readable storage medium of claim 13, wherein the plurality of reference samples comprises:
  a left reference sample in a row to the left of the target block;
  a top reference sample in a column to the top of the target block,
  more than two left reference samples that are padded from the top reference samples of the target block; or
  more than two top reference samples that are padded from the left reference samples of the target block.

15. The non-transitory computer-readable storage medium of claim 14, wherein the padding of the reference samples is independent from the intra prediction mode.

16. The non-transitory computer-readable storage medium of claim 13, wherein:
  the predicted value of the sample of the target block is determined based on a weighted combination of the filtered value and values of corresponding reference samples.

17. The non-transitory computer-readable storage medium of claim 16, wherein the corresponding reference samples comprise two left reference samples in a column to the left of the target block and two top reference samples in a row to the top of the target block.

* * * * *